(12) United States Patent
August et al.

(10) Patent No.: US 8,681,000 B2
(45) Date of Patent: Mar. 25, 2014

(54) LOW FREQUENCY INDUCTIVE TAGGING FOR LIFECYCLE MANAGEMENT

(75) Inventors: M. Jason August, Toronto (CA); Paul Waterhouse, Selkirk (CA); John K. Stevens, Stratham, NH (US)

(73) Assignee: Visible Assets, Inc., Mississauga, Ontario (CA)

( * ) Notice: Subject to any disclaimer, the term of this patent is extended or adjusted under 35 U.S.C. 154(b) by 141 days.

(21) Appl. No.: 12/849,803

(22) Filed: Aug. 3, 2010

(65) Prior Publication Data

US 2011/0169657 A1 Jul. 14, 2011

Related U.S. Application Data

(63) Continuation-in-part of application No. 12/720,401, filed on Mar. 9, 2010, and a continuation-in-part of application No. 12/848,772, filed on Aug. 2, 2010, said application No. 12/720,401 is a continuation-in-part of application No. 11/677,037, filed on Feb. 20, 2007, now Pat. No. 7,675,422, said application No. 12/848,772 is a continuation-in-part of application No. 11/677,037, filed on Feb. 20, 2007, now Pat. No. 7,675,422, which is a continuation-in-part of application No. 11/461,443, filed on Jul. 31, 2006, now Pat. No. 7,277,014, which is a continuation-in-part of application No. 11/276,216, filed on Feb. 17, 2006, now Pat. No. 7,164,359, which is a continuation of application No. 10/820,366, filed on Apr. 8, 2004, now Pat. No. 7,049,963, application No. 12/849,803, which is a continuation-in-part of application No. 11/639,857, filed on Dec. 15, 2006, now Pat. No. 8,026,819.

(60) Provisional application No. 60/461,562, filed on Apr. 9, 2003, provisional application No. 60/744,524, filed on Apr. 10, 2006.

(51) Int. Cl.
*G08B 13/14* (2006.01)

(52) U.S. Cl.
USPC ................... 340/572.1; 340/572.8; 340/853.2

(58) Field of Classification Search
USPC .......... 340/853.1, 853.2, 854.6, 572.1, 572.7, 340/572.8, 10.1, 10.34, 573.1; 166/250.01, 166/250.11, 250.12, 255.1; 175/40
See application file for complete search history.

(56) References Cited

U.S. PATENT DOCUMENTS

| 2,779,908 A | 1/1957 | Martin |
| 3,268,900 A | 8/1966 | Waszkiewicz |

(Continued)

FOREIGN PATENT DOCUMENTS

| EP | 0594375 | 4/1994 |
| KR | 2004008948 | 1/2004 |

(Continued)

OTHER PUBLICATIONS

Semiconductors et al. "Item-Level Visibility in the Pharmaceutical Supply Chain: A Comparison of HF and UHF RFID Technologies", Jul. 2004, pp. 128.

(Continued)

*Primary Examiner* — Kerri McNally
(74) *Attorney, Agent, or Firm* — Larson & Anderson, LLC

(57) ABSTRACT

A lifecycle management system for detection and tracking of drillpipes which carry low radio frequency tags that comprise an inductive antenna and transceiver operable at a first radio frequency below 1 megahertz, a transceiver operatively connected to that antenna, an ID data storage device, a microprocessor for handling data from the transceiver and data store, and a tag energization inductive antenna which can receive radio frequency energy from an ambient radio frequency field of a second low radio frequency. The system includes a field communication inductive antenna disposed, preferably at a distance of several feet from each object, that permits effective communication therewith at the aforesaid first radio frequency, a data receiver, transmitter and reader data processor in operative communication with the field communication inductive antenna, and a field energization inductive antenna which can produce the ambient radio frequency field at the tag energization inductive antenna.

11 Claims, 37 Drawing Sheets

(56) References Cited

U.S. PATENT DOCUMENTS

| | | |
|---|---|---|
| 3,406,391 A | 10/1968 | Von |
| 3,426,151 A | 2/1969 | Tygart |
| 3,427,614 A | 2/1969 | Vinding |
| 3,500,373 A | 3/1970 | Minasy |
| 3,528,014 A | 9/1970 | Albee |
| 3,541,257 A | 11/1970 | McCormick et al. |
| 3,601,550 A | 8/1971 | Spracklen |
| 3,689,885 A | 9/1972 | Kaplan et al. |
| 3,713,124 A | 1/1973 | Durland et al. |
| 3,713,148 A | 1/1973 | Cardullo et al. |
| 3,739,376 A | 6/1973 | Keledy |
| 3,859,624 A | 1/1975 | Kriofsky et al. |
| 4,019,181 A | 4/1977 | Olsson et al. |
| 4,190,830 A | 2/1980 | Bell |
| 4,361,153 A | 11/1982 | Slocum et al. |
| 4,436,203 A | 3/1984 | Reyner |
| 4,449,632 A | 5/1984 | Marusiak, Jr. |
| 4,724,427 A | 2/1988 | Carroll |
| 4,750,197 A | 6/1988 | Denekamp et al. |
| 4,774,504 A | 9/1988 | Hartings |
| 4,792,796 A | 12/1988 | Bradshaw et al. |
| 4,807,140 A | 2/1989 | Saulnier |
| 4,812,811 A | 3/1989 | Asbrink et al. |
| 4,818,855 A | 4/1989 | Mongeon et al. |
| 4,821,291 A | 4/1989 | Stevens et al. |
| 4,857,893 A | 8/1989 | Carroll |
| 4,879,756 A | 11/1989 | Stevens et al. |
| 4,922,261 A | 5/1990 | O'Farrell |
| 4,937,586 A | 6/1990 | Stevens et al. |
| 4,961,028 A | 10/1990 | Tanaka |
| 5,012,236 A | 4/1991 | Troyk et al. |
| 5,053,774 A | 10/1991 | Schuermann et al. |
| 5,099,227 A | 3/1992 | Geiszler et al. |
| 5,103,234 A | 4/1992 | Watkins et al. |
| 5,129,519 A | 7/1992 | David et al. |
| 5,151,684 A | 9/1992 | Johnsen |
| 5,170,172 A | 12/1992 | Weinstein |
| 5,177,432 A | 1/1993 | Waterhouse et al. |
| 5,202,680 A * | 4/1993 | Savage ................ 340/853.1 |
| 5,241,286 A | 8/1993 | Mirow |
| 5,241,923 A * | 9/1993 | Janning ................ 119/721 |
| 5,245,534 A | 9/1993 | Waterhouse et al. |
| 5,252,962 A | 10/1993 | Urbas et al. |
| 5,260,694 A | 11/1993 | Remahl |
| 5,262,772 A | 11/1993 | Urbas et al. |
| 5,317,309 A | 5/1994 | Vercellotti et al. |
| 5,351,052 A | 9/1994 | D'Hont et al. |
| 5,374,815 A | 12/1994 | Waterhouse et al. |
| 5,485,154 A * | 1/1996 | Brooks et al. ................ 342/44 |
| 5,485,166 A | 1/1996 | Verma et al. |
| 5,517,188 A | 5/1996 | Carroll et al. |
| 5,519,381 A | 5/1996 | Marsh et al. |
| 5,532,465 A | 7/1996 | Waterhouse et al. |
| 5,532,686 A | 7/1996 | Urbas et al. |
| 5,543,780 A | 8/1996 | McAuley et al. |
| 5,591,951 A | 1/1997 | Doty |
| 5,682,143 A | 10/1997 | Brady et al. |
| 5,686,902 A | 11/1997 | Reis et al. |
| 5,774,053 A | 6/1998 | Porter |
| 5,875,434 A | 2/1999 | Matsuoka et al. |
| 5,920,287 A | 7/1999 | Belcher et al. |
| 5,920,576 A | 7/1999 | Eaton et al. |
| 5,929,779 A | 7/1999 | MacLellan et al. |
| 5,969,595 A | 10/1999 | Schipper et al. |
| 5,995,019 A | 11/1999 | Chieu et al. |
| 6,008,727 A | 12/1999 | Want et al. |
| 6,025,780 A | 2/2000 | Bowers et al. |
| 6,027,027 A | 2/2000 | Smithgall |
| 6,054,924 A | 4/2000 | Dames et al. |
| 6,084,513 A | 7/2000 | Stoffer |
| 6,091,319 A | 7/2000 | Black et al. |
| 6,104,281 A | 8/2000 | Heinrich et al. |
| 6,127,917 A | 10/2000 | Tuttle |
| 6,127,928 A | 10/2000 | Issacman et al. |
| 6,127,976 A | 10/2000 | Boyd et al. |
| 6,164,130 A | 12/2000 | Pabst et al. |
| 6,164,551 A | 12/2000 | Altwasser |
| 6,176,433 B1 | 1/2001 | Uesaka et al. |
| 6,195,006 B1 | 2/2001 | Bowers et al. |
| 6,208,235 B1 | 3/2001 | Trontelj |
| 6,222,452 B1 | 4/2001 | Ahlstrom et al. |
| 6,236,911 B1 | 5/2001 | Kruger |
| 6,280,544 B1 | 8/2001 | Fox et al. |
| 6,294,997 B1 | 9/2001 | Paratore et al. |
| 6,297,734 B1 | 10/2001 | Richardson et al. |
| 6,318,636 B1 | 11/2001 | Reynolds et al. |
| 6,323,782 B1 | 11/2001 | Stephens et al. |
| 6,329,944 B1 | 12/2001 | Richardson et al. |
| 6,335,688 B1 | 1/2002 | Sweatte |
| 6,354,493 B1 | 3/2002 | Mon |
| 6,373,389 B1 | 4/2002 | Przygoda et al. |
| 6,377,203 B1 | 4/2002 | Doany |
| 6,452,340 B1 | 9/2002 | Morrissey et al. |
| 6,496,806 B1 | 12/2002 | Horwitz et al. |
| 6,512,457 B2 | 1/2003 | Irizarry et al. |
| 6,512,478 B1 | 1/2003 | Chien |
| 6,543,491 B1 | 4/2003 | Chung |
| 6,563,417 B1 | 5/2003 | Shaw et al. |
| 6,566,997 B1 | 5/2003 | Bradin |
| 6,584,301 B1 | 6/2003 | Bohn et al. |
| 6,593,845 B1 | 7/2003 | Friedman et al. |
| 6,608,551 B1 | 8/2003 | Anderson et al. |
| 6,624,752 B2 | 9/2003 | Klitsgaard et al. |
| 6,662,078 B1 | 12/2003 | Hardgrave et al. |
| 6,696,954 B2 | 2/2004 | Chung |
| 6,700,491 B2 | 3/2004 | Shafer |
| 6,705,522 B2 | 3/2004 | Gershman et al. |
| 6,720,883 B2 | 4/2004 | Kuhr et al. |
| 6,724,308 B2 | 4/2004 | Nicholson |
| 6,738,628 B1 | 5/2004 | McCall et al. |
| 6,745,027 B2 | 6/2004 | Twitchell, Jr. |
| 6,750,771 B1 | 6/2004 | Brand |
| 6,900,731 B2 | 5/2005 | Kreiner et al. |
| 6,927,687 B2 | 8/2005 | Carrender |
| 6,952,157 B1 | 10/2005 | Stewart et al. |
| 6,989,764 B2 * | 1/2006 | Thomeer et al. ............ 340/853.2 |
| 6,992,566 B2 | 1/2006 | Striemer |
| 7,000,692 B2 * | 2/2006 | Hosie et al. ................ 166/66 |
| 7,023,356 B2 | 4/2006 | Burkhardt et al. |
| 7,028,861 B2 | 4/2006 | Sayers et al. |
| 7,034,683 B2 | 4/2006 | Ghazarian |
| 7,044,373 B1 | 5/2006 | Garber et al. |
| 7,049,963 B2 | 5/2006 | Waterhouse et al. |
| 7,084,769 B2 | 8/2006 | Bauer et al. |
| 7,088,245 B2 | 8/2006 | Guntersdorfer et al. |
| 7,089,099 B2 | 8/2006 | Shostak et al. |
| 7,098,794 B2 | 8/2006 | Lindsay et al. |
| 7,098,856 B2 | 8/2006 | Okado |
| 7,103,460 B1 | 9/2006 | Breed |
| 7,138,920 B2 | 11/2006 | Nyfelt |
| 7,159,654 B2 * | 1/2007 | Ellison et al. ............ 166/250.01 |
| 7,161,476 B2 | 1/2007 | Hardman et al. |
| 7,164,359 B2 | 1/2007 | Waterhouse et al. |
| 7,191,932 B2 | 3/2007 | Fobbe et al. |
| 7,193,515 B1 | 3/2007 | Roberts et al. |
| 7,215,976 B2 | 5/2007 | Brideglall |
| 7,242,301 B2 | 7/2007 | August et al. |
| 7,256,695 B2 | 8/2007 | Hamel et al. |
| 7,327,250 B2 | 2/2008 | Harvey |
| 7,675,422 B2 | 3/2010 | Stevens et al. |
| 2001/0048361 A1 | 12/2001 | Mays et al. |
| 2002/0041235 A1 | 4/2002 | Van Horn et al. |
| 2002/0111819 A1 | 8/2002 | Li et al. |
| 2002/0133942 A1 * | 9/2002 | Kenison et al. ............ 29/841 |
| 2003/0055689 A1 | 3/2003 | Block et al. |
| 2003/0174099 A1 | 9/2003 | Bauer et al. |
| 2003/0214389 A1 | 11/2003 | Arneson et al. |
| 2004/0053584 A1 * | 3/2004 | Mickle et al. ............ 455/130 |
| 2004/0053641 A1 | 3/2004 | Leung et al. |
| 2004/0066366 A1 | 4/2004 | Jung et al. |
| 2004/0069849 A1 | 4/2004 | Stevens et al. |
| 2004/0134620 A1 | 7/2004 | Soeborg |
| 2004/0149822 A1 | 8/2004 | Stevens et al. |
| 2004/0176032 A1 | 9/2004 | Kotola et al. |

(56) References Cited

U.S. PATENT DOCUMENTS

| | | |
|---|---|---|
| 2004/0205350 A1 | 10/2004 | Waterhouse et al. |
| 2004/0217865 A1 | 11/2004 | Turner |
| 2004/0233054 A1 | 11/2004 | Neff et al. |
| 2005/0029345 A1 | 2/2005 | Waterhouse et al. |
| 2005/0043850 A1 | 2/2005 | Stevens et al. |
| 2005/0043886 A1 | 2/2005 | Stevens et al. |
| 2005/0083213 A1 | 4/2005 | Stevens et al. |
| 2005/0086983 A1 | 4/2005 | Stevens et al. |
| 2005/0149226 A1 | 7/2005 | Stevens et al. |
| 2005/0200453 A1 | 9/2005 | Turner et al. |
| 2005/0205817 A1 | 9/2005 | Marcichow et al. |
| 2005/0251330 A1 | 11/2005 | Waterhouse et al. |
| 2006/0086498 A1* | 4/2006 | Wetzel et al. ............ 166/250.12 |
| 2006/0124662 A1 | 6/2006 | Reynolds et al. |
| 2006/0128023 A1 | 6/2006 | Waterhouse et al. |
| 2006/0164232 A1 | 7/2006 | Waterhouse et al. |
| 2006/0232417 A1 | 10/2006 | August et al. |
| 2006/0281435 A1* | 12/2006 | Shearer et al. ............. 455/343.1 |
| 2007/0023185 A1* | 2/2007 | Hall et al. .................. 166/255.1 |
| 2009/0182207 A1 | 7/2009 | Riskey et al. |
| 2010/0187832 A1 | 7/2010 | Holland et al. |

FOREIGN PATENT DOCUMENTS

| | | |
|---|---|---|
| WO | 9608760 | 3/1996 |
| WO | 9831608 | 7/1998 |
| WO | 02071382 | 9/2002 |
| WO | 03094106 | 11/2003 |
| WO | 2006014666 | 2/2006 |
| WO | 2006035401 | 4/2006 |

OTHER PUBLICATIONS

Cardullo, M. "RFID pioneers discuss its origins", The Mercury News, Sun, Jul. 18, 2004.

Kirsner, S. "Radio Tags are Falling Off the Fast Track," The Boston Globe, May 31, 2004, p. 1.

Feder, B. "Despite Wal-Mart's Edict, Radio Tags Will Take Time," The New York Times, Dec. 27, 2004.

EPCglobal, Web Page Tag Specifications, Jan. 2005.

IEEE-USA, "The State of Radio Frequency Identification (RFID) Implementation and Its Policy Implications," Nov. 21, 2005, pp. 136.

Food and Drug Administration, "Radio Frequency Identification Feasibility Studies and Pilot Programs for Drugs," Guidance for FDA Staff and Industry, Compliance Policy Guides, Sec 400.210, Nov. 2004.

Lindsay, J. et al. "Cascading RFID Tags", Nov. 7, 2003, pp. 1-10.

* cited by examiner

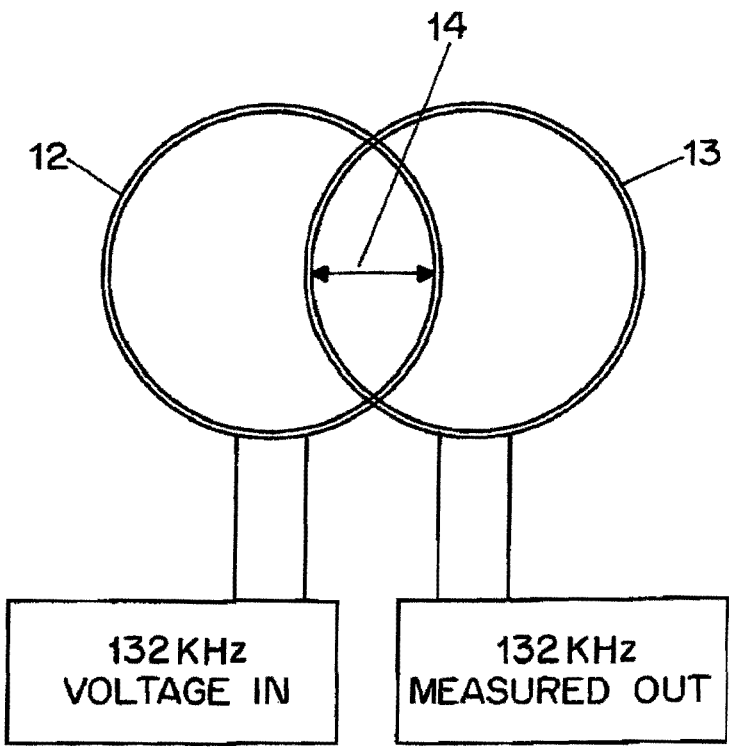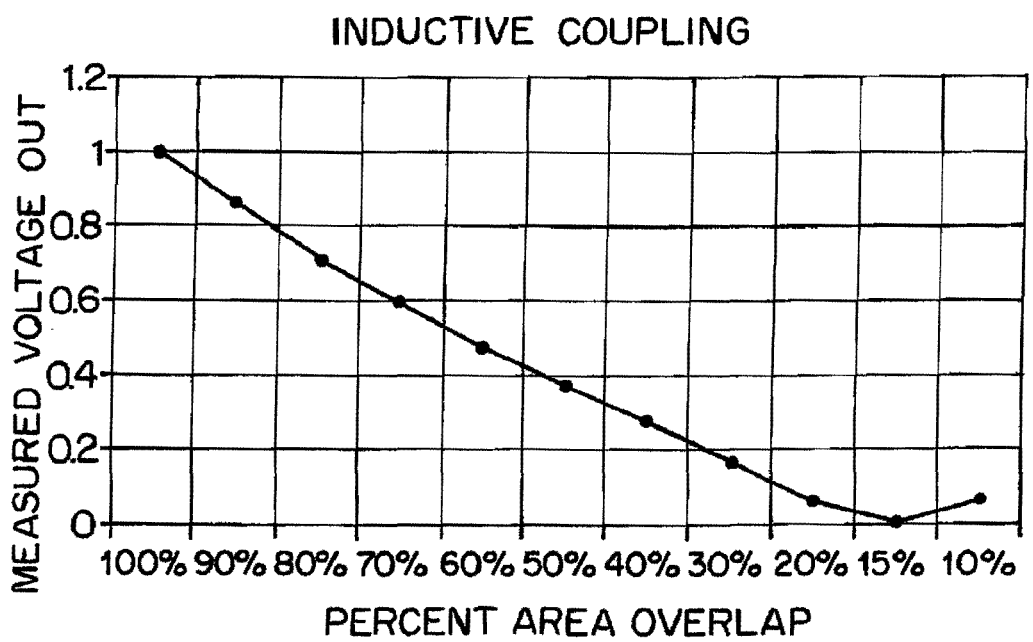
FIG. 5

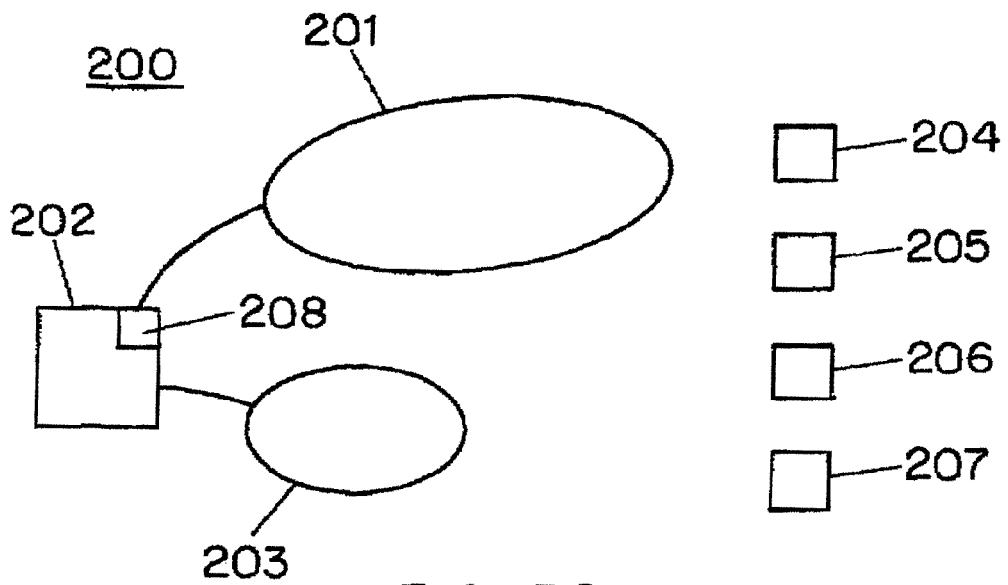
FIG. 32
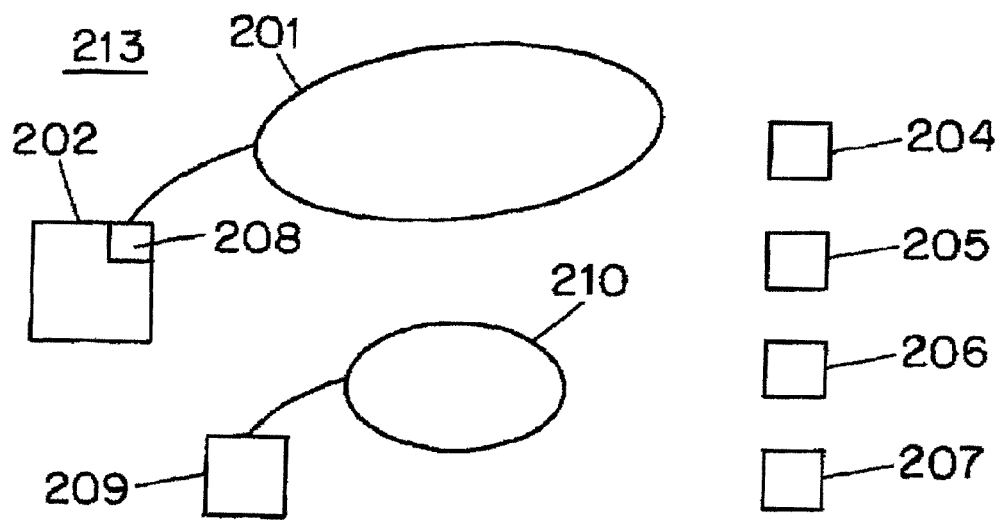
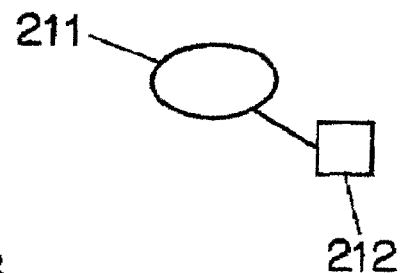
FIG. 33

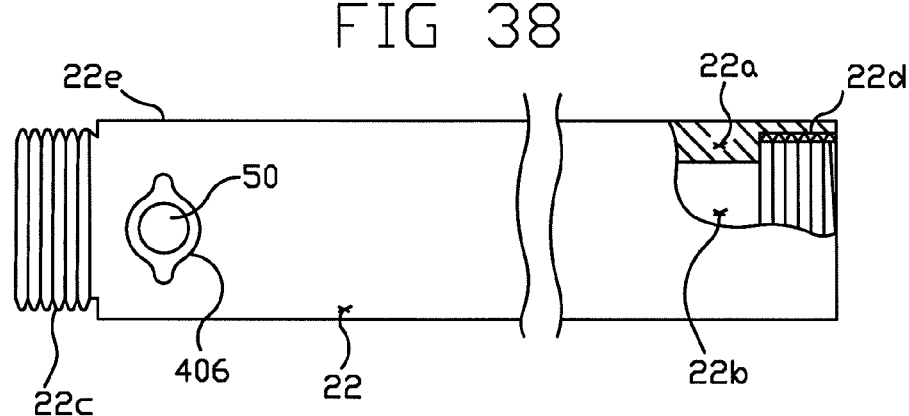
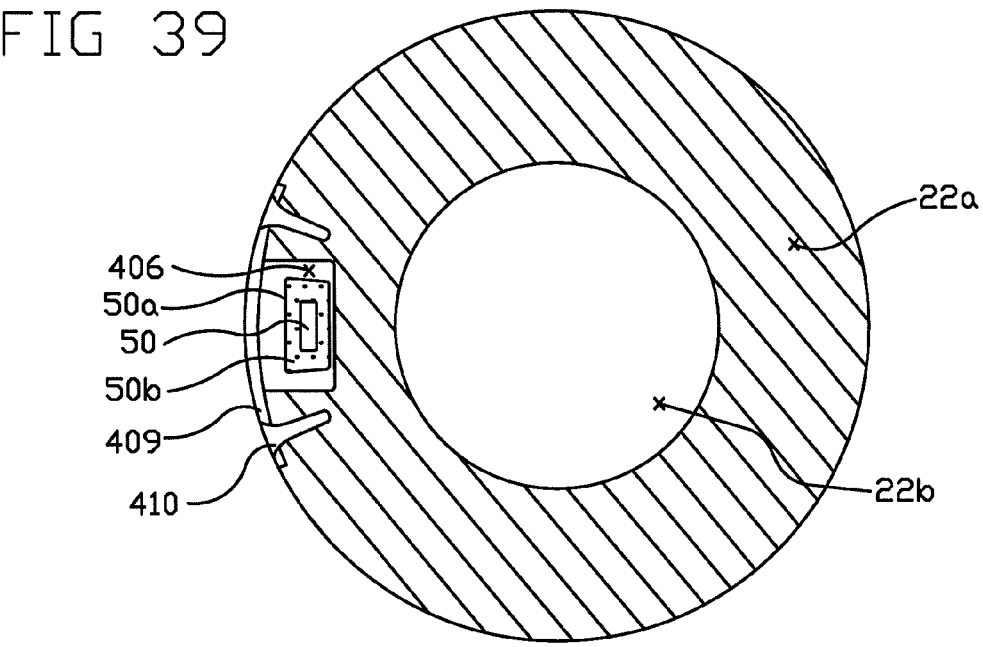

LOW FREQUENCY INDUCTIVE TAGGING FOR LIFECYCLE MANAGEMENT

CROSS-REFERENCE TO RELATED APPLICATIONS

The present application is a continuation-in-part of U.S. patent application Ser. No. 12/720,401 filed Mar. 9, 2010 and is also a continuation-in-part of U.S. patent application Ser. No. 12/848,772 filed Aug. 2, 2010, which is a continuation-in-part of U.S. patent application Ser. No. 12/719,352 filed Mar. 8, 2010. Both U.S. patent application Ser. No. 12/720,401 and U.S. patent application Ser. No. 12/719,352 are continuations-in-part of U.S. patent application Ser. No. 11/677,037 filed Feb. 20, 2007, now U.S. Pat. No. 7,675,422, which is a continuation-in-part of U.S. patent application Ser. No. 11/461,443 filed Jul. 31, 2006, now U.S. Pat. No. 7,277,014 (issued Oct. 2, 2007), which is a continuation-in-part of U.S. patent application Ser. No. 11/276,216 filed Feb. 17, 2006, now U.S. Pat. No. 7,164,359 (issued Jan. 16, 2007), which is a continuation of U.S. patent application Ser. No. 10/820,366 filed Apr. 8, 2004, now U.S. Pat. No. 7,049,963 (issued May 23, 2006), which claims the benefit of U.S. Patent Application No. 60/461,562 filed Apr. 9, 2003. This application is also a continuation-in-part of U.S. application Ser. No. 11/639,857 filed Dec. 15, 2006, which claims the benefit of U.S. Patent Application No. 60/744,524 filed Apr. 10, 2006. All of these applications are incorporated herein by reference for all purposes.

FIELD OF THE INVENTION

This invention relates to detecting and tracking of animate and inanimate objects, such as hollow pipes used in drilling for oil and gas ("drillpipes") by use of novel passive low radio frequency wireless tags. It also relates to drilling systems, apparatuses, and methods that utilize the novel tags, as well as the novel tags, their components, and drillpipes that are equipped with such tags.

BACKGROUND OF THE INVENTION

Radio Frequency Identity tags or RFID tags have a long history and have in recent times RFID has become synonymous with "passive backscattered transponders". Passive transponders obtain power and a clock reference via a carrier and communicate by detuning an antenna, often with a fixed pre-programmed ID. These tags are designed to replace barcodes and are capable of low-power two-way communications. Much of the patent literature surrounding these radio tags and RFID tags as well as the published literature uses terminology that has not been well defined and can be confusing. We provide a glossary of words and concepts as used within this patent application:

Radio Tag—Any telemetry system that communicates via magnetic (inductive communications) or electric radio communications, to a base station or reader or to another radio tag.

Passive Radio Tag—A radio tag that does not contain an energy storage device, such as a battery.

Active Radio Tag—A radio tag that does contain a battery, or other energy storage device.

Transponder Tag—A radio tag that requires a carrier wave from an interrogator or base station to activate transmission or other function. The carrier is typically used to provide both power and a time-base clock, only typically at high frequencies.

Non-Radiating Transponder Tag—A radio tag that may be active or passive and communicates via de-tuning or changing the tuned circuit of the tag's transmitting antenna or coil. It does not induce power into a transmitting antenna or coil.

Radiating Transponder Tag—A radio tag or transponder that may be an active or passive tag, but communicates to the base station or interrogator by transmitting a radiated detectable electromagnetic signal by way of an antenna. The radio tag induces power into a transmitting antenna for its data transmission to an antenna of an interrogating reader.

Back-Scattered Transponder Tag—Synonymous with "Non-Radiating Transponder Tag". It communicates by de-tuning the tag's transmitting antenna and does not induce or radiate power in that antenna.

Transceiver—A device that includes the functions of both a transmitter (actively transmits data to an antenna) and a receiver (actively receives data from an antenna), whether or not these combined functions entail a sharing of common circuitry or parts, as in an integrated circuit ("IC") microelectronic device or "chip".

Transceiver Tag—A radiating radio tag that actively receives digital data and actively transmits data by providing power to an antenna. The tag may be active or passive.

Passive Transceiver Tag—A radiating radio tag that actively receives data signals and actively transmits data signals by providing power to the tag's antenna, but does not have a battery and in most cases does not have a crystal or other time-base source.

Active Transceiver Tag—A radiating radio tag that actively receives digital data and actively transmits data by providing power to the tag's transmitting antenna, and has a battery and in most cases a crystal or other internal time base source.

Inductive Mode—Uses low frequencies, 3-30 kHz ULF or the Myriametric frequency range, 30-300 kHz LF the Kilometric range, with some in the 300-3000 kHz, MF or Hectometric range (usually under 450 kHz). Since the wavelength is so long at these low frequencies over 99% of the radiated energy is magnetic as opposed to a radiated electric field. Antennas are significantly (10 to 1000 times) smaller than the ¼ wave length or 1/10 wave length that would be required to radiate an electrical field efficiently.

Electromagnetic Mode—As opposed to Inductive mode radiation above, uses frequencies above 3000 kHz, the Hectometric range typically 8-900 MHz where the majority of the radiated energy generated or detected may come from the electric field. A ¼ wavelength or 1/10 wavelength antenna or design is often possible and is used. The majority of such radiated and detected energy is an electric field.

Data Processor—Synonymous with the terms Microprocessor and Programmed Data Processor, and include a combination of electronic circuits that act to process input data into output data. Often, a Data Processor can be programmed (by firmware or hardwired circuitry) to process data, such as data received from or sent to a tag transceiver, or data from sensors, and the processor may control the selection of timing and choices of storage and of destination addresses for output data results in dependence upon the specific intended functioning of a tag tracking system and its features, such as tag-to-tag ("peer-to-peer") signalling.

Reader Data Processor—A data processor that is sometimes also called a Central Data Processor, a "server", a "controller", or a Field Data Processor, which processes data signals being exchanged with tags within range of a field communication inductive antenna.

The term "axis", with regard to a loop (inductive) antenna, is a line which is centrally disposed to the loop(s) of the antenna and oriented perpendicular to the plane(s) of such loop(s).

The term "substantially orthogonal", with regard to two lines, means that such two lines are oriented at an angle of over 45 degrees and up to 90 degrees with respect to each other.

Energization Inductive Antenna—Synonymous with a Power Coil Antenna for receiving (tags) and radiating (reader/interrogator), for both tag antennas as well as field antennas of a reader/interrogator.

Communication Inductive Antenna—Synonymous with a Data Antenna, for receiving/transmitting data (both tags and reader interrogator) for both tag antennas as well as field antennas of a reader/interrogator.

Many of the patents which are referenced below do not make many distinctions outlined in the above glossary and their authors may not at that time been fully informed about the functional significance of the differences outlined above. For example, many of the early issued patents (e.g., U.S. Pat. Nos. 4,724,427; 4,857,893; 3,739,376; 4,019,181) do not specify the frequency for the preferred embodiment yet it has become clear to the present inventors that dramatic differences occur in performance and functional ability depending on the frequency. The frequency will change the radio tag's ability to operate in harsh environments, near liquids, or conductive materials, as well as the tag's range and power consumption and battery life.

One of the first references to a radio tag in the patent literature is a passive radiating transponder tag described in U.S. Pat. No. 3,406,391: Vehicle Identification System, issued in 1968. The device was designed to track moving vehicles. U.S. Pat. No. 3,406,391 teaches that a carrier signal may be used both to communicate to a radio tag as well as provide power. The tags were powered using microwave frequencies and many subcarrier frequencies were transmitted to the tag. The radio tag was programmed to pre-select several of the subcarriers and provided an active re-transmission back when a subcarrier message correspond to particular pre-programmed bits in the tag. This multifrequency approach limited data to about five bits to eight bits and the range of the devices was limited to only a few inches.

U.S. Pat. No. 3,541,257: Communication Response Unit, issued in 1970, further teaches that a digital address may be transmitted and detected to activate a radio tag. The radio tag may be capable of transmitting and receiving electromagnetic signals with memory and the radio tag may work within a full addressable network and has utility in many areas. Many other similar devices were described in the following years (e.g., The Mercury News, RFID pioneers discuss its origins, Sun, Jul. 18, 2004).

U.S. Pat. No. 3,689,885: Inductively Coupled Passive Responder and Interrogator Unit Having Multidimension Electromagnetic Field Capabilities, issued in 1972 and U.S. Pat. No. 3,859,624: Inductively Coupled Transmitter-Responder Arrangement, also issued in 1972, teach that a passive radiating digital radio tag may be powered and activated by induction using low frequencies (50 kHz) and transmit coded data back modulated at higher frequency (450 kHz) to an integrator. They also teach that the clock and 450 kHz transmitting carrier from the radio tag may be derived from the 50 kHz induction power carrier. The named inventors propose the use of a ceramic filter to multiply the 50 kHz signal nine times to get a frequency regeneration for the 450 kHz data-out signal. These two patents also teach that steel and other conductive metals may detune the antennas and degrade performance. The ceramic filter required to increase the frequency from 50 kHz to a high frequency is, however, an expensive large external component, and phase-locked loops or other methods commonly used to multiply a frequency upward would consume considerable power. These tags use a low frequency "power channel" to power the tag, to serve as the time base for the tag, and finally to serve as the trigger for the tag to transmit its ID. Thus, the power channel contains a single bit of on/off information.

This is shown in FIG. 2 of U.S. Pat. No. 3,689,885, where the active low frequency transceiver tag consists of four basic components: the antenna 76, typically a wound loop or coil, that has been tuned to low frequency (50 kHz); a ceramic filter 62 to multiply the low frequency up to a higher frequency (e.g., 450 kHz); some logic circuitry; and storage means 66 to generate an active signal that drives an antenna 76 and transmits the tag's ID.

In contrast, as will be described in detail below, the present invention uses the carrier (at a second frequency) only as a power source and time-base generator. It does not necessarily use the carrier to trigger the automatic transmission of the ID. In the present invention, the microprocessor of the novel is able to process data received on a receiver/transceiver at a first frequency and cause its transmission at that first frequency and at a time and in a form that are independent of the received carrier (power) second frequency signal. This makes it possible for the tag to use half-duplex protocol which permits the tag to be written and read by an active radiating tag.

U.S. Pat. No. 3,713,148: Transponder Apparatus and System, issued in 1973, teaches that the carrier to the transponder may also transmit digital data and that the interrogation means (data input) may also be used to power the transponder. This patent also teaches that nonvolatile memory may be added to store data that might be received and to track things like use and costs for tolls. The inventors do not specify or provide details on frequency or antenna configurations.

The devices referenced above all rely on the antenna in radiating transceiver mode, where the power from the radio tag is actually "pumped" into a tuned circuit that includes a radiating antenna, which in turn produces an electromagnetic signal that can be detected at a distance by an interrogator.

U.S. Pat. No. 3,427,614: Wireless And Radioless (Nonradiant) Telemetry System For Monitoring Conditions, issued in 1969, was among the first to teach that the radio tag antenna may communicate simply by detuning the antenna rather than radiating power through the tuned antenna. The change in tuned frequency may be detected by a base-station generating a carrier. This non-radiating mode reduces the power required to operate a tag and puts the detection burden on the base station. In effect the radio tag's antenna becomes part of a tuned circuit created by the combination of the base-station, and a carrier. Any change in the radio tag's tuned frequency by any means can be detected by the base-station's tuned carrier circuit. This is also often referred to as a back-scattered mode and is the basis for most modern RF-ID radio tags.

Many Electronic Article Surveillance (EAS) systems also function using this backscattered non-radiating mode (U.S. Pat. No. 4,774,504, 1988; U.S. Pat. No. 3,500,373, 1970; U.S. Pat. No. 5,103,234: Electronic Article Surveillance System, 1992) and most are also inductive frequencies. Many other telemetry systems in widespread use for pacemakers, implantable devices, and sensors in rotating centrifuges (U.S. Pat. No. 3,713,124: Temperature Telemetering Apparatus, 1973) also make use of this backscattered mode to reduce power consumption. U.S. Pat. No. 4,361,153: Implant Telemetry System, 1982, teaches that low frequencies (Myriametric) can transmit though conductive materials and work in harsh environments. Most of these implantable devices also use backscattered communication mode for communication to conserve battery power.

Thus, more recent and modern RF-ID tags are passive, backscattered transponder tags and have an antenna consisting of a wire coil or an antenna coil etched or silk-screened onto a PC board (see, e.g., U.S. Pat. No. 4,857,893: Single Chip Transponder Device, 1989; U.S. Pat. No. 5,682,143: Radio Frequency Identification tag, 1997). These tags use a carrier that is reflected back from the tag. The carrier is used by the tag for four functions. First, the carrier contains the incoming digital data stream signal; in many cases the carrier only performs the logical function to turn the tag on/off and to activate the transmission of its ID. In other cases the data may be a digital instruction. Second, the carrier serves as the tag's power source. The tag receives a carrier signal from a base station and uses the rectified carrier signal to provide power to the integrated circuitry and logic on the tag. Third, the carrier serves as a clock and time base to drive the logic and circuitry within the integrated circuit. In some cases the carrier signal is divided to produce a lower clock speed. Fourth, the carrier may also in some cases serve as a frequency and phase reference for radio communications and signal processing. The tag can use one coil to receive a carrier at a precise frequency and phase reference for the circuitry within the radio tag for communications back through a second coil to the reader/writer making accurate signal processing possible. (U.S. Pat. No. 4,879,756: Radio Broadcast Communication Systems, 1989).

Thus, the main advantage of a passive backscattered transponder is that it eliminates the battery as well as a crystal in LF tags. HF and UHF tags are unable to use the carrier as a time base because the speed would require high speed chips and power consumption would be too high. It is therefore generally assumed that a passive backscattered transponder tag is less costly than an active or transceiver tag since it has fewer components and is less complex.

These modern non-radiating, transponder backscattered RFID tags typically operate at frequencies within the Part 15 rules of the FCC (Federal Communication Commission) between 10 kHz to 500 kHz (Low Frequency, "LF" or Ultra Low Frequency, "ULF"), 13.56 MHz (High Frequency, "HF") or 433 MHz (MHF) and 868/915 MHz or 2.2 GHz (Ultra High Frequency, "UHF"). The higher frequencies are typically chosen because they provide high bandwidth for communications, on a high-speed conveyor for example, or where many thousands of tags must be read rapidly. In addition, it is generally believed that the higher frequencies are more efficient for transmission of signals and require much smaller antennas for optimal transmission. It may be noted that a self-resonated antenna for 915 MHz can have a diameter as small as 0.5 cm and may have a range of tens of feet.

U.S. Pat. No. 4,818,855: Identification System, 1989; U.S. Pat. No. 5,099,227: Proximity Detecting Apparatus, 1992 teaches that a low frequency (e.g., 400 kHz) inductive power coil may be used to efficiently power an integrated circuit, and divide the frequency by 2 to drive an electrostatic antenna. The patent proposes to use an inductive antenna (loop) for power and an electrostatic antenna plate for data communication, and use a faraday cage to block crosstalk between the two antennas (see below). They also propose that a separate high frequency carrier can be added to make the separate electrostatic data channel operate a much higher frequency (4 MHz). The patent proposes that the two antennas (low frequency inductive power coil, and higher frequency electrostatic plate) be isolated by a faraday cage consisting of aluminum foil wrapped around the low frequency inductive loop. The inventors state that any attempt to make a device that is totally inductive (two inductive coils, or one) could only be accomplished by using the data coil in transponder mode or backscattered mode with a Q change in the data channel antenna, as opposed to transceiver mode where an active signal is transmitted back from the tag's antenna (see U.S. Pat. No. 5,099,227, lines 2-14). By contrast, the present invention solves that problem and teaches how to both power a tag with radio frequency energy by using an inductive energization coil antenna and to transmit data signals inductively in transceiver mode from a second inductive communication antenna.

The major disadvantage of the prior art backscattered mode radio tag, is that it has limited power, limited range, and is susceptible to noise and reflections over a radiating active device. This is not because of loss of communication signal but instead is largely because the passive tag requires a minimum of 1 volt on its antenna to power the chip. As a result many backscattered tags do not work reliably in harsh environments and require a directional "line of sight" antenna. A typical inductive (LF) backscattered tag has a range of only 8 to 12 inches.

One proposed method to extend the range of a passive backscattered tag has been to add a thin flat battery to the battery of the backscattered tag so that the power drop on the antenna is not the critical range limiting factor. However, since all of these tags use high frequencies the tags must continue to operate in backscattered mode to conserve battery life. The power consumed by any electronic circuit tends to increase with the frequency of operation. Thus, if a chip were to use an industry standard 280 mAh capacity CR2525 Li cell (which is the size of a US quarter) we would expect battery life based solely on operating frequency to be:

| FREQUENCY | POWER (uAHr) | PREDICTED LIFE |
| --- | --- | --- |
| 128 kHz | 1 | 31.00 years |
| 13.56 MHz | 102 | 3.78 months |
| 915 MHz | 7,031 | 1.66 days |

Thus, most recent active RFID tags that may have a battery to power the tag circuitry, such as active tags and devices operating in the 13.56 MHz to 2.3 GHz frequency range, also work as backscattered transponders (U.S. Pat. No. 6,700,491: Radio Frequency Identification Tag with Thin-Film Battery for Antenna, 2004; also see U.S. Patent Application Publication No. 2004/0217865: RFID Tag for detailed overview of issues). Because these tags are active backscattered transponders they cannot work in an on-demand peer-to-peer network setting, and they require line-of-sight antennas that provide a carrier that "illuminates" an area or zone or an array of carrier beacons.

Active radiating transceiver tags in the high-frequency range (433 MHz) that can provide on-demand peer-to-peer network of tags are available (e.g., SaviTag ST-654, U.S. Pat. No. 5,485,166: Efficient Electrically Small Loop Antenna with a Planar Base Element, 1996) and full visibility systems described above (U.S. Pat. Nos. 5,686,90; 6,900,731). These tags do provide full functionality and what might be called Real-Time Visibility, but they are expensive (over $100.00 US) and large (videotape size, 6¼ inch by 2⅛ inch by 1⅛ inch) because of the power issues described above and must use replaceable batteries since even with such a 1.5 inch by 6 inch Li battery these tags are only capable of 2,500 reads and writes.

It is also generally assumed that an HF or UHF passive backscattered transponder radio tags will have a lower cost-to-manufacture as compared with an LF passive backscattered transponder because of the antenna. An HF or UHF tag can obtain a high-Q $\frac{1}{10}$-wavelength antenna by etching or use of conductive silver silk-screening the antenna geometry onto a flexi circuit. An LF or ULF antenna cannot use either because the Q will be too low due to high resistance of the traces or silver paste. So LF and ULF tags must use wound coils made of copper.

Thus, in summary a passive transponder tag has the potential to lower cost by eliminating the need for a battery as well as an internal frequency reference means. An active backscattered transponder tag eliminates the extra cost of a crystal but also provides for enhanced amplification of signals over a passive backscattered transponder and enhanced range. In addition, it is also possible to use a carrier reference to provide enhanced anti-collision methods so as to make it possible to read many tags within a carrier field (U.S. Pat. Nos. 6,297,734; 6,566,997; 5,995,019; 5,591,951). Finally active radiating transceiver tags require large batteries, are expensive and may cost tens to hundreds of dollars.

A second major area of importance to this invention is the use of two co-planar antennas in radio tags placed in such a way as to inductively decouple the antennas from each other so they may be independently tuned. U.S. Pat. No. 2,779,908: Means for Reducing Electro-Magnetic Coupling, 1957, teaches that electromagnetic coupling of two co-planar air-core coils may be minimized by shifting the coils as well as placing a neutralizing shorted coil inside the area of the two coils. U.S. Pat. No. 4,922,261: Aerial Systems, 1990, teaches that this may be used in a passive transponder tag in that two frequencies and two antennas may be used, one for transmitting data and a second for receiving data thereby providing double the communication speed with full-duplex data transfers. U.S. Pat. No. 5,012,236: Electromagnetic Energy Transmission and Detection Apparatus, 1991, makes use of decoupled coils to enhance range and minimize sensitivity to angles. FIG. 2 shows the arrangement and method to decouple two antennas described by U.S. Pat. No. 4,922,261. In this case one antenna is used for transmitting data, and the second is used for receiving data. The antenna arrangement makes it possible to have two data communication frequencies so the tag can communicate with a full-duplex protocol.

U.S. Pat. No. 6,584,301: Inductive Reader Device and Method with Integrated Antenna and Signal Coupler, 2003, also discloses a co-planar geometry that minimizes coupling between two coils. The purpose was to enable a two-frequency full-duplex mode of communication to enhance communications speed. In most cases the speed of communication is not a critical issue in visibility systems and other applications described below. FIG. 3 shows this coil arrangement to decouple two antennas. Coil 6 is shifted in the same plane from coil 5. The primary purpose disclosed in the prior art is to provide higher data communication speeds between tag and the base station.

U.S. Pat. No. 6,176,433: Reader/Writer Having Coil Arrangements to Restrain Electromagnetic Field Intensity at a distance, 2001, makes use of a co-planar coil to enhance range of a backscattered transponder tag used as a IC card and using a 13.56 MHz carrier. The isolated antennas may be used to communicate to the tag and to maximize power required to transmit to the tag under within the limits of the Wireless Communications Act.

Many publications and patents teach the advantages of using RFID tags for tracking products in warehouses, packages, etc. In some cases passive transponders may be used but additional location and automated systems may be required for the base-station (e.g., U.S. Pat. No. 6,705,522: Mobile Object Tracker, 2004). However, most investigators now recognize that a fully integrated peer-to-peer on-demand network approach using active radio tags has many functional advantages in these systems over a system (U.S. Pat. No. 6,705,522: Mobile Object Tracker, 2004; U.S. Pat. No. 6,738,628: Electronic Physical Asset Tracking, 2004; U.S. Patent Application Publication No. 2002/0111819: Supply Chain Visibility for Real-Time Tracking of Goods; U.S. Pat. No. 6,900,731: Method for Monitoring and Tracking Objects, 2005; U.S. Pat. No. 5,686,902: Communication System for Communicating with Tags, 1997; U.S. Pat. No. 4,807,140: Electronic Label Information Exchange System, 1989). One of the major disadvantages of a passive nonradiating system is that it requires the use of handheld readers or portals to read tags and changes in process control (e.g., U.S. Pat. No. 6,738,628: Electronic Physical Asset Tracking, 2004). A system that provides data without process change and without need to carry out portal reads is more likely to be successful as a visibility system.

It will also be appreciated that the prior art has assumed low frequency tags to be slow, short range, and too costly. For example, both U.S. Pat. Nos. 5,012,236 and 5,686,902 discuss the short-range issues associated with magnetic induction and low frequency tags. Because of the supposed many apparent disadvantages of ULF and LF, the RF-ID frequencies now recommended by many commercial (Item-Level Visibility In the Pharmaceutical Supply Chain: A Comparison of HF, UHF RFID Technologies, July 2004, Texas Instruments, Phillips Semiconductors, and TagSys Inc.), government organizations (see Radio Frequency Identification Feasibility Studies and Pilot, FDA Compliance Policy HFC-230, Sec 400.210, November, 2004, recommend use of LF, HF or UHF) as well as standards associations (EPCglobal, web page tag specifications, January 2005, note LF and ULF are excluded) do not mention or discuss the use of ULF as an option in many important retail applications. Many of the commercial organizations recommending these higher frequencies believe that passive and active radio tags in these low frequencies are not suitable for any of these applications for reasons given above.

In addition, several commercial companies actually manufacture both ULF and LF radio tags (e.g. both Texas Instruments and Philips Semiconductor. See Item-Level Visibility In the Pharmaceutical Supply Chain: A Comparison of HF, UHF RFID Technologies, July 2004, Texas Instruments, Phillips Semiconductors, and TagSys Inc.) yet only recommend the use of 13.56 MHz or higher again because of the perceived disadvantage of ULF and LF outlined above, and the many perceived advantages of HF and UHF).

In sum, system designers for modern applications have chosen not to use LF radio tags because: ULF is believed to have very short range since it uses largely inductive or magnetic radiance that drops off proportional to $1/d^3$ while far-field HF and UHF drops off proportional to $1/d$, where d is distance from the source. Thus, the inductive or magnetic radiance mode of transmission will theoretically limit the distance of transmission, and that has been one of the major justifications for use of HF and UHF passive radio tags in many applications. The transmission speed is inherently slow using ULF as compared to HF and UHF since the tag must communicate with low baud rates because of the low transmission carrier frequency. Many sources of noise exist at these ULF frequencies from electronic devices, motors, fluorescent ballasts, computer systems, power cables. Thus ULF is often thought to be inherently more susceptible to noise.

Radio tags in this frequency range are thought to be more expensive since they require a wound coil antenna because of the requirement for many turns to achieve optimal electrical properties (maximum Q). In contrast HF and UHF tags can use antennas etched directly on a printed circuit board and ULF would have even more serious distance limitations with such an antenna. Current networking methods used by high frequency tags, as used in HF and UHF, are impractical due to such low bandwidth of ULF tags described immediately above.

It should be appreciated that the above-mentioned RF tags are antithetical to an "area read". With the above-mentioned RF tags, whenever the tag is powered, it immediately transmits its message. If the tag is powered again, it transmits its message again. If several RF tags are nearby to each other, then if they are powered, they all transmit their respective messages. This collision-prone circumstance repeats itself every time the RF tags are powered. It would be very desirable to have a system in which the RF tags were to respond in a way that facilitates "area reads".

SUMMARY OF THE INVENTION

As it turns out, however, there are many non-obvious and unexpected advantages in the use of low frequency, active radiating transceiver tags. They are especially useful for visibility and for tracking objects with large area loop antennas over other more expensive active radiating transponder HF UHF tags (e.g. Savi ST-654). These LF tags will function in harsh environments near water and steel and may have a full two-way digital communications protocol, digital static memory and optional processing ability, and can have sensors with memory and can have ranges of up to 100 feet. The active radiating transceiver tags can be far less costly than other active transceiver tags (many in the under-one-dollar range), and are often less costly than passive backscattered transponder RFID tags, especially those that require memory and make use of EEPROM. These low-frequency radiating transceiver tags also provide a high level of security since they have an on-board crystal than can provide a date-time stamp making full AES encryption and one-time-based pads possible. Finally, in most cases LF active radiant transponder tags have a battery life of 10-15 years using inexpensive CR2525 Li batteries with 3 million to 6 million transmissions.

Finally, these active LF tags may use amplitude modulation or in some cases phase modulation, and can have ranges of many tens of feet up to hundred feet with use of a loop antenna (see FIGS. 16, 9, 10, 11). The active tags include a battery, a chip and a crystal. As stated above in many case the total cost for such a tag can be less than a HF and ULF passive transponder tag, especially if the transponder includes EEPROM, and has longer range. In cases where the transponder tags use EEPROM, the low frequency active transceiver tag can actually be faster since it use SRAM for storage and write times for EEPROM is quite long. Finally, because these new active transceiver tags use induction as the primary communication mode, and induction works work optimally at low frequencies LF they are immune to nulls often found near steel and liquids with HF and UHF tags. U.S. Patent Application Publication No. 2004/0217865 A1 summarizes much of the prior art and supports the non-obvious nature of a low-frequency transceiver as a RF-ID tag.

These LF radiating transceiver tags may be used in a variety of applications, however their intended use is in visibility networks for tracking assets in warehouses, and in moving vehicles. They overcome many of the disadvantages of a passive backscattered transponder tag system (U.S. Pat. No. 6,738,628: Electronic Physical Asset Tracking, 2004). The tags may also be used for visibility networks for airline bags, evidence tracking, and livestock tracking, and in retail stores for tracking products.

In this application we disclose a novel version of the LF transponder that is passive and uses the same protocol as the LF active radiating transceiver tag described above. It can function in a full peer-to-peer network with any LF active radiating transponder. However this invention is passive, does not require a battery or crystal as a frequency reference, and as a result may be extremely low cost. The tags make use of two coplanar antennas. One antenna used for power and is narrowly tuned for Myriametric frequencies from 8.192 kHz or to 16.384 kHz, or to 32.768 kHz or some other higher harmonic of the standard watch crystal frequency (32.768 kHz) (for example 65.536 kHz). A second coplanar antenna is broadly tuned and used for data and uses mid-range kilometric frequency, for example 131.072 kHz or up to 458.752 kHz derived from the power carrier. Thus, the higher frequency is a harmonic of a watch crystal frequency of 32.768 kHz. The antennas may be positioned in a co-planar geometry in such a way that they are not inductively coupled, so that all fields cancel each other. This makes it possible to tune each antenna independently to an optimal frequency.

Another aspect of the invention is the design of a low-powered frequency multiplier so that a low-frequency power source derived from the narrowly tuned antenna may be multiplied up to a higher communication frequency. This design may be placed on an integrated circuit and unlike other methods (phase locked loops) does not consume significant power and does not require any external components. The circuit provides any multiple up of input frequency. This is in contrast to other "two frequency" systems that must use either an external component to multiply the frequency up (U.S. Pat. No. 3,689,885) or use a higher carrier frequency so a simple divider may be used to obtain a communication frequency (U.S. Pat. No. 4,879,756).

Another unique aspect of the invention is that since the carrier is used for power only and is "information free", the power base station that is used to provide this carrier may be extremely simple with only an oscillator and tuned loop antenna.

The power station may be optionally independent of the data base station and may be placed close to the passive tag. This means the data base station may communicate with both active and passive tags using the same half-duplex protocol. It also means that a passive tag can optionally be maintained in a power-on state constantly with a separate antenna, and much simpler readers (handhelds) or other base stations may read and write without range issues related to the power channel.

Another unique aspect of the invention is a high-gain amplifier circuit independent of the power supplied to the circuit. Since power to the invention may be from an independent source, it is possible to include a high-gain sensitive amplifier circuit to detect signals from a few millivolts to many volts.

Another aspect of the invention is that by use of a power carrier that is a harmonic of a watch crystal, it is possible to have active radiating tags that also use a low-cost watch crystal as a reference, and both active and passive tags may freely communicate with each other.

Another aspect of the invention is that the same circuitry used on the passive radiating transceiver tag may be used in the design of an active radiating tag. The power coil and rectifier circuit may be replaced with a Li battery (CR2525 for example) and the frequency reference with a watch crystal.

These tags may have displays LEDs and sensors and operate with same communications systems on a shelf. They may therefore be used to locate the passive radiating tags on a shelf for example, and/or to indicate things like price and inventory levels on a shelf similar to that described in U.S. Pat. No. 4,879,756.

Another unique aspect of the invention is that a first co-planar antenna is used for power transmission and not for data communication. A second isolated co-planar antenna may be used for half-duplex two-way communications. Federal regulations under Part 15 limit power that may be transmitted without a license based on frequency, and the available legal power increases as the frequency decreases (see FIG. 17). However, communications speed is also compromised as the frequency decreases. Therefore, isolation of the two functions—power and data—with separate antennas with separate tuning characteristics provides for an enhanced optimized radio tag in that power may be maximized and communications speed may also be maximized.

Another aspect of the invention is that by using two isolated antennas, the tuning and Q may be independent. The power coil may have a high Q and tuned to a very low frequency. This maximizes the current and total power available to the circuitry. It also provides for an accurate frequency reference eliminating an internal reference such as a crystal. One of the advantages of using low frequencies under Part 15 FCC regulations is that the frequency bandwidth is not narrowly regulated (see FIG. 17). Higher frequencies require special worldwide bandwidth regulation within narrow limits. Thus, the second communications antenna may be broadly tuned to a higher frequency with a very low Q. This accomplishes two things. First, data communications is now more immune to any de-tuning that might occur as a result of steel or metal in a harsh environment. Such harsh environments are typically found in many applications. High-Q narrowly tuned antennas will be more susceptible to detuning. Second, it makes it possible the use of a broadband frequency range that may span many Hertz (e.g., a square wave) for communications to the tag, creating what might be considered spread-spectrum system without any complex circuitry. The communication antenna is not tuned in the classic way. The energy that is stored in the inductor is redirected back to the power supply. So the frequency may be changed without any penalty. In fact, in an exemplary embodiment, a direct-sequence spread-spectrum code is used in the transmission. The disadvantage of doing this is an increase in power consumption and because of the difficulty in making a receiver, which would make peer-to-peer communication impractical.

Another aspect of the invention is that because the radio tag uses low frequencies, the power requirements for the chip are reduced as compared with use of a similar active radiating system at HF or UHF. This enables a long battery life of 10-15 years with a low-cost Li thin battery. The battery does not have to be recharged or replaced. The HF, MHF and UHF systems, in contrast, have very large batteries that must be recharged often or replaced every year to two years.

Another aspect of the invention is that the passive radiating radio tag consists only of two low-cost copper coils and an integrated circuit. No external components are required and only three or four contacts from the two antennas are necessary on the integrated circuit. If slightly enlarged pads are used this can be accomplished using conventional wirebonding equipment thereby eliminating the need for a printed circuit board. Other patents (U.S. Pat. No. 5,682,143: Radio Frequency Identification Tag, 1997; U.S. Pat. No. 4,857,893: Single chip transponder device, 1989) teach that the circuit may be placed on a board and the antenna can be etched directly onto the PC board. By integrating the antenna directly on the printed circuit board it is assumed that it is possible to reduce costs. However the cost of the PC board or flexi circuit is considerable more than the cost of a wound copper coil. Others such as U.S. Pat. No. 5,682,143: Radio Frequency Identification Tag, 1997, claim that cost may be reduced by placing the integrated circuit on a flexible thin circuit. The antennas on flexible circuits often must be printed or silk screened using conductive silver paste. This raises the cost, however, over a wound copper coil. Typical copper wire for a low frequency antenna with 44 gauge 300-500 turns has a copper cost of 0.5 cents and a total wire cost of 0.8 cents, and the final wound coil cost is under 2 cents, and no PC substrate is required. The PC boards or flex circuits and silver paste can be over 10 cents and the silver also creates disposal issues.

Another aspect of the invention is that with all of these factors taken into account the passive radiating tag has a communication range of at least 1.0 feet (for example, three to four feet) as compared to only a few inches with previous backscattered LF and HF radio tag designs. Moreover, in EAS applications the presence detection of a passive radiating tag using a known standard code is eight to ten feet. Thereby, these tags may be used for real-time visibility systems in retail applications where items must be identified on a shelf but may also replace the EAS systems to stop theft. These active tags combined with a passive radiating tag have many other obvious applications.

The present invention also broadly provides a system for detection and tracking of inanimate and animate objects, the aforesaid system comprising: a low radio frequency tag carried by each of the objects, the aforesaid tag comprising a tag communication inductive antenna operable at a first radio frequency not exceeding 1 megahertz, a transceiver operatively connected to the aforesaid tag communication inductive antenna, the aforesaid transceiver being operable to transmit and receive data signals at the aforesaid first radio frequency, a data storage device operable to store data comprising identification data for identifying the aforesaid tag, a microprocessor operable to process data received from the aforesaid transceiver and the aforesaid data storage device and to send data to cause the aforesaid transceiver to emit an identification signal based upon the aforesaid identification data stored in said data storage device, and an energy source for activating the aforesaid transceiver and the aforesaid microprocessor, the aforesaid energy source comprising a tag energization inductive antenna operable to receive radio frequency energy from an ambient radio frequency field of a second radio frequency not exceeding 1 megahertz, the aforesaid second radio frequency being substantially different than the aforesaid first radio frequency; a field communication inductive antenna disposed at an orientation and within a distance from each object that permits effective communication therewith at the aforesaid first radio frequency; a receiver in operative communication with the aforesaid field communication inductive antenna, the aforesaid receiver being operable to receive data signals at the aforesaid first radio frequency from the aforesaid low radio frequency tag; a transmitter in operative communication with the aforesaid field communication inductive antenna, the aforesaid transmitter being operable to send data signals at the aforesaid first radio frequency to the aforesaid low frequency tag; a reader data processor in operative communication with the aforesaid receiver and the aforesaid transmitter; and a field energization inductive antenna operable to produce the aforesaid ambient radio frequency field at the tag energization inductive antenna of the aforesaid object.

Preferably, the aforesaid tag communication inductive antenna and the aforesaid tag energization inductive antenna are mutually oriented and positioned to substantially minimize inductive coupling therebetween.

Moreover, it is preferred that the aforesaid tag communication inductive antenna and the aforesaid tag energization inductive antenna be mutually coplanar and substantially decoupled, with respect to each other.

Preferably, the aforesaid distance does not exceed 1.0 wavelengths of electromagnetic waves at the aforesaid first frequency. Where the first and second radio frequencies do not exceed 1.0 megahertz, this distance should not exceed about 1,000 feet. Moreover, in contrast to prior art systems, the aforesaid distance is at least 1.0 feet.

Preferably, the aforesaid first radio frequency is an integral multiple of the aforesaid second radio frequency. For example, the aforesaid first radio frequency may be 128 kHz while the aforesaid second radio frequency is selected from 64 kHz, 32 kHz, 16 kHz, and 8 kHz.

According to a preferred embodiment, the aforesaid tag communication inductive antenna is a wound air loop coil, and the aforesaid tag energization inductive antenna is a wound air loop coil. Advantageously, these two antennas may be coplanar and substantially decoupled, with respect to one another.

Preferably, the aforesaid tag communication inductive antenna is a wound air loop coil having a first axis, and the aforesaid tag energization inductive antenna is a wound air loop coil having a second axis that is substantially orthogonal to the aforesaid first axis.

According to a preferred embodiment, the aforesaid tag communication inductive antenna comprises a wound ferrite coil, and the aforesaid tag energization inductive antenna comprises a wound ferrite coil.

Advantageously, the aforesaid tag communication inductive antenna is a wound ferrite coil having a first axis and the aforesaid tag energization inductive antenna comprises a wound ferrite coil having a second axis that is substantially orthogonal to the aforesaid first axis.

According to a preferred embodiment, of the system, the aforesaid field communication inductive antenna has an axis which is substantially orthogonal to a corresponding axis of the aforesaid field energization inductive antenna.

In order to attune to first and second frequencies which are substantially different, the aforesaid tag communication inductive antenna may comprise a first plurality of turns of wire, said tag energization inductive antenna should comprise a second plurality of turns of wire.

According to a preferred embodiment, the aforesaid energy source of the aforesaid tag may comprise a supplementary energy source. Preferably, the aforesaid supplementary energy source is an energy storage device, such as a battery. Alternatively, the aforesaid supplementary energy source comprises a energy harvesting device operable to capture energy from an ambient energy condition.

Energy harvesting methods that use ambient energy conditions (such as thermocouples, photocells or piezoelectric devices) can be used to supplement the power from the second energization inductive antenna. Moreover, sensors for detecting ambient energy conditions may be used when no power carrier (radio frequency energy at the aforesaid second frequency) exists. This can be especially useful in oil and gas industries, where down hole conditions (high vibration and high temperatures) and sensor data is valuable. It could be valuable not only to help steer the direction of the well itself, but also to record the conditions that the drill pipe has been exposed to during its useful life. This energy technology is in widespread commercial use.

According to another aspect of the invention, the novel low frequency tag may comprise a crystal for timing and high temperature capacitor for storing harvested energy that is intermittently generated. In this way, an energy harvesting device may be used to replace the second power antenna (the "field energization inductive antenna") as the entire aforesaid energy source for the tag.

According to a preferred embodiment, the aforesaid field communication inductive antenna comprises a first loop that is positioned and dimensioned in a sufficiently large size to surround the aforesaid objects, while the aforesaid field energization inductive antenna comprises a second loop that is also positioned and dimensioned to surround said objects. Preferably, the aforesaid objects and the aforesaid field communication inductive antenna are disposed in a repository selected from among a truck, a warehouse, storage shelving, a livestock field, a freight container, a drilling site for oil or gas, a weapons storage facility, and a sea vessel, where management of assets is a goal.

Advantageously, the aforesaid field communication inductive antenna, the aforesaid field energization inductive antenna, the aforesaid receiver, and the aforesaid transmitter may be combined into a unitary handheld device.

According to a preferred embodiment, the aforesaid identification data comprises an internet protocol (IP) address, and the aforesaid reader data processor is operable for communication with an internet router.

According to a preferred embodiment, the aforesaid low radio frequency tag further comprising a sensor operable to generate a status signal upon sensing a condition experienced by an object that carries the aforesaid tag, the aforesaid transceiver being operable to automatically transmit a warning signal at the aforesaid first radio frequency upon generation of the aforesaid status signal. Preferably, this condition is selected from temperature change, shock, change in GPS position, and dampness.

Preferably, the aforesaid tag further comprises at least one indicator device (e.g. colored LED, audible tone generator) which is automatically operable upon receipt by said transceiver of a data signal that corresponds to said identification data stored at said data storage device. Moreover, the aforesaid tag may further comprise a sensor operable to generate a status signal upon sensing a condition experienced by an object that carries the aforesaid tag and at least one indicator device (e.g. colored LED, audible tone generator) which is automatically operable upon generation of the aforesaid status signal.

According to a preferred embodiment, the aforesaid low radio frequency tag further comprises (i) a sensor operable to generate a status signal upon sensing a condition experienced by an object that carries the aforesaid low radio frequency tag, (ii) a clock to generate a time signal corresponding to the aforesaid status signal, the aforesaid data storage device being operable to store corresponding pairs of status and time signals as a temporal history of conditions experienced by said object. Preferably, the aforesaid transceiver is operable to automatically transmit the aforesaid temporal history at the aforesaid first radio frequency upon receipt by the aforesaid transceiver of a data signal that corresponds to the aforesaid identification data stored at the aforesaid data storage device.

According to a preferred embodiment, the aforesaid low radio frequency tag further comprises a display (e.g. LCD) operable to display data relating to the tag and an object carrying the tag. Advantageously, the aforesaid low radio frequency tag further comprises key buttons operable for manual entry of data. Preferably, the aforesaid low radio frequency tag is formed with two major surfaces at opposite sides thereof, a first major surface on a first side of the aforesaid low radio frequency tag being substantially flat to facilitate attachment to a surface of an object. Moreover, the aforesaid the aforesaid first side may optionally be provided with a detector button operable to automatically electronically detect whether or not the tag is in contact with the aforesaid object (e.g., a package).

According to a preferred embodiment of the invention, the aforesaid microprocessor of the aforesaid tag is operable to compare a transmitted ID code with a stored ID code and, in the event of a match, to respond to the aforesaid transmitted ID code. Preferably, the aforesaid microprocessor of the aforesaid low radio frequency tag is operable to compare a transmitted ID code from the aforesaid transmitter to a plurality of ID codes stored in the aforesaid data storage device of the aforesaid tag and, in the event of a match, to respond to the aforesaid transmitted ID code. Preferably, the aforesaid data storage device is programmable to store said plurality of ID codes.

Advantageously, the aforesaid low radio frequency tag comprises a sensor operable to generate a status signal value based on the value of a sensed condition, the aforesaid microprocessor being operable to cause the aforesaid transmitter to transmit a signal when the aforesaid value reaches a preselected value. Preferably, the aforesaid data storage device is programmable to enable erasure of ID codes and thereafter programming of other ID codes in the aforesaid data storage device.

The present invention also broadly provides a method for detection and tracking of inanimate and animate objects, the aforesaid method comprising the steps of: attaching a low radio frequency detection tag to each of the objects, each low radio frequency tag comprising a tag communication inductive antenna operable at a first radio frequency not exceeding 1 megahertz, a transceiver operatively connected to the aforesaid tag communication inductive antenna, the aforesaid transceiver being operable to transmit and receive data signals at the aforesaid first radio frequency, a data storage device operable to store data comprising identification data for identifying the aforesaid tag, a microprocessor operable to process data received from the aforesaid transceiver and the aforesaid data storage device and to send data to cause the aforesaid transceiver to emit an identification signal based upon the aforesaid identification data stored in the aforesaid data storage device, and an energy source for activating the aforesaid transceiver and the aforesaid microprocessor, the aforesaid energy source comprising a tag energization inductive antenna operable to receive radio frequency energy from an ambient radio frequency field of a second radio frequency, the aforesaid second radio frequency being substantially different than the aforesaid first radio frequency; storing, in the aforesaid data storage device of each the aforesaid low radio frequency tag attached to an object, object data relating to the aforesaid object; the aforesaid objects being commingled in a repository, the aforesaid repository being provided with at least one field communication inductive antenna operable at the aforesaid first radio frequency, the aforesaid field communication inductive antenna being disposed at a distance from each object that permits effective communication therewith at the aforesaid first radio frequency; generating the aforesaid ambient radio frequency field at the energization tag antenna of each object by radiating the aforesaid second radio frequency from a field energization inductive antenna; reading the identification data and object data from the transceiver of the aforesaid low radio frequency tag by interrogating all low radio frequency tags in the aforesaid repository with radio frequency interrogation signals at the aforesaid first radio frequency via the aforesaid field communication inductive antenna; and transmitting the identification data and object data from each low radio frequency tag to a reader data processor to provide a tally of the objects in the aforesaid repository.

Advantageously, the aforesaid object data may be selected from object description data, address-of-origin data, destination address data, object vulnerability data, and object status data, the aforesaid repository being selected from a truck, storage shelving, a warehouse, a livestock field, a freight container, a drilling site for oil or gas, a weapons storage facility, and a sea vessel.

To minimize interference therebetween, it is desirable that, the aforesaid first radio frequency be an integral multiple of the aforesaid second radio frequency.

Advantageously, the aforesaid field communication inductive antenna comprises a first loop that is positioned and dimensioned to surround the aforesaid objects. Preferably, the aforesaid field energization inductive antenna comprising a second loop that is positioned and dimensioned to surround the aforesaid objects.

According to a preferred embodiment, the aforesaid low radio frequency tag further comprises a sensor operable to generate a status signal upon sensing a condition experienced by an object that carries the aforesaid low radio frequency tag, the aforesaid method further comprising the step of: automatically transmitting a warning signal from the aforesaid transceiver at the aforesaid low radio frequency to the aforesaid reader data processor upon generation of the aforesaid status signal.

Preferably, the aforesaid low radio frequency tag further comprises a sensor operable to generate a status signal upon sensing a condition experienced by an object that carries the aforesaid low radio frequency tag and at least one indicator device, the aforesaid method further comprising the step of: automatically activating the aforesaid at least one indicator device upon generation of the aforesaid status signal.

Advantageously, the aforesaid low radio frequency tag further comprises a sensor operable to generate a status signal upon sensing a condition experienced by an object that carries the aforesaid low radio frequency tag and a clock to generate a time signal corresponding to the aforesaid status signal, the aforesaid method further comprising the steps of: storing, in the aforesaid data storage device, corresponding pairs of status and time signals as a temporal history of conditions experienced by the aforesaid object; and transmitting, to the aforesaid reader data processor, the aforesaid temporal history at the aforesaid low radio frequency upon receipt by the aforesaid transceiver of a data signal that corresponds to the aforesaid identification data stored at the aforesaid data storage device.

The present invention also broadly provides a low radio frequency tag for detection and tracking of animate and inanimate objects, the aforesaid low radio frequency tag comprising: a tag communication inductive antenna operable at a first radio frequency not exceeding 1 megahertz; a transceiver operatively connected to the aforesaid tag communication inductive antenna, the aforesaid transceiver being operable to transmit and receive data signals at the aforesaid first radio frequency; a data storage device operable to store data comprising identification data for identifying the aforesaid low radio frequency tag; a microprocessor operable to process data received from the aforesaid transceiver and the aforesaid data storage device and to send data to cause the aforesaid transceiver to emit an identification signal based upon the aforesaid identification data stored in the aforesaid data storage device; and an energy source for activating the aforesaid transceiver and the aforesaid data processor, the aforesaid energy source comprising a tag energization inductive antenna operable to receive radio frequency energy from an ambient radio frequency field of a second radio frequency not exceeding 1 megahertz, the aforesaid second radio frequency being substantially different than the aforesaid first radio frequency.

Advantageously, the aforesaid first radio frequency is an integral multiple of the aforesaid second radio frequency. For example, the aforesaid first radio frequency may be 128 kHz and the aforesaid second radio frequency may be selected from 64 kHz, 32 kHz, 16 kHz, and 8 kHz.

Preferably, the aforesaid tag communication inductive antenna may comprise a first plurality of turns of wire while the aforesaid tag energization inductive antenna comprises a second plurality of turns of wire.

Advantageously, the aforesaid tag communication inductive antenna and the aforesaid tag energization inductive antenna each may both have a substantially flat configuration. Preferably, the aforesaid tag communication inductive antenna and the aforesaid tag energization inductive antenna each comprise a wound ferrite coil.

Advantageously, the aforesaid tag communication inductive antenna and the aforesaid tag energization inductive antenna may be integrated into a microelectronic device comprising the aforesaid transceiver, the aforesaid data storage device, the aforesaid energy source, and the aforesaid microprocessor.

According to a preferred embodiment, the aforesaid low radio frequency tag comprises a frequency multiplier operable to integrally multiply the second radio frequency and to generate a clock signal at the aforesaid first radio frequency and to supply the aforesaid clock signal to the aforesaid transceiver.

Advantageously, the aforesaid tag further comprises a sensor operable to generate a status signal upon sensing a condition (e.g., temperature change) experienced by an object that carries the aforesaid low radio frequency tag, the aforesaid transceiver being operable to automatically transmit a warning signal at the aforesaid first radio frequency upon generation of the aforesaid status signal.

Preferably, the aforesaid tag further comprises at least one indicator device which is automatically operable upon receipt by the aforesaid transceiver of a data signal that corresponds to the aforesaid identification data stored at the aforesaid data storage device.

Advantageously, the aforesaid tag further comprises a sensor operable to generate a status signal upon sensing a condition experienced by an object that carries the aforesaid detection tag and at least one indicator device (e.g., colored LED, audible tone generator) which is automatically operable upon generation of the aforesaid status signal.

Moreover, the aforesaid low frequency tag may further comprise a sensor operable to generate a status signal upon sensing a condition experienced by an object that carries the aforesaid low radio frequency tag, a clock to generate a time signal corresponding to the aforesaid status signal, the aforesaid data storage device being operable to store corresponding pairs of status and time signals as a temporal history of conditions experienced by the aforesaid object.

Moreover, the aforesaid microprocessor may be operable to cause the aforesaid transceiver to automatically transmit the aforesaid temporal history at the aforesaid first radio frequency upon receipt by the aforesaid transceiver of a data signal that corresponds to the aforesaid identification data stored at the aforesaid data storage device.

Preferably, the aforesaid microprocessor may be operable to cause the aforesaid transceiver to automatically transmit the aforesaid corresponding pairs of status and time signals immediately upon generation thereof.

Preferably, the aforesaid tag further comprises a display operable to display data relating to the aforesaid low radio frequency tag and to an object carrying the aforesaid low radio frequency tag.

Advantageously, the aforesaid tag further comprises key buttons operable for manual entry of data.

Moreover, the aforesaid tag may be formed with two major surfaces at opposite sides thereof, a first major surface on a first side of the aforesaid tag being substantially flat to facilitate attachment to a surface of an object.

Advantageously, the aforesaid first side may be provided with a detector button operable to automatically electronically detect whether or not the tag is in contact with an object.

According to a preferred, the aforesaid microprocessor of the aforesaid low radio frequency tag may be operable to compare a transmitted ID code with a stored ID code and, in the event of a match, to respond to the aforesaid transmitted ID code.

Preferably, the aforesaid microprocessor of the aforesaid low radio frequency tag is operable to compare a transmitted ID code from the aforesaid transmitter to a plurality of ID codes stored in the aforesaid data storage device of the aforesaid low radio frequency tag and, in the event of a match, to respond to the aforesaid transmitted ID code.

Preferably, the aforesaid low radio frequency tag comprises a sensor operable to generate a status signal value based on the value of a sensed condition, the aforesaid microprocessor being operable to cause the aforesaid transmitter to transmit a signal when the aforesaid value reaches a preselected value.

Preferably, the aforesaid data storage device is programmable to store the aforesaid plurality of ID codes.

According to a preferred embodiment, the aforesaid energy source comprises a rectifier device operable to convert the aforesaid radio frequency energy received by the aforesaid tag energization inductive antenna into DC current.

The present invention also broadly provides an integrated microelectronic device (integrated circuit or IC chip) for use in a low radio frequency tag for detection and tracking of animate and inanimate objects, the aforesaid low radio frequency tag comprising a tag communication inductive antenna operable at a first radio frequency not exceeding 1 megahertz, the aforesaid low radio frequency tag further comprising a tag energization inductive antenna operable to receive radio frequency energy from an ambient radio frequency field of a second radio frequency not exceeding 1 megahertz, the aforesaid second radio frequency being substantially different than the aforesaid first radio frequency, the aforesaid microelectronic device comprising: a transceiver for operative connection to the aforesaid communication antenna, the aforesaid transceiver being operable to transmit and receive data signals at the aforesaid first radio frequency; a data storage device operable to store data comprising identification data for identifying the aforesaid low radio frequency tag; a microprocessor operable to process data received from the aforesaid transceiver and the aforesaid data storage device and to send data to cause the aforesaid transceiver to emit an identification signal based upon the aforesaid identification data stored in the aforesaid data storage device; an energy source circuit for operative connection to the aforesaid tag energization inductive antenna for activating the aforesaid transceiver and the aforesaid microprocessor.

According to a preferred embodiment, the aforesaid first radio frequency is an integral multiple of the aforesaid second radio frequency. For example, the aforesaid first radio frequency is 128 kHz and the aforesaid second radio frequency is selected from 64 kHz, 32 kHz, 16 kHz, and 8 kHz.

Preferably, the aforesaid energy source circuit comprises a rectifier circuit operable to convert the aforesaid radio frequency energy received by the aforesaid tag energization inductive antenna into DC current.

Preferably, the aforesaid tag communication inductive antenna and the aforesaid tag energization inductive antenna are integrated into the aforesaid microelectronic device.

Advantageously, the aforesaid tag communication inductive antenna comprises a first plurality of loops, and the aforesaid tag energization inductive antenna comprises a second plurality of loops.

Preferably, the aforesaid tag communication inductive antenna comprises a first plurality of loops around a ferrite core, and the aforesaid tag energization inductive antenna comprises a second plurality of loops around a ferrite core.

To reduce signal interference, the aforesaid tag communication inductive antenna has a first axis and the aforesaid tag energization inductive antenna has a second axis that is substantially orthogonal to the aforesaid first axis.

Preferably, the aforesaid energy source of the microelectronic device comprises a rectifier integrated into the aforesaid microelectronic device.

Advantageously, the aforesaid microelectronic device further comprises a frequency multiplier operable to integrally multiply the second radio frequency and to generate a clock signal at the aforesaid first radio frequency and to supply the aforesaid clock signal to the aforesaid transceiver.

According to a preferred embodiment, the aforesaid microelectronic device further comprises a sensor operable to generate a status signal upon sensing a condition experienced by an object that carries the aforesaid low radio frequency tag.

Preferably, the aforesaid microelectronic device further comprises a sensor operable to generate a status signal upon sensing a condition experienced by an object that carries the aforesaid low radio frequency tag, the aforesaid transceiver being operable to automatically transmit a warning signal at the aforesaid first radio frequency upon generation of the aforesaid status signal.

Advantageously, the aforesaid microelectronic device further comprises: a sensor operable to generate a status signal upon sensing a condition (e.g., temperature change) experienced by an object that carries the aforesaid low radio frequency tag, and a clock operable to generate a time signal corresponding to the aforesaid status signal, the aforesaid data storage device being operable to store corresponding pairs of status and time signals as a temporal history of conditions experienced by the aforesaid object.

Preferably, the aforesaid transceiver is operable to automatically transmit the aforesaid temporal history at the aforesaid first radio frequency upon receipt by the aforesaid transceiver of a data signal that corresponds to the aforesaid identification data stored at the aforesaid data storage device.

According to a preferred embodiment of the aforesaid microelectronic device, the aforesaid microprocessor is operable to compare a transmitted ID code with a stored ID code and, in the event of a match, to respond to the aforesaid transmitted ID code.

Preferably, the aforesaid microprocessor of the aforesaid microelectronic device is operable to compare a transmitted ID code to a plurality of ID codes stored in the aforesaid data storage device of the aforesaid low radio frequency tag and, in the event of a match, to respond to the aforesaid transmitted ID code. Preferably, the aforesaid data storage device is programmable to store the aforesaid plurality of codes.

Advantageously, the aforesaid microelectronic device further comprises a sensor operable to generate a status signal value based on the value of a sensed condition, the aforesaid microprocessor being operable to cause the aforesaid transmitter to transmit a signal when the aforesaid value reaches a preselected value.

The invention further broadly provides a system for detection and tracking of animate and inanimate objects, the aforesaid system comprising: a low radio frequency tag carried by each of the objects, the aforesaid low radio frequency tag comprising: a tag communication inductive antenna operable at a low radio frequency not exceeding 1 megahertz; a transceiver operatively connected to the aforesaid tag communication inductive antenna, the aforesaid transceiver being operable to transmit and receive data signals at the aforesaid low radio frequency; a data storage device operable to store data comprising identification data for identifying the aforesaid low radio frequency tag; a microprocessor operable to process data received from the aforesaid transceiver and the aforesaid data storage device and to send data to cause the aforesaid transceiver to emit an identification signal based upon the aforesaid identification data stored in the aforesaid data storage device; and an energy source for activating the aforesaid transceiver and the aforesaid microprocessor; at least one field communication inductive antenna disposed at an orientation and within a distance from each object that permits effective communication therewith at the aforesaid low radio frequency; a receiver in operative communication with the aforesaid field communication inductive antenna, the aforesaid receiver being operable to receive data signals from the aforesaid low radio frequency tags; a transmitter in operative communication with the aforesaid field communication inductive antenna, the aforesaid transmitter being operable to send data signals to the aforesaid low frequency tags; and a reader data processor in operative communication with the aforesaid receiver and the aforesaid transmitter.

According to a preferred embodiment, the aforesaid tag communication inductive antenna comprises a wound ferrite coil comprising a plurality of turns of wire wound around a ferrite core.

The present invention also provides a low radio frequency tag for detection and tracking of animate and inanimate objects, the aforesaid low radio frequency tag comprising: a tag communication inductive antenna operable at a low radio frequency not exceeding 1 megahertz; a transceiver operatively connected to the aforesaid tag communication inductive antenna, the aforesaid transceiver being operable to transmit and receive data signals at the aforesaid low radio frequency; a data storage device operable to store data comprising identification data for identifying the aforesaid low radio frequency tag; a microprocessor operable to process data received from the aforesaid transceiver and the aforesaid data storage device and to send data to cause the aforesaid transceiver to emit an identification signal based upon the aforesaid identification data stored in the aforesaid data storage device; and an energy source for activating the aforesaid transceiver and the aforesaid microprocessor.

Preferably, the aforesaid tag communication inductive antenna comprises a wound ferrite coil comprising a plurality of turns of wire wound around a ferrite core. Preferably, during reading of the tag, the aforesaid field communication inductive antenna is held with its axis oriented substantially parallel to a corresponding axis of the aforesaid tag communication inductive antenna.

The present invention also broadly provides a system for detection and tracking of inanimate and animate objects, the aforesaid system comprising: a low radio frequency tag carried by each of the objects, the aforesaid tag comprising a tag communication inductive antenna operable at a first radio frequency not exceeding 1 megahertz, a transceiver operatively connected to the aforesaid tag communication inductive antenna, the aforesaid transceiver being operable to transmit and receive data signals at the aforesaid first radio frequency, a data storage device operable to store data comprising identification data for identifying the aforesaid detection tag, a microprocessor operable to process data received from the aforesaid transceiver and the aforesaid data storage device and to send data to cause the aforesaid transceiver to emit an identification signal based upon the aforesaid identification data stored in the aforesaid data storage device, and an energy source for activating the aforesaid transceiver and the aforesaid microprocessor, the aforesaid energy source comprising an energy harvesting device operable to capture energy from an energy condition at the aforesaid object; at least one field communication inductive antenna disposed at a distance from each object that permits effective communication therewith at the aforesaid first radio frequency; a receiver in operative communication with the aforesaid field communication inductive antenna, the aforesaid receiver being operable to receive data signals from the aforesaid low radio frequency tags; a transmitter in operative communication with the aforesaid field communication inductive antenna, the aforesaid transmitter being operable to send data signals to the aforesaid low frequency tags; and a reader data processor in operative communication with the aforesaid receiver and the aforesaid transmitter.

Preferably, the aforesaid energy condition is selected from an ambient elevated temperature level, an ambient photon radiation level, repetitive variation of ambient temperature, kinetic energy of the aforesaid tag, and repetitive variation of pressure.

Preferably, the aforesaid tag communication inductive antenna may comprise a plurality of turns of wire. For improved data reception, the aforesaid tag communication inductive antenna may also comprise a ferrite core.

Where the aforesaid energy condition is the repetitive variation of pressure, the aforesaid energy harvesting device may comprise a piezoelectric crystal.

Where aforesaid energy condition is an ambient elevated temperature level, the aforesaid energy harvesting device may comprise at least one thermocouple. Where a higher voltage is needed to power the tag, a plurality of thermocouples connected in series may be used.

Where the aforesaid energy condition is a repetitive variation of ambient temperature, the aforesaid energy harvesting device may comprise a pyroelectric crystal.

Where the aforesaid energy condition is the kinetic energy of the aforesaid tag, the aforesaid energy harvesting device may comprise a variable capacitor.

Where the aforesaid energy condition is an ambient photon radiation level, such as sunlight, the aforesaid energy harvesting device may comprise a photovoltaic cell. Where needed, the aforesaid tag may comprise a plurality of photocells disposed on different surfaces of the aforesaid object. Moreover, where the aforesaid objects are livestock, each tag may be attachable to an outer surface (e.g., an ear) of the aforesaid livestock at a position that permits exposure to sunlight or other ambient light.

The present invention also broadly provides a low radio frequency tag for detection and tracking of animate and inanimate objects, the aforesaid low radio frequency tag comprising: a tag communication inductive antenna operable at a first radio frequency not exceeding 1 megahertz; a transceiver operatively connected to the aforesaid tag communication inductive antenna, the aforesaid transceiver being operable to transmit and receive data signals at the aforesaid first radio frequency; a data storage device operable to store data comprising identification data for identifying the aforesaid low radio frequency tag; a microprocessor operable to process data received from the aforesaid transceiver and the aforesaid data storage device and to send data to cause the aforesaid transceiver to emit an identification signal based upon the aforesaid identification data stored in the aforesaid data storage device; and an energy source for activating the aforesaid transceiver and the aforesaid microprocessor, the aforesaid energy source comprising an energy harvesting device, as described hereinabove, operable to capture energy from an energy condition at the aforesaid object.

The present invention also broadly proves an integrated microelectronic device for use in a low radio frequency tag for detection and tracking of animate and inanimate objects, the aforesaid low radio frequency tag comprising a tag communication inductive antenna operable at a first radio frequency not exceeding 1 megahertz, the aforesaid microelectronic device comprising: a transceiver for operative connection to the aforesaid communication antenna, the aforesaid transceiver being operable to transmit and receive data signals at the aforesaid first radio frequency; a data storage device operable to store data comprising identification data for identifying the aforesaid low radio frequency tag; a microprocessor operable to process data received from the aforesaid transceiver and the aforesaid data storage device and to send data to cause the aforesaid transceiver to emit an identification signal based upon the aforesaid identification data stored in the aforesaid data storage device; an energy source circuit operable to activate the aforesaid transceiver and the aforesaid microprocessor, the aforesaid energy source comprising an energy harvesting device, as described hereinabove, operable to capture energy from an energy condition at the aforesaid low radio frequency tag.

The present invention also broadly provides a system for detection and tracking of inanimate and animate objects, the aforesaid system comprising: a low radio frequency tag carried by each of the objects, the aforesaid tag comprising a tag communication inductive antenna operable at a first radio frequency not exceeding 1 megahertz, a transceiver operatively connected to the aforesaid tag communication inductive antenna, the aforesaid transceiver being operable to transmit and receive data signals at the aforesaid first radio frequency, a data storage device operable to store data comprising identification data for identifying the aforesaid tag, a programmed data processor operable to process data received from the aforesaid transceiver and the aforesaid data storage device and to send data to cause the aforesaid transceiver to emit an identification signal based upon the aforesaid identification data stored in the aforesaid data storage device, and an energy source for activating the aforesaid transceiver and the aforesaid data processor, the aforesaid energy source comprising a tag energization inductive antenna operable to receive radio frequency energy from an ambient radio frequency field of a second radio frequency not exceeding 1 megahertz, the aforesaid second radio frequency being substantially different than the aforesaid first radio frequency; a field communication inductive antenna disposed at a distance from each object that permits effective communication therewith at the aforesaid first radio frequency; a receiver in operative communication with the aforesaid field communication inductive antenna, the aforesaid receiver being operable to receive data signals at the aforesaid first radio frequency from the aforesaid low radio frequency tag; a transmitter in operative communication with the aforesaid field communication inductive antenna, the aforesaid transmitter being operable to send data signals at the aforesaid first radio frequency to the aforesaid low frequency tag; a reader data processor in operative communication with the aforesaid receiver and the aforesaid transmitter; a field energization inductive antenna operable to produce the aforesaid ambient radio frequency field at the tag energization inductive antenna of the aforesaid object; a drilling apparatus operable to drill a wellhole into the earth's formations for extracting a natural resource selected from oil, natural gas, and water and to insert a drillstring of interconnected pipes into the aforesaid wellhole; and a plurality of serially interconnectable pipes, each pipe comprising a wall portion which comprises an outer surface, the aforesaid low radio frequency tag being attached to the aforesaid pipe at the aforesaid outer surface, both the aforesaid field communication inductive antenna and the aforesaid field energization inductive antenna being positioned and configured to encircle a lateral cross-section of each the aforesaid pipes at said distance therefrom, said distance being at least 1.0 feet.

According to a preferred embodiment, the aforesaid drilling apparatus comprises: a base platform operable for guiding an end of a first pipe into the aforesaid wellhole and into interconnection with a corresponding end of a second pipe that is already disposed in the aforesaid wellhole, a positioning fixture that is attached to the aforesaid base platform and operable to position and configure both the aforesaid field communication inductive antenna and the aforesaid field energization inductive antenna to encircle a lateral cross-section of the aforesaid first pipe at the aforesaid distance of at least 1.0 feet therefrom.

For better reception, it is preferred that the aforesaid tag communication inductive antenna and the aforesaid tag energization inductive antenna are mutually oriented and positioned to substantially minimize inductive coupling therebetween. Preferably, the aforesaid first radio frequency is an integral multiple of the aforesaid second radio frequency. For example, the aforesaid first radio frequency may be 128 kHz and the aforesaid second radio frequency may then be selected from 64 kHz, 32 kHz, 16 kHz, and 8 kHz.

According to a preferred embodiment, the aforesaid tag communication inductive antenna comprises a wound ferrite coil, and the aforesaid tag energization inductive antenna comprises a wound ferrite coil. Preferably, the aforesaid tag communication inductive antenna comprises a wound ferrite coil having a first axis and the aforesaid tag energization inductive antenna comprises a wound ferrite coil having a second axis that is substantially orthogonal to the aforesaid tag communication inductive antenna. Moreover, it is preferred that the aforesaid tag communication inductive antenna comprising a first plurality of turns of wire, the aforesaid tag energization inductive antenna comprising a second plurality of turns of wire.

The present invention also provides a trackable hollow pipe for serial interconnection thereof and insertion into a wellhole in the earth for extracting a natural resource therefrom. The aforesaid pipe comprises: a wall portion having an outer surface; and a low radio frequency tag attached to the aforesaid hollow pipe at the aforesaid outer surface, the aforesaid low radio frequency tag comprising: a tag communication inductive antenna operable at a first radio frequency not exceeding 1 megahertz, a transceiver operatively connected to the aforesaid tag communication inductive antenna, the aforesaid transceiver being operable to transmit and receive data signals at the aforesaid first radio frequency, a data storage device operable to store data comprising identification data for identifying the aforesaid low radio frequency tag, a programmed data processor operable to process data received from the aforesaid transceiver and the aforesaid data storage device and to send data to cause the aforesaid transceiver to emit an identification signal based upon the aforesaid identification data stored in the aforesaid data storage device; and an energy source for activating the aforesaid transceiver and the aforesaid data processor, the aforesaid energy source comprising a tag energization inductive antenna operable to receive radio frequency energy from an ambient radio frequency field of a second radio frequency not exceeding 1 megahertz, the aforesaid second radio frequency being substantially different than the aforesaid first radio frequency.

According to a preferred embodiment, the aforesaid first radio frequency is an integral multiple of the aforesaid second radio frequency.

For this purpose, the aforesaid tag communication inductive antenna may comprise a first plurality of turns of wire, while the aforesaid tag energization inductive antenna may then comprise a second plurality of turns of wire. Preferably, both the aforesaid tag communication inductive antenna and the aforesaid tag energization inductive antenna each comprise a wound ferrite coil. According to a preferred embodiment, the aforesaid low radio frequency tag comprises a frequency multiplier operable to integrally multiply the second radio frequency and to generate a clock signal at the aforesaid first radio frequency and to supply the aforesaid clock signal to the aforesaid transceiver.

Preferably, each trackable hollow pipe further comprises at least one indicator device which is automatically operable upon receipt by the aforesaid transceiver of a data signal that corresponds to the aforesaid identification data stored at the aforesaid data storage device.

Additionally, each trackable drillpipe may also comprise a sensor operable to generate a status signal upon sensing a condition experienced by an object that carries the aforesaid low radio frequency tag, and a clock to generate a time signal corresponding to the aforesaid status signal, the aforesaid data storage device being operable to store corresponding pairs of status and time signals as a temporal history of conditions experienced by the aforesaid object. Preferably, the aforesaid programmed data processor is operable to cause the aforesaid transceiver to automatically transmit the aforesaid temporal history at the aforesaid first radio frequency upon receipt by the aforesaid transceiver of a data signal that corresponds to the aforesaid identification data stored at the aforesaid data storage device.

Moreover, the aforesaid programmed data processor may be operable to cause the aforesaid transceiver to automatically transmit the aforesaid corresponding pairs of status and time signals immediately upon generation thereof. More particularly, the aforesaid programmed data processor may be operable to compare a transmitted ID code with a stored ID code and, in the event of a match, to respond to the aforesaid transmitted ID code. Advantageously, the aforesaid low radio frequency tag may comprise a sensor operable to generate a status signal value based on the value of a sensed condition, the aforesaid programmed data processor being operable to cause the aforesaid transmitter to transmit a signal when the aforesaid value reaches a preselected value.

Moreover, the aforesaid energy source preferably comprises a rectifier device operable to convert the aforesaid radio frequency energy received by the aforesaid tag energization inductive antenna into DC current.

BRIEF DESCRIPTION OF THE DRAWINGS

The accompanying drawings are schematic and not to scale and, to enhance an understanding of the invention and its enablement, the same reference numbers are used to reference the same or corresponding elements therein. Also, standard electronic symbols, which will be familiar with persons skilled in circuit design, have been used throughout the drawings.

FIG. 5 shows the practical ability to null out the antenna fields.

FIG. 32 shows the simple system configuration of a base station 202 communicating with a plurality of tags 204-207.

FIG. 33 shows a base station 202 having a clock reference 208, which base station 202 transmits power/clock RF energy via antenna 201, bathing a geographic area in RF energy providing power and clock.

FIG. 38 is a schematic elevation view of one embodiment of a tubular hollow pipe equipped with a low radio frequency tag in accordance with the invention.

FIG. 39 is a schematic cross-sectional view taken along line A-A of FIG. 38.

DETAILED DESCRIPTION

Figure 3:
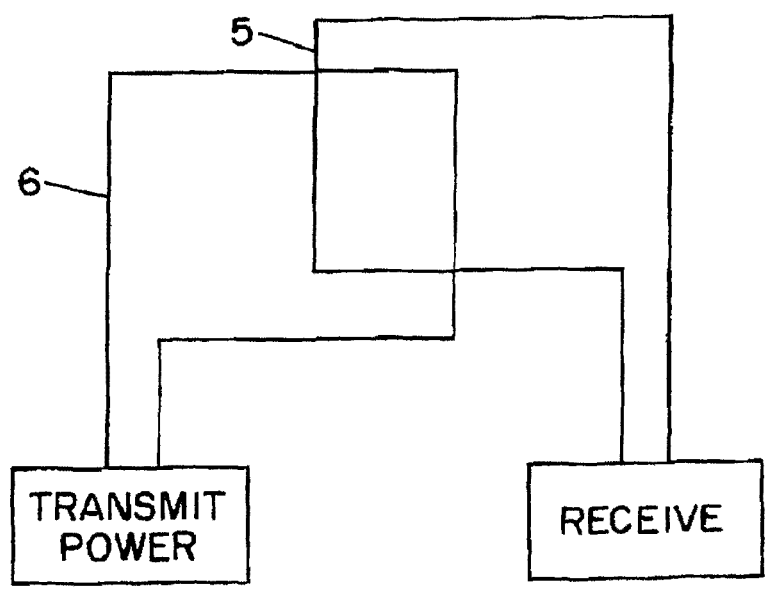
FIG. 3 shows a prior-art coil arrangement to decouple two antennas.
Figure 4:
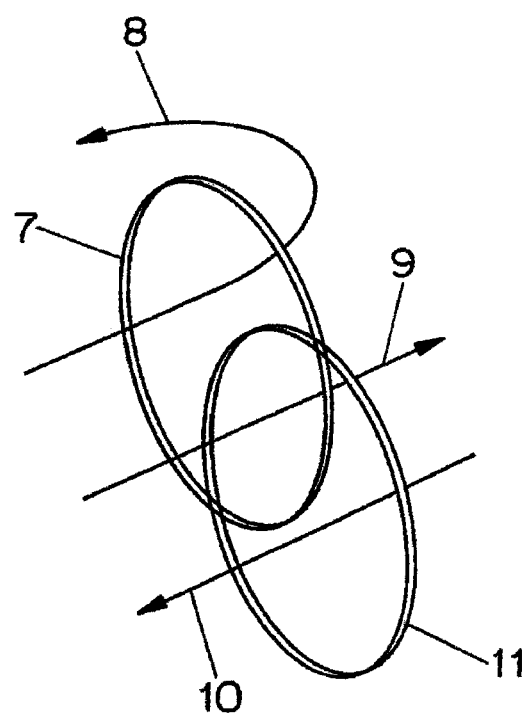
FIG. 4 illustrates the principle that leads to decoupled antennas.

Turning to FIG. 4, what is shown is the principle that leads to substantially decoupled antennas. The flux lines are shown for the arrangement in FIG. 3. Coils 7 and 11 are shifted. Flux between coils goes in one direction through center and the opposite direction outside of the coil. By shifting the position of the coils, the opposing flux lines from coil 7 and 11 may be used to null out the field so they are nearly 100% decoupled.

FIG. 5 shows the practical ability to null out the fields. In this case a signal of 132 kHz was applied to coil 12 and the voltage was measured on a high-impedance oscilloscope from coil 13. The graph below shows measured voltage in coil 13 as a function of distance D (14). The graph has converted D to a percent-overlap figure. At 15% overlap the induced voltage due to coupling is near zero. It should be understood that two antennas are "substantially decoupled" when their mutual overlap is less than 50%.

Figure 6:
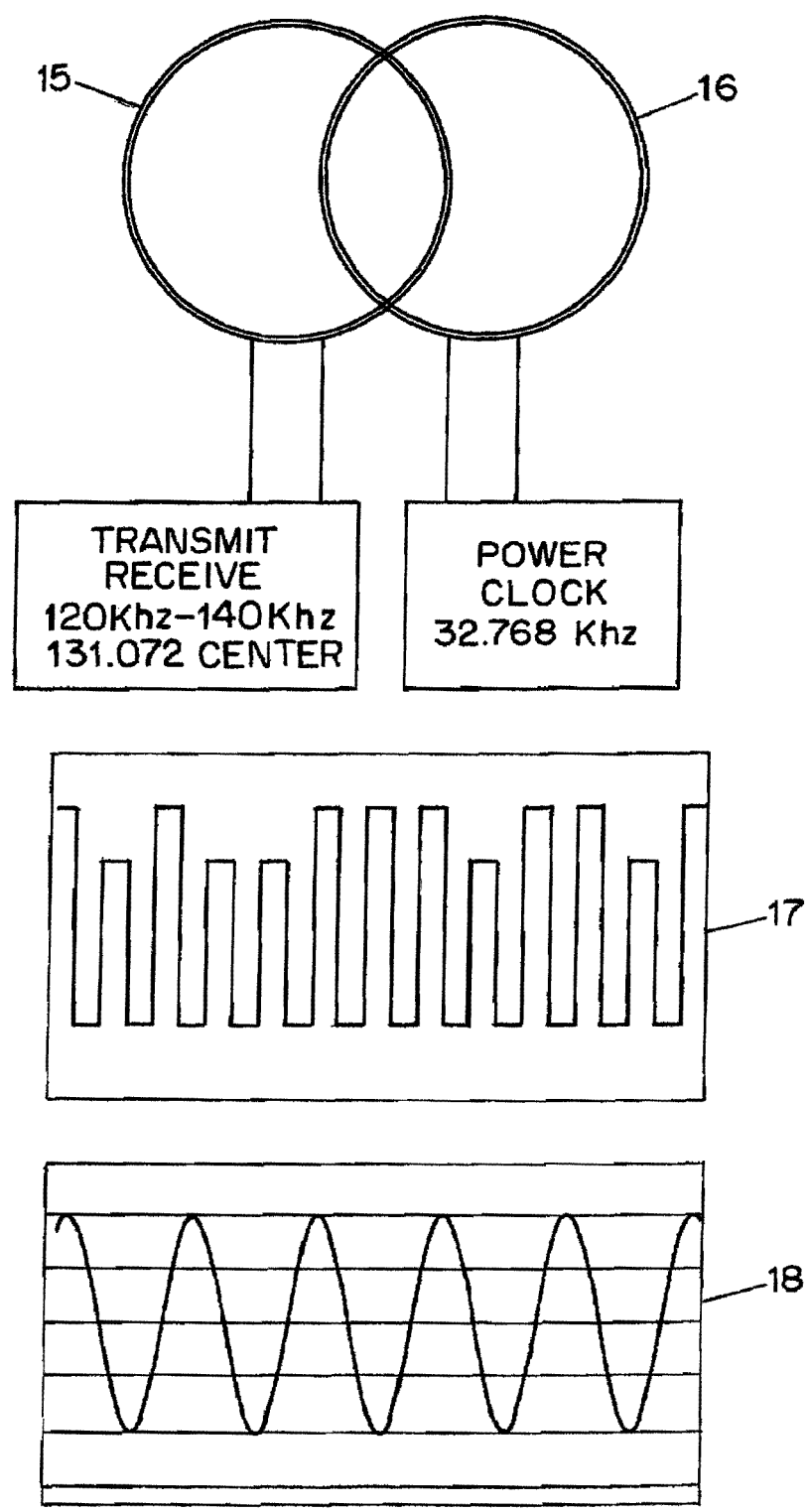
FIG. 6 shows coplanar antennas similar to those of FIG. 4 and FIG. 5, shifted in the system according to the invention.

FIG. 6 shows the co-planar antennas similar to FIG. 4 and FIGS. 5 (15 and 16), shifted in the system according to the invention so the two coils are decoupled. However, coil 15 is used for half-duplex send and receive communication, and coil 16 is used for a carrier that provides power and a time base only. Coil 16 provides for a data-free channel, with power and clock only. One of the advantages of his arrangement is that the two coils may be tuned to different frequencies for optimal performance. The power channel can be a low frequency where more power is permitted by federal regulations and the coil may be narrowly tuned with a high Q so that maximum power is transferred to the radio tag. The coil for the data channel 15 may be poorly tuned (low Q) and use a higher frequency centered at a harmonic of the power channel frequency. One advantage of the higher frequency is that higher data rates are possible. The advantage of a low-Q coil or zero Q—(not tuned) antenna is that a broadband data protocol (shown as square wave in 17) may be used creating what might be called a "poor man's spread spectrum" communications system. This makes the radio tag more reliable, even when near noise, at a low cost. A second advantage of a low-Q coil for the data channel is that when these tags are placed near steel or conductive metals at these frequencies the primary effect is that the coil is detuned. This detuning becomes more severe as frequency increases, as well as with the Q of the coil. With a low-Q coil and a high-gain amplifier (see below) on the radio tag, the effects of the steel are minimized. Stated differently, it is harder to detune a low-Q coil.

An additional feature of the invention and exemplary embodiment is to use frequencies that are harmonics of a 32.768-kHz watch crystal. The advantage is that the same radio tag may be converted to an active tag with a low-cost battery and low-cost crystal directly replacing the power channel 16. An additional advantage is that once the power channel has been activated, such an active tag and a passive tag may freely communicate.

Figure 7:
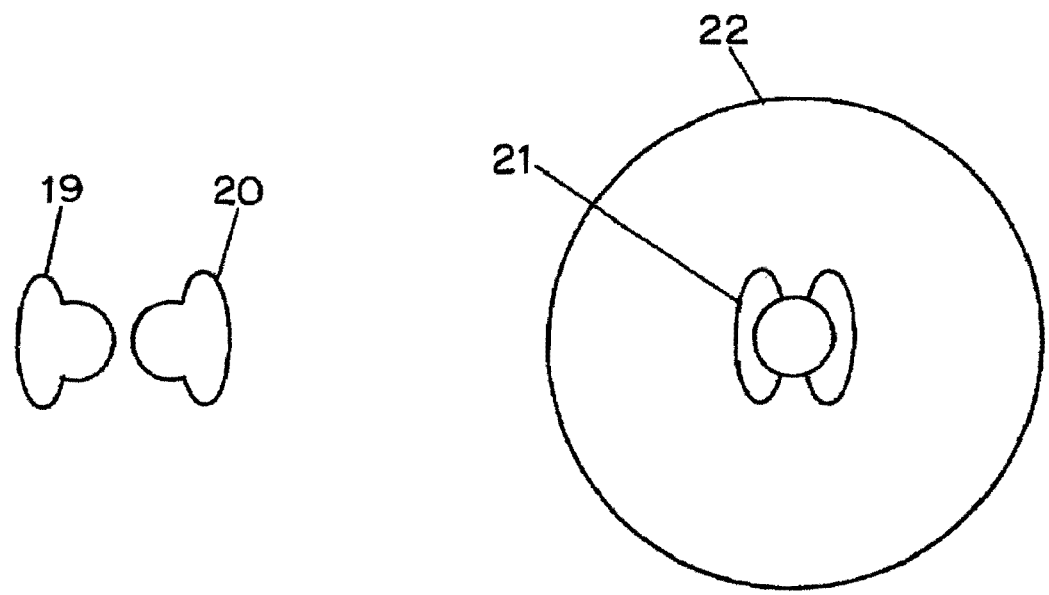
FIG. 7 shows in plan view an example application and design of a coplanar antenna on a compact disk.
Figure 8:
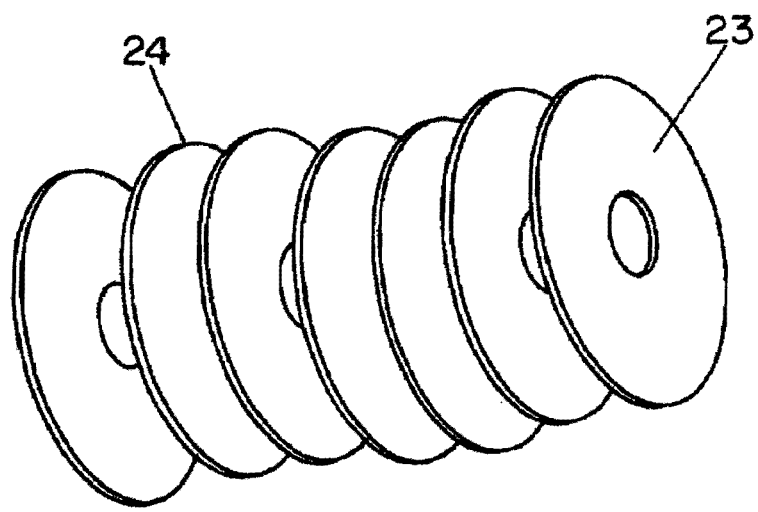
FIG. 8 shows a stack of CDs.
Figure 9:
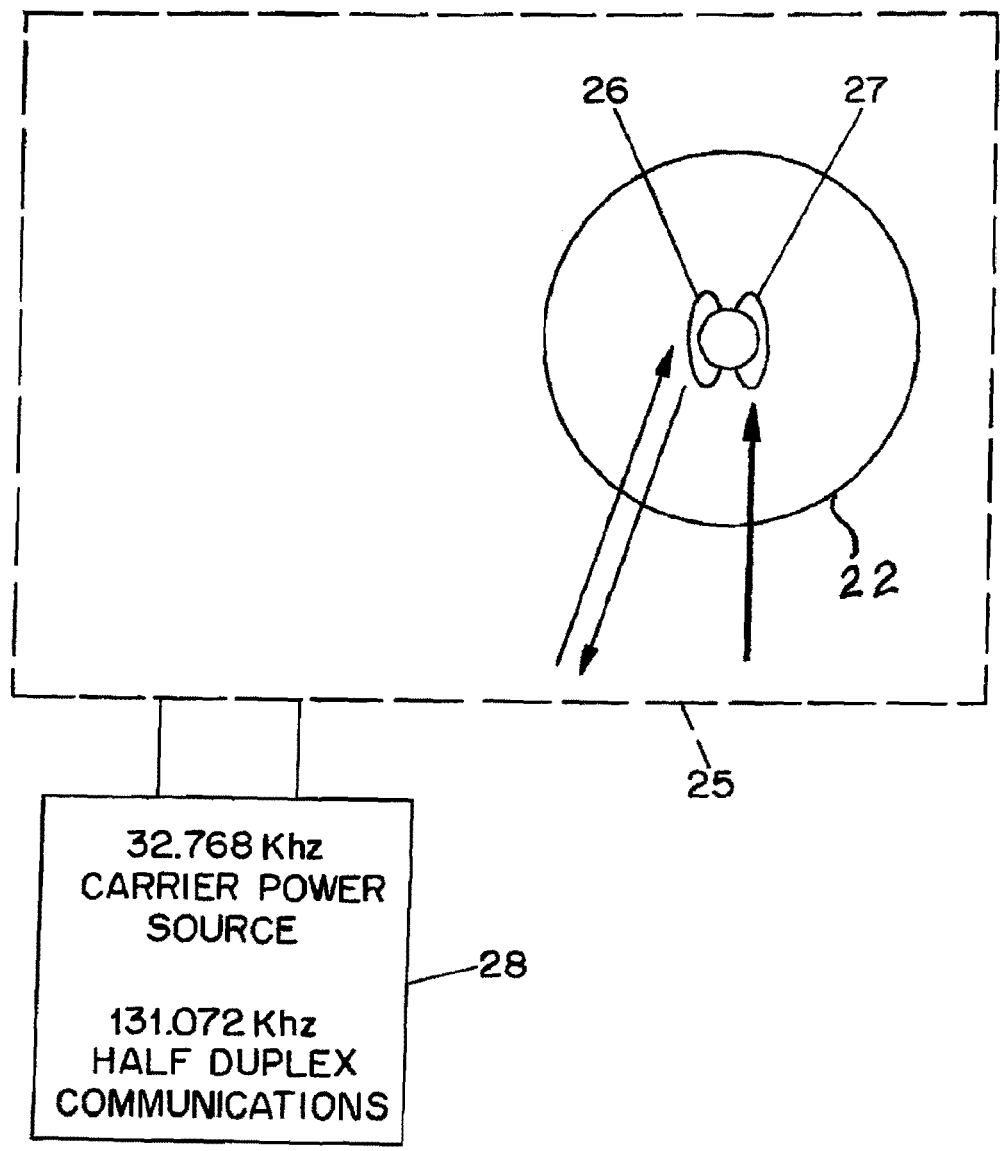
FIG. 9 shows a single antenna by which a base station may have both the power carrier and the data communications channel integrated and placed on a single antenna.

FIG. 7 shows an exemplary application and design of a coplanar antenna on a compact disk 22. The two single coil inductive antennas (19 and 20) are placed on a CD 22 so the center area is clear, but the coils 19, 20 are decoupled. One of the major problems with CDs is the aluminum conductive coat placed in the middle of the disk, in some cases in several layers, which can block higher frequency radio tags especially those that use backscattered communication mode. It can also lead, especially in a stack, to detuning of low-frequency tags. One of the advantages of the isolated power and data communication channels is the fact that the tag may function in a stack of CDs 23, 24, as shown in FIG. 8. With a number of CDs such as described above, the base station may have both the power carrier and the data communications channel integrated and placed on a single antenna 25 as shown in FIG. 9. The antenna 25 may be a single tuned inductive loop antenna similar to that described in U.S. Pat. No. 4,937,586: Radio Broadcast Communication Systems with Multiple Loop Antennas, 1990, around shelves or in an open area. The antenna provides both low-frequency power and high-frequency data communications signals to antennas 26, 27. This approach is developed further below in connection with FIG. 32.

Figure 10:
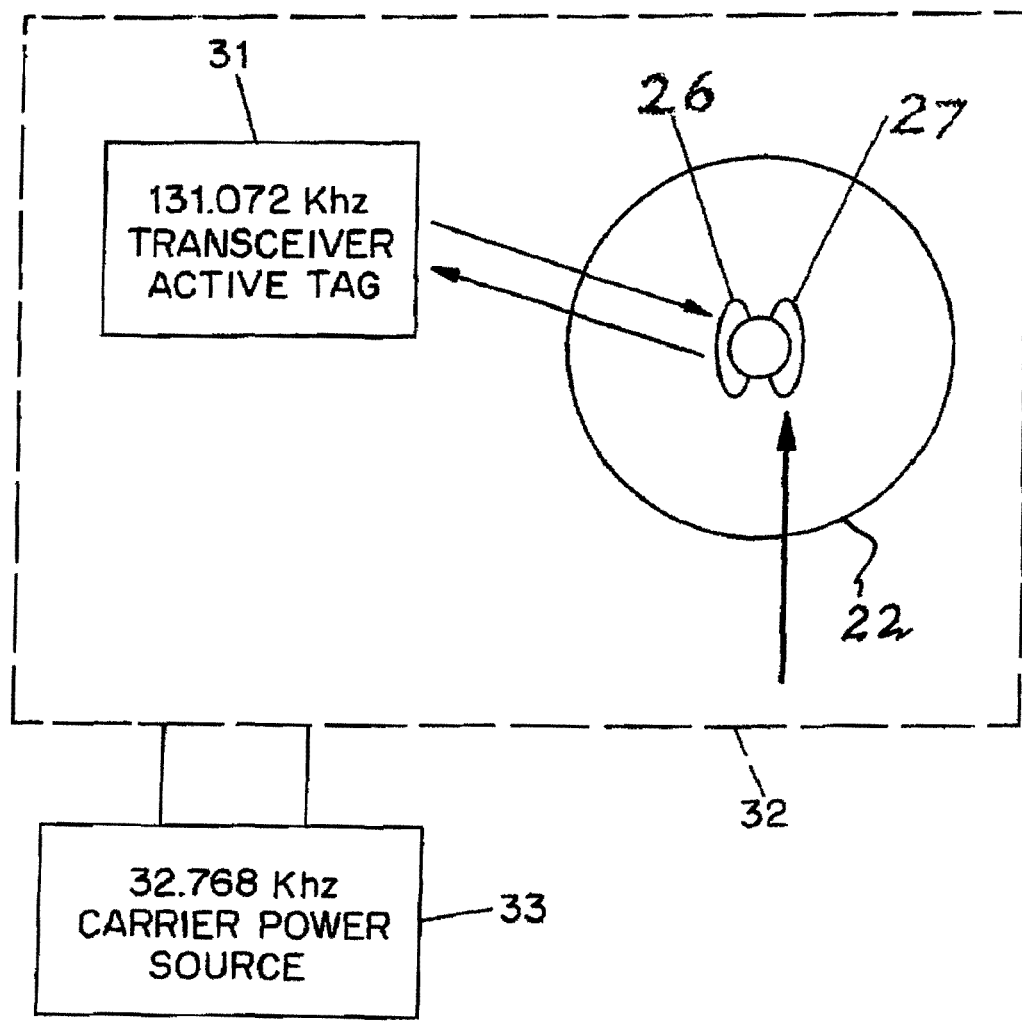
FIG. 10 shows an alternate mode of operation providing power with a loop similar to FIG. 9, and an active tag near the passive tag interrogating the passive tag.

FIG. 10 shows an alternate mode of operation. In this arrangement, power is provided with a loop similar to FIG. 9, and an active tag 31 near the passive tag may interrogate the passive tag. This makes the active tag design simple with a long battery life, since it does not have to provide the carrier required to provide power to the passive tag. This makes it possible to use low-cost Li batteries in the active tag 31, and it has a 10-15 year battery life.

Figure 11:
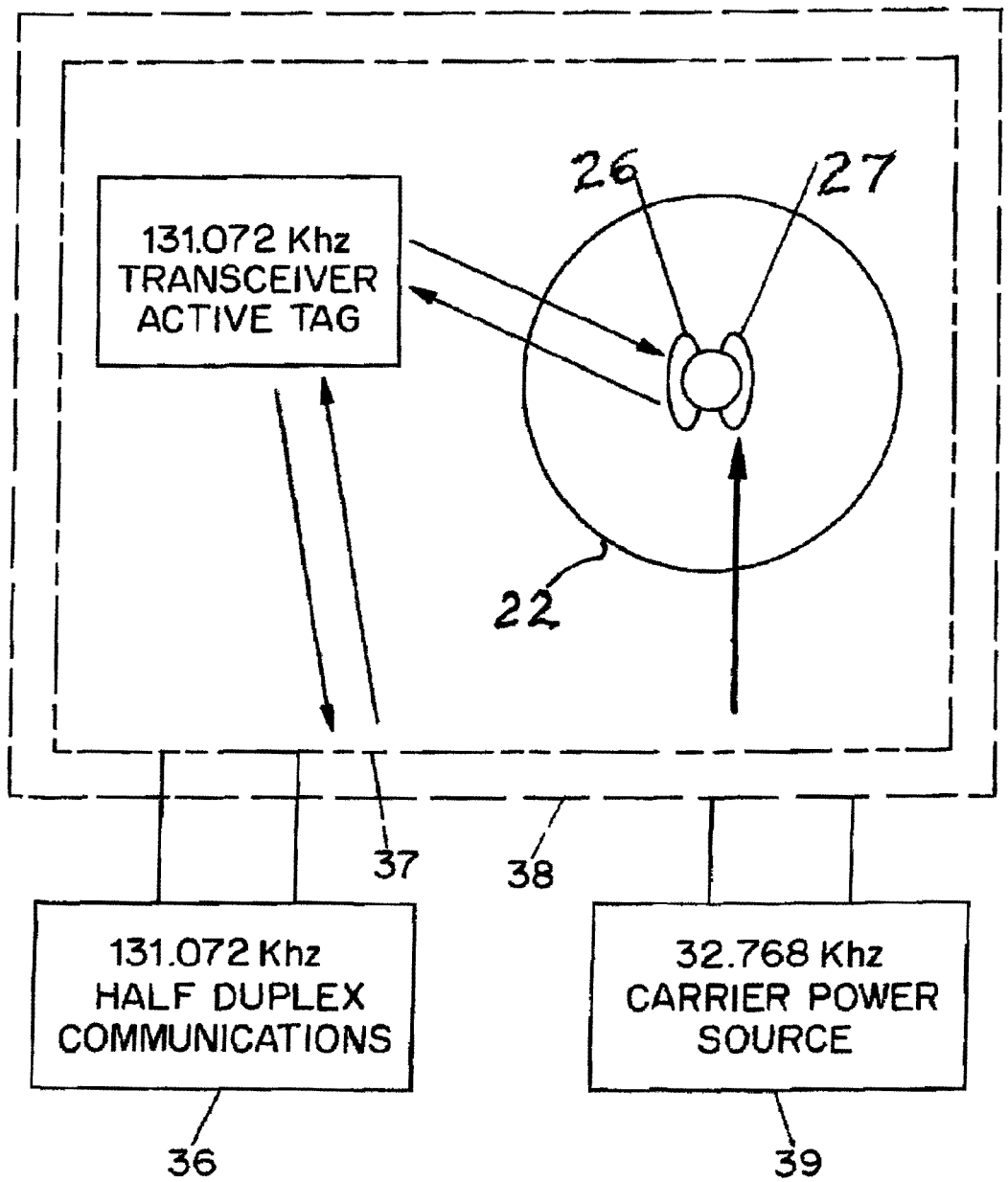
FIG. 11 shows a configuration similar that shown in FIG. 10 in which an independent base station provides data communication to both the passive and the active tag with an independent antenna.

FIG. 11 shows yet another mode of operation similar to that shown in FIG. 10. An independent base station 36 provides data communication to both the passive and the active tag with an independent antenna 37. An independent power module 39 has its own antenna that may be always on providing power and clock to the passive tags. The active tag 31 may in some cases have a fixed location on a shelf for example. Since the communication range between the active tag and the passive tag is limited to few feet, this arrangement may be used to locate passive tags within that range within an area surrounded by large loop antenna 37. Thus the base station may interrogate the active tag to see if it received a signal from a passive tag. If it did, then it is known that the passive tag is within a few feet of that particular active tag. The approaches of FIGS. 10 and 11 are developed further below in connection with FIG. 33.

Figure 12:
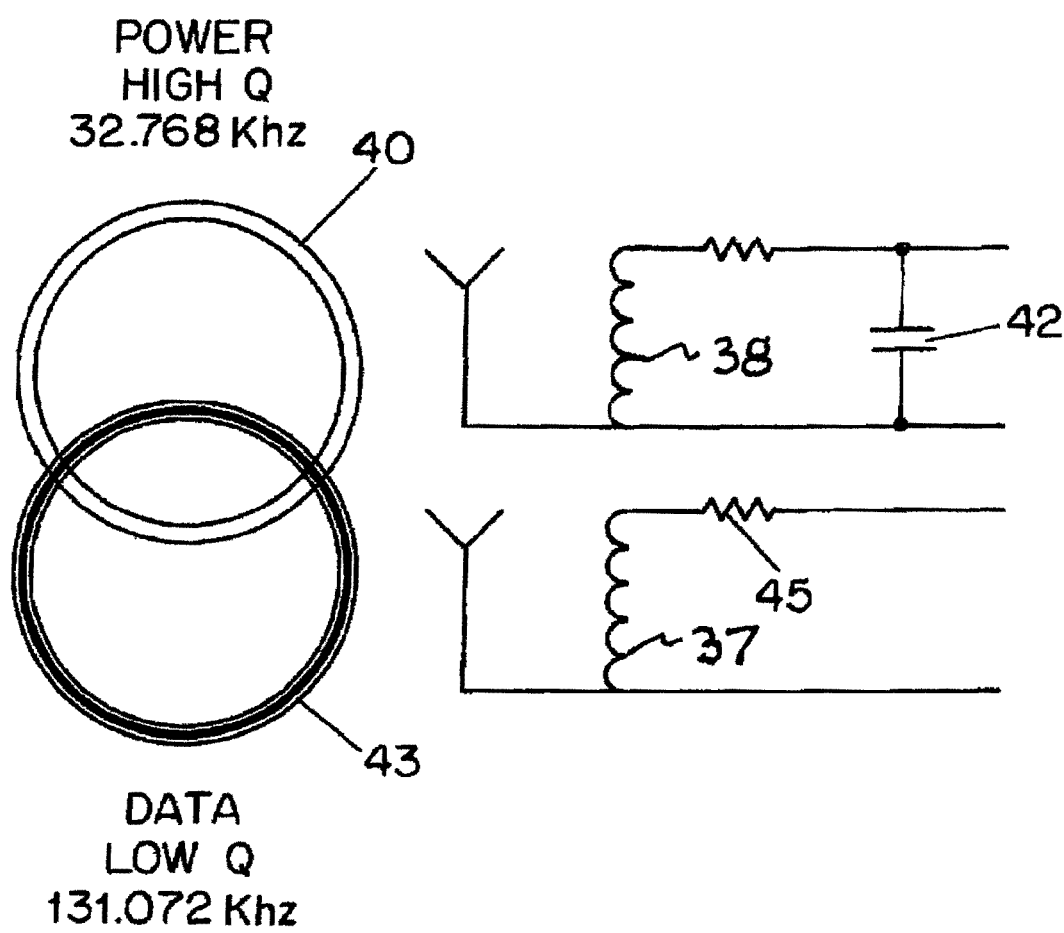
FIG. 12 shows two antennas (40, 43) on the passive radio tag placed in position so they are not inductively coupled, with differing Q.

FIG. 12 shows two antennas 40, 43 on the passive radio tag which are placed in position so they are not inductively coupled. In addition the power coil 40 has a high Q to maximize power transfer to the radio tag because power antenna 40 is tuned with capacitor 42. The data antenna 43 is poorly tuned or not tuned at all with a very low Q (no tuning capacitor). An FET transistor located on the chip amplifies the incoming signal as well as the outgoing data.

Figure 1:
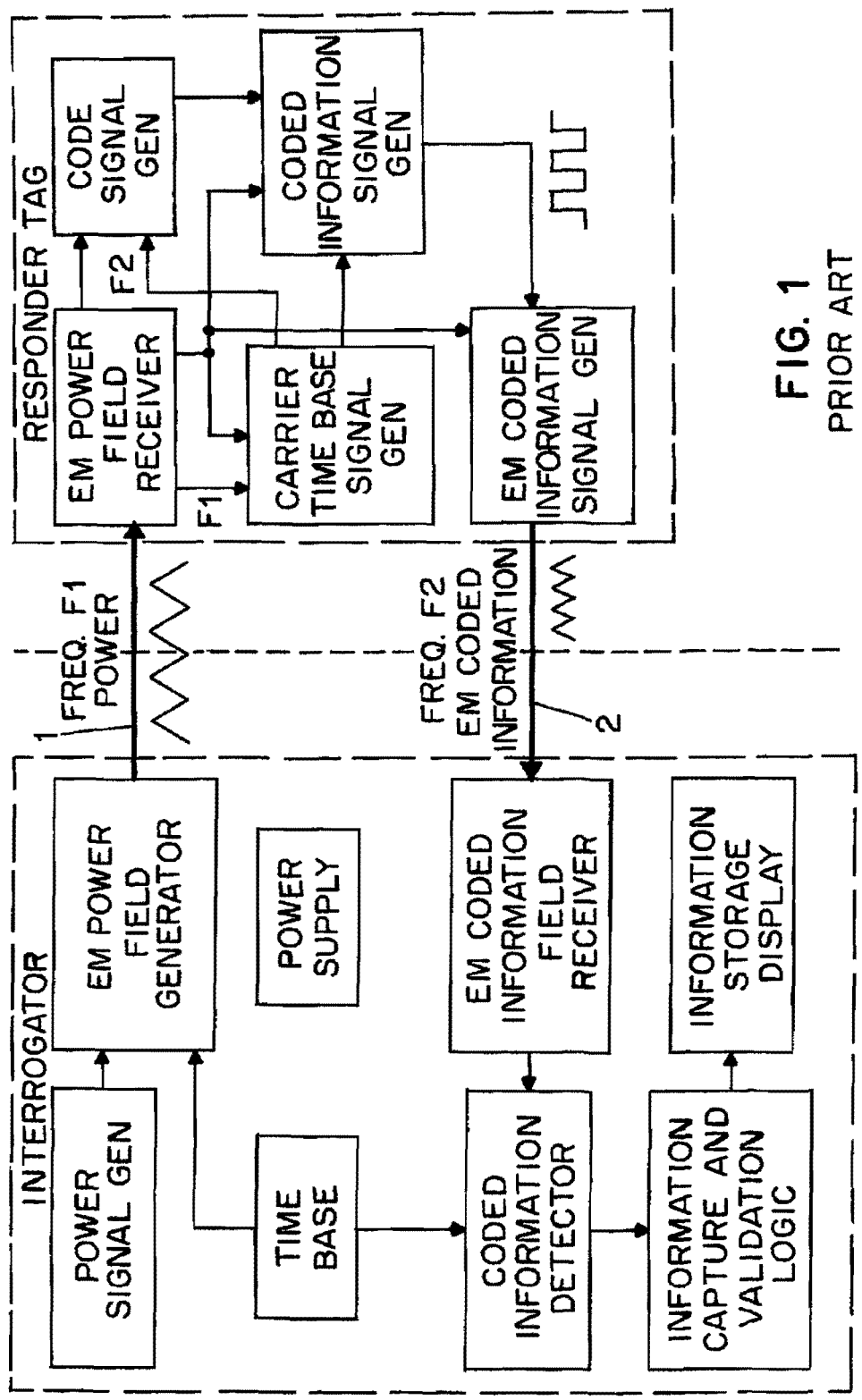
FIG. 1 shows a prior-art functional block diagram of a wireless (radio frequency) tag and an interrogator or reader which communicates with the tag.
Figure 2:
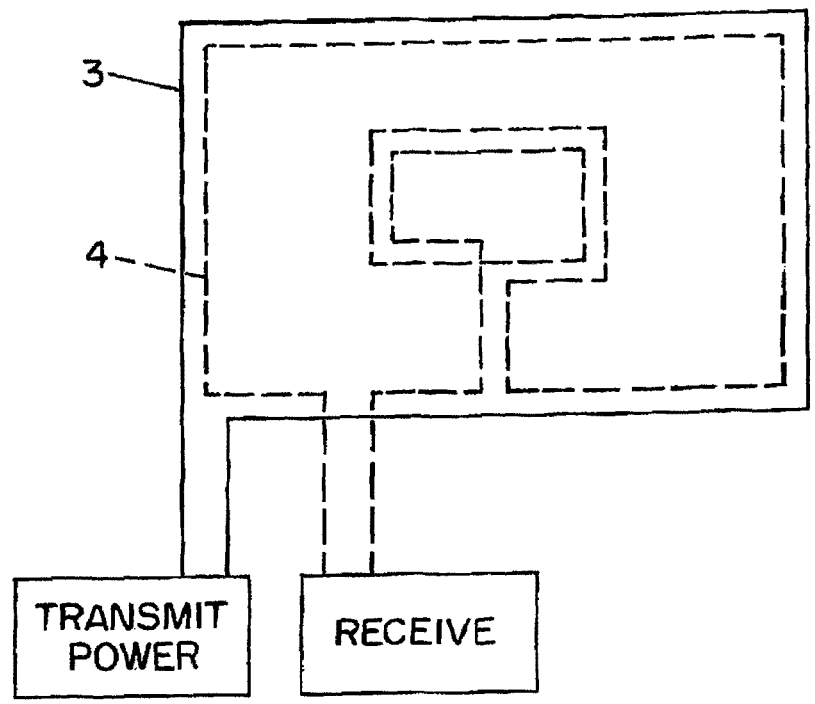
FIG. 2 shows a prior-art arrangement and method to decouple two antennas.
Figure 13:
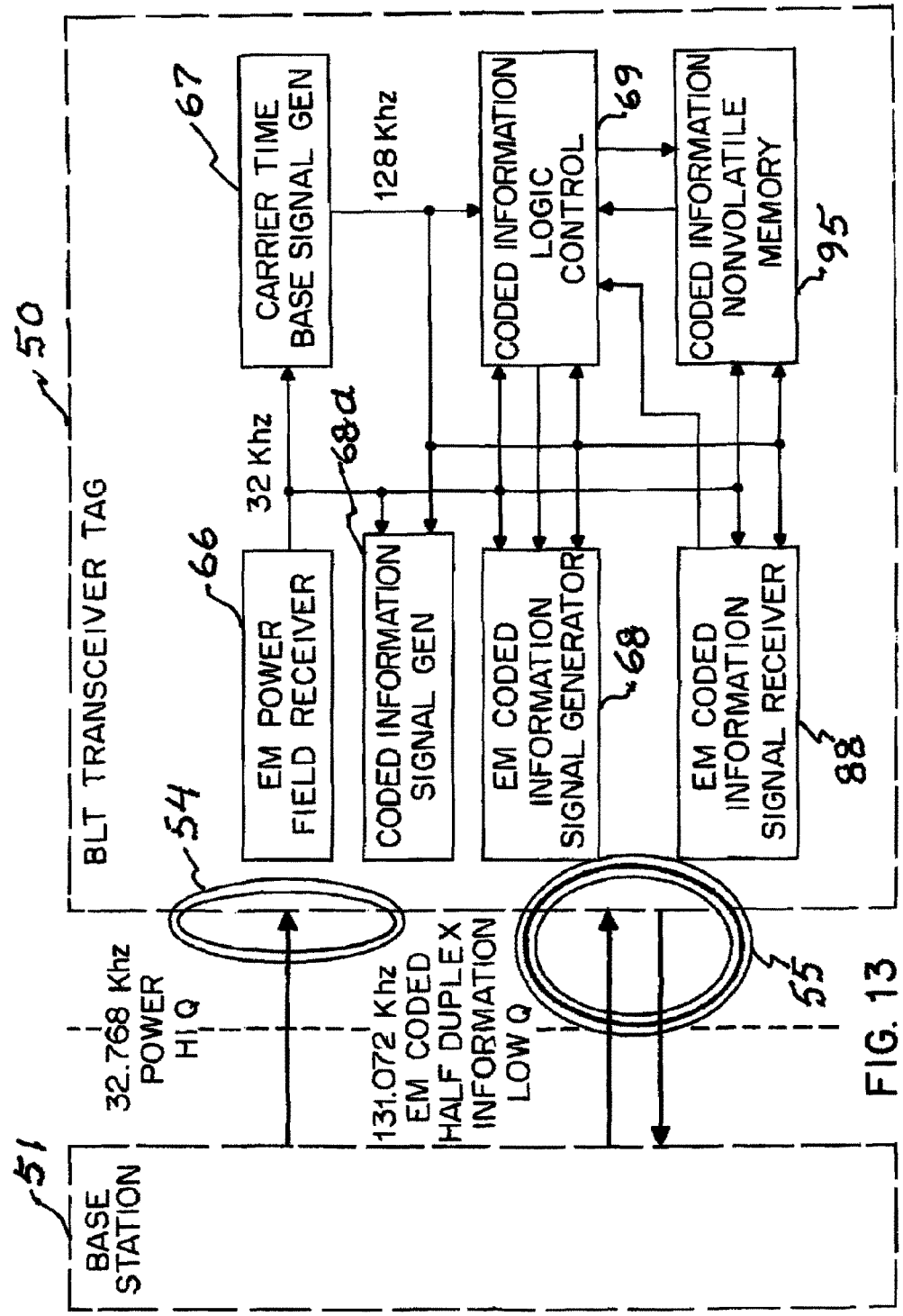
FIG. 13 shows a block diagram similar to that of FIG. 1 showing differences in the invention over the prior art.

FIG. 13 is a block diagram similar to FIG. 1, but shows differences in the invention over the prior art. The high-Q antenna is used only for time-base generation and power. In the exemplary embodiment, the frequency is the same as a watch crystal—32.768 kHz. The power antenna is data- and information-free. The low-Q antenna is a higher harmonic—in the exemplary embodiment 131.072 kHz—and transmits half-duplex data. Optional sensors for temperature similar to U.S. Pat. No. 3,713,124: Temperature Telemetering Apparatus, 1973, may be added for applications that require temperature tracking.

One key to this circuit is the Carrier Time Base Signal Generator. As proposed in the prior art, a ceramic filter could be used to accomplish the multiplication. However to keep manufacturing costs low in the passive version of the tag, external components have been eliminated. A phase-locked loop could also be used as suggested in the prior art, however, power consumption in both the active and passive tag would be unacceptably high. Therefore, a special multiplier circuit had to be designed (see FIG. 15) to minimize power consumption. U.S. Pat. No. 4,937,586: Radio Broadcast Communication Systems with Multiple Loop Antennas, 1990, used a similar two-frequency system. However, the carrier for power was higher, so that a simple divider was required to create the communications carrier and data stream. Another embodiment of this aspect of the invention is discussed below in connection with FIG. 22.

Figure 14:
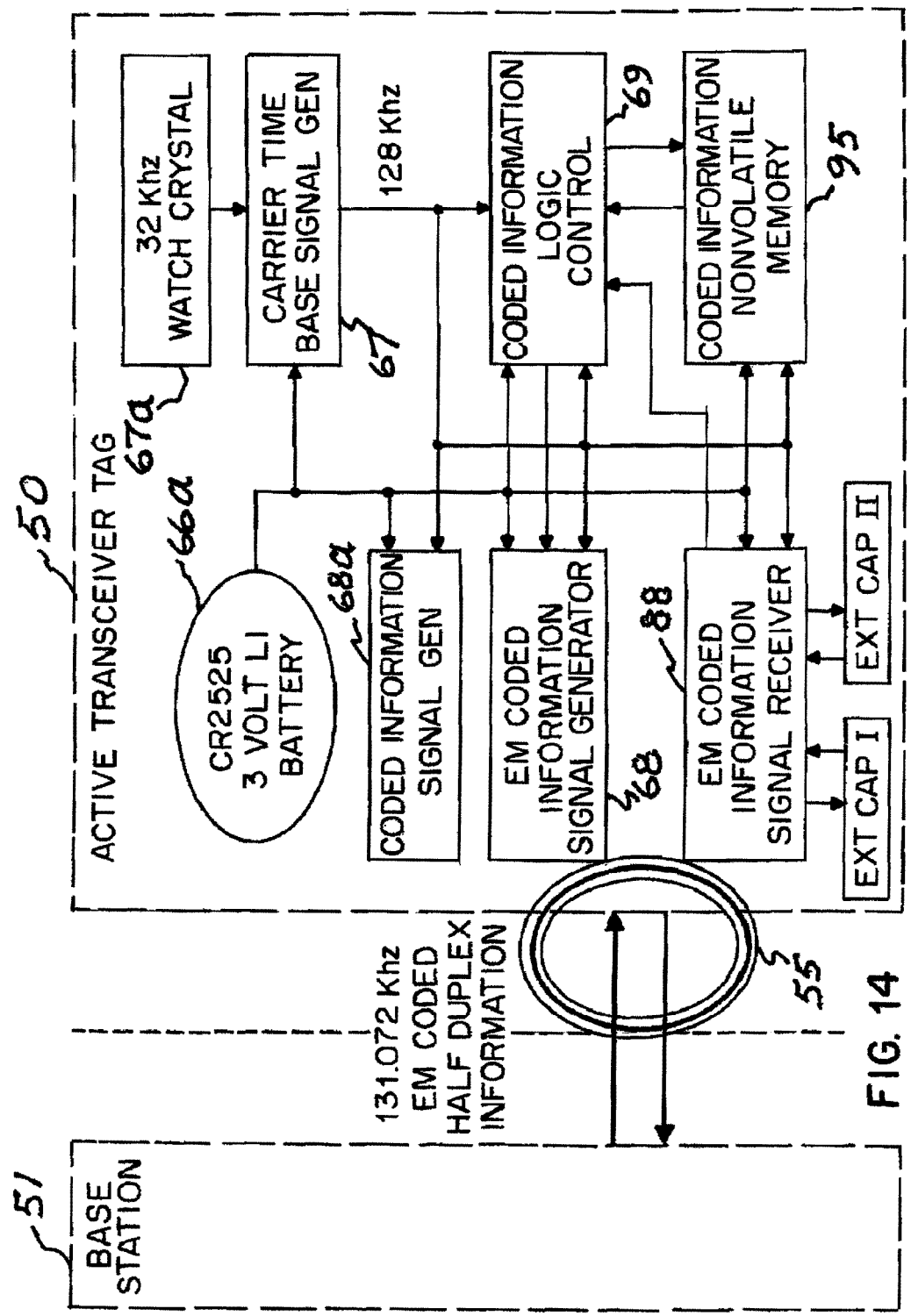
FIG. 14 shows the block diagram of FIG. 13, but with the power coil replaced by a battery and a standard watch crystal.

Turning to FIG. 14, one of the advantages of this design is that the power 66a coil can optionally be replaced by an energy storage device such as a battery and clock such as a standard watch crystal 67a, both low in cost. In this way, an active tag can be created that has much longer range, with a long battery life. Li batteries can be as low in cost as 5 cents and watch crystals are also under 5 cents. While the tag is larger, it has many applications and can communicate with the passive version of the tag. Optionally, sensors can be added that can be used to maintain a data log in these tags. LEDs can be added to identify a tag for pick-and-place applications. Optional external capacitors can be added that make it possible to have a higher-gain amplifier for both receiving and transmitting. LCD displays can be added to display price in retail setting or other information. Thus, a fully integrated system can be created that can provide visibility for inventory, using the passive tag with an active tag that might have a display (similar to that described in U.S. Pat. No. 4,879,756: Radio Broadcast Communication Systems, 1989) to display price and or stock levels. In addition, both the active tag and the passive tag may be useful in an EAS system to prevent pilferage.

Figure 15:
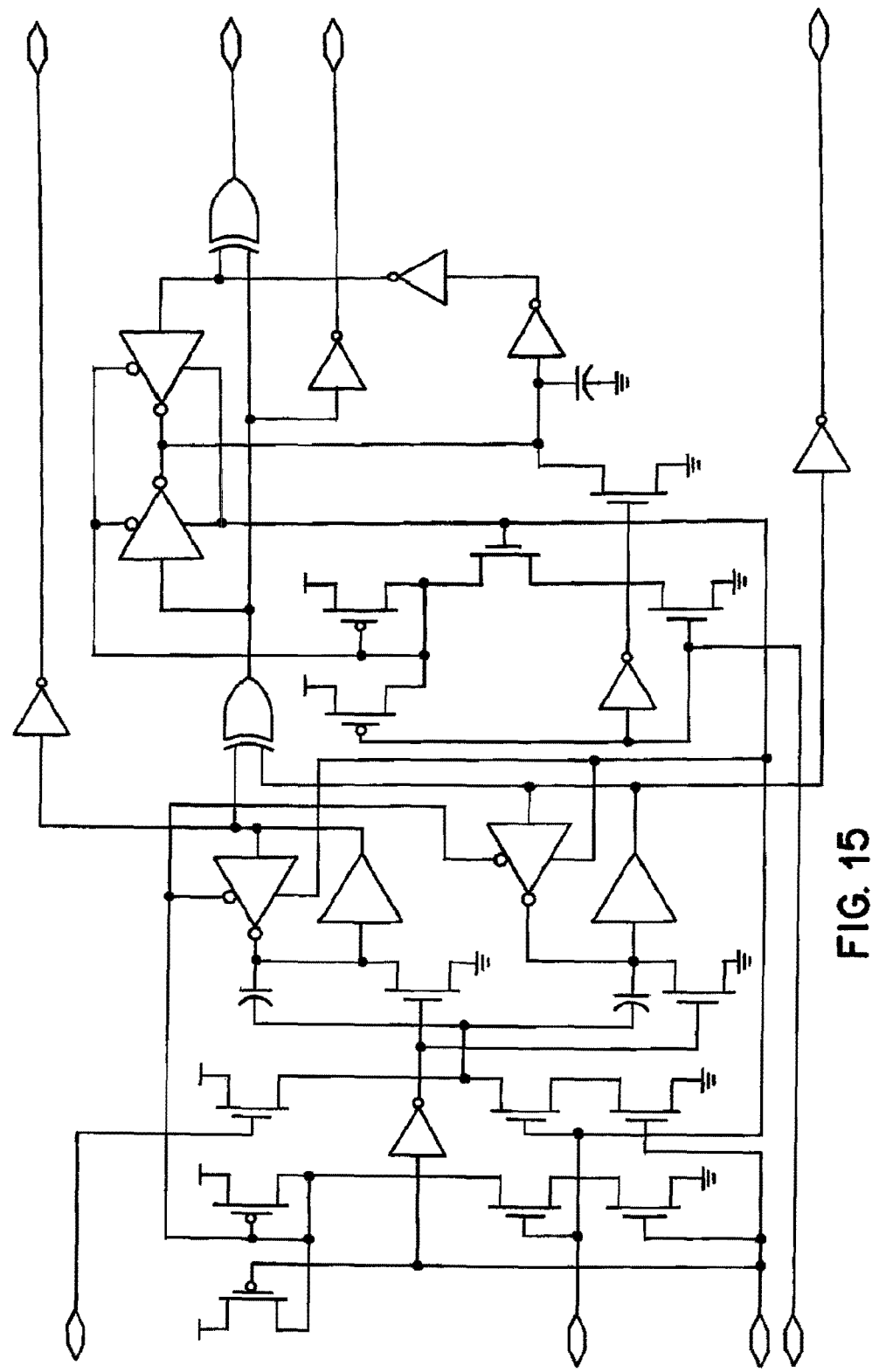
FIG. 15 shows in schematic form a multiplier circuit that makes possible the use of a low frequency power time base carrier.

FIG. 15, as mentioned above, is a multiplier circuit that makes possible the use of a low frequency power time base carrier. It also makes use of a 32.768-kHz crystal possible in an active tag.

Figure 16:
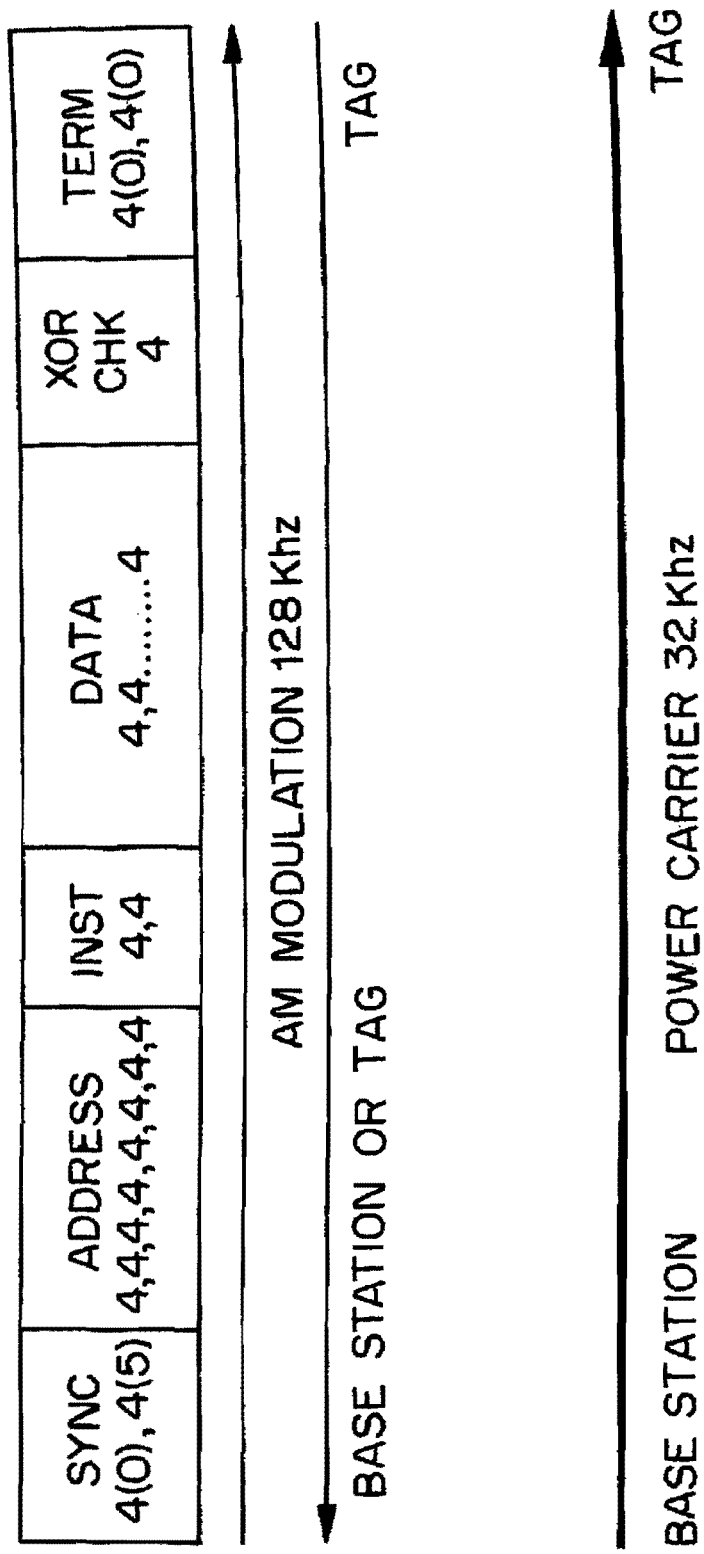
FIG. 16 shows an exemplary protocol for the tags.

FIG. 16 shows a standard protocol for the tags. In the exemplary embodiment, AM (normally called ASK or "amplitude shift keying") modulation is used over FSK or other frequency-dependent methods for several reasons. The circuitry to decode and encode AM is simple. A wide bandwidth signal is useful to maximize data detection so it functions as a spread-spectrum system. Optionally, PSK may be used as well because of its higher reliability in high-noise environments. Both PSK and AM have better channel data rates then FSK, thus they are much more useful at lower frequencies when bandwidth and data rate is an issue.

Figure 17:
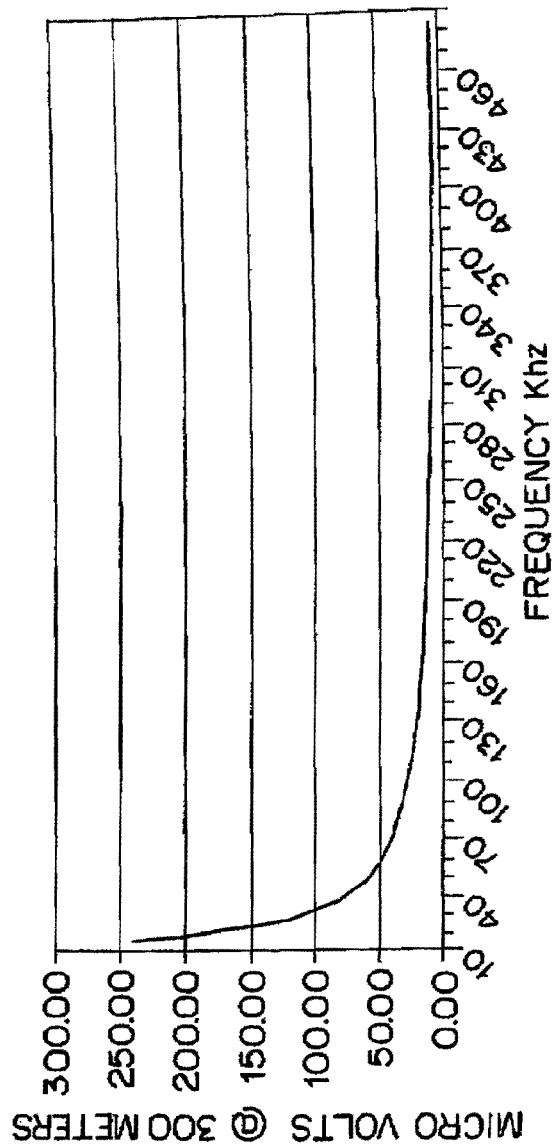
FIG. 17 shows field strength as a function of distance.

FIG. 17 depicts graphically one additional advantage of using a lower frequency as the power carrier (over U.S. Pat. No. 4,879,756: Radio Broadcast Communication Systems, 1990), namely that power limits imposed by the FCC Part 15 regulations are given as a function of frequency from 9 kHz to 1.705 MHz. In addition, the distance to make Part 15 measurements below 490 kHz is 300 meters. The graph below shows the number of microvolts under Part 15 that is acceptable. The graph shows the advantage of using low frequencies below 70 kHz for transfer of maximum power.

It may be helpful, in illustrating the invention, to describe in extreme detail the internal function of the passive low radio frequency tag according to the invention.

Figure 18:
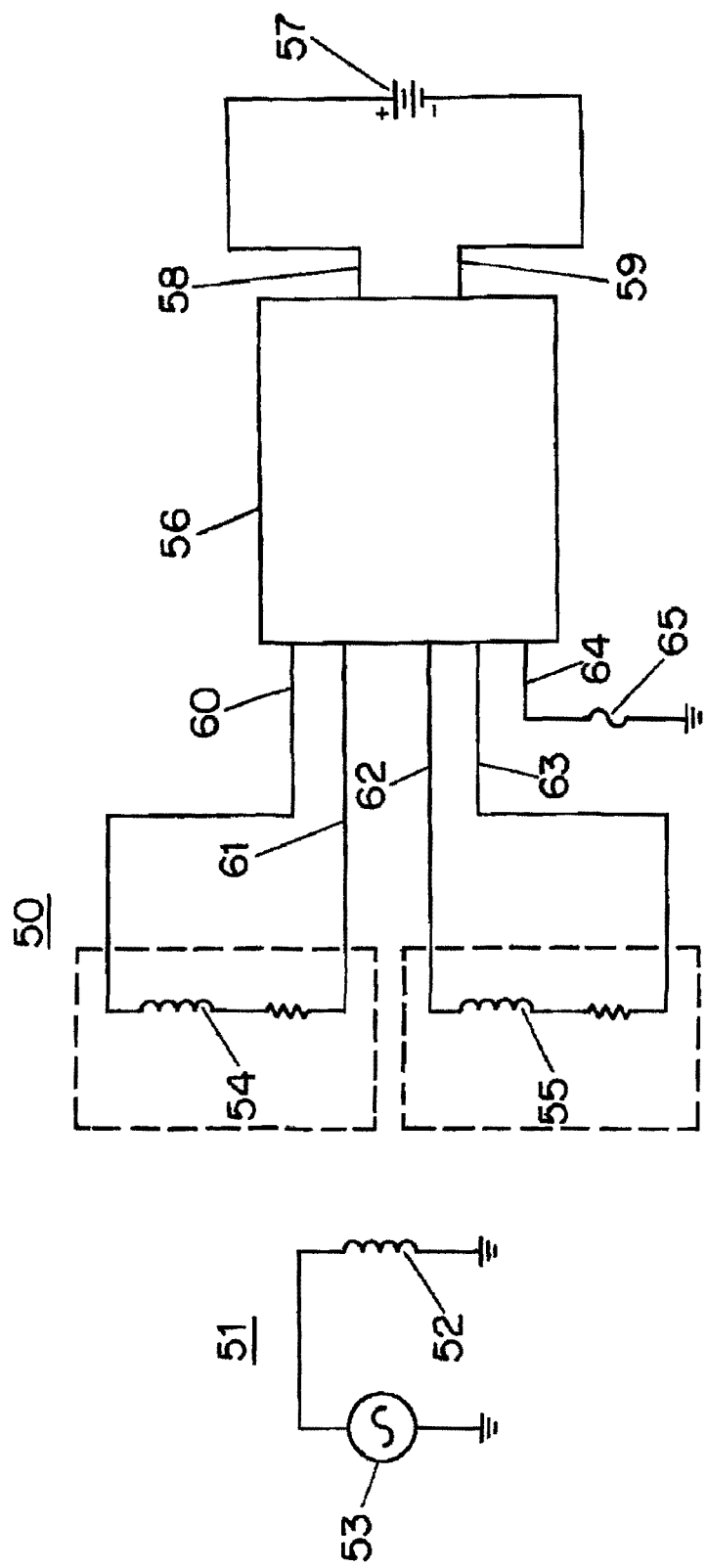
FIG. 18 shows a top-level system diagram for a transponder or tag 50 according to the invention, including chip 56.

As may be seen in FIG. 18, the device 51 serves as a reader or interrogator that interacts with the passive low radio frequency tag 50 is modeled as a voltage source 53 coupled to an antenna 52, in this exemplary embodiment having an inductance of 100 microhenries. The device 51 in a simple case is a single base station as shown in FIG. 9. In the more general case, however, the device 51 is a combination of a power transmitting station 33 (FIG. 10) and one or more active tags 31. Still more generally, the device 51 may be a base station interacting with the tag 50, as well as one or more active tags interacting with the passive low radio frequency tag 50 (FIG. 18).

The passive low radio frequency tag 50 has a first antenna 54, the "tag energizer inductive antenna", connected to a chip 56 by leads 60, 61. This antenna 54 supplies power to the chip 56 during times when antenna 54 is bathed in suitable excitation RF energy. Antenna 54, in an exemplary embodiment, has an impedance of 16 millihenries with a nominal resistance of 420 ohms. The tag passive low radio frequency 50 has a second antenna 55, the "tag communication inductive antenna", connected to the chip 56 by leads 62, 63. This antenna 55, when the chip 56 is in receive mode, supplies data to the chip 56. When the chip 56 is in transmit mode, the antenna 55 transmits the data as an RF signal based upon a drive signal from the chip 56. Antenna 55, in an exemplary embodiment, has an impedance of 16 millihenries with a nominal resistance of 420 ohms.

In an exemplary embodiment, each of the tag coils 54, 55 is about 1 inch in diameter and has about 75 and 300 turns of copper wire, respectively.

An optional battery 57, in an exemplary embodiment, may be a three-volt lithium cell which may be connected to the chip 56 by leads 58, 59.

In one exemplary embodiment, the power RF energy (excitation energy) bathing the antenna 54 is at 131 kHz, and the return data transmitted via antenna 55 is at 256 kHz. In another exemplary embodiment, the excitation energy is 65536 Hz and the return data is at 131072 Hz. If it is determined that external components can be used, such as capacitors on the antennas 54, 55, lower frequencies might be used such as an excitation signal.

An EAS (electronic article surveillance) fusible link 65 is connected to the chip 56 by lead 64. This link is present (is electrically conductive) from the factory. At a later time, for example at the time of purchase of a product, the link can be "blown" by application of an appropriate field or signal.

Figure 19:
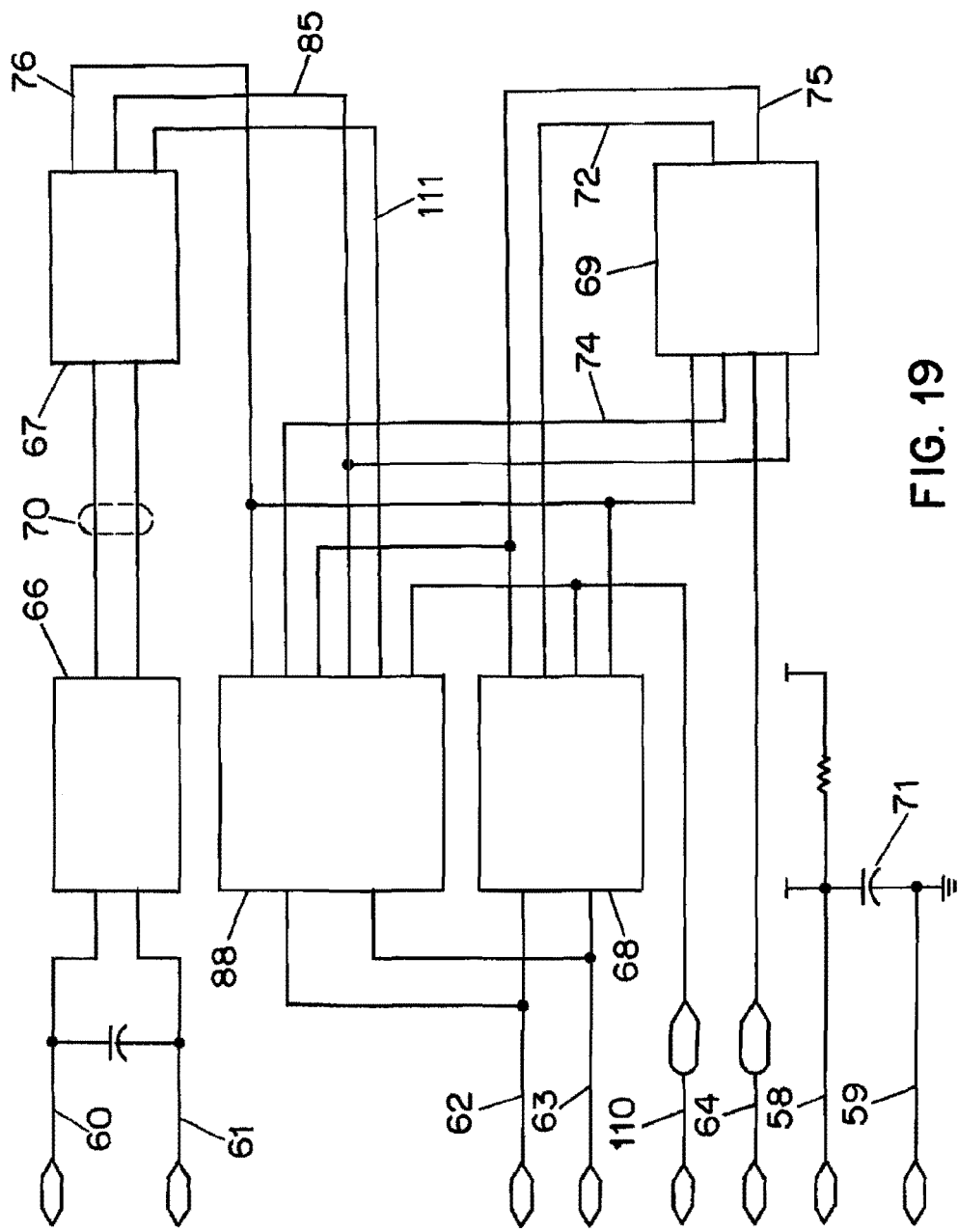
FIG. 19 shows the chip 56 of FIG. 18 in greater detail, including rectifier 66, RF transmit driver 68, analog portions 67 and 88 and logic portion 69.
Figure 20:
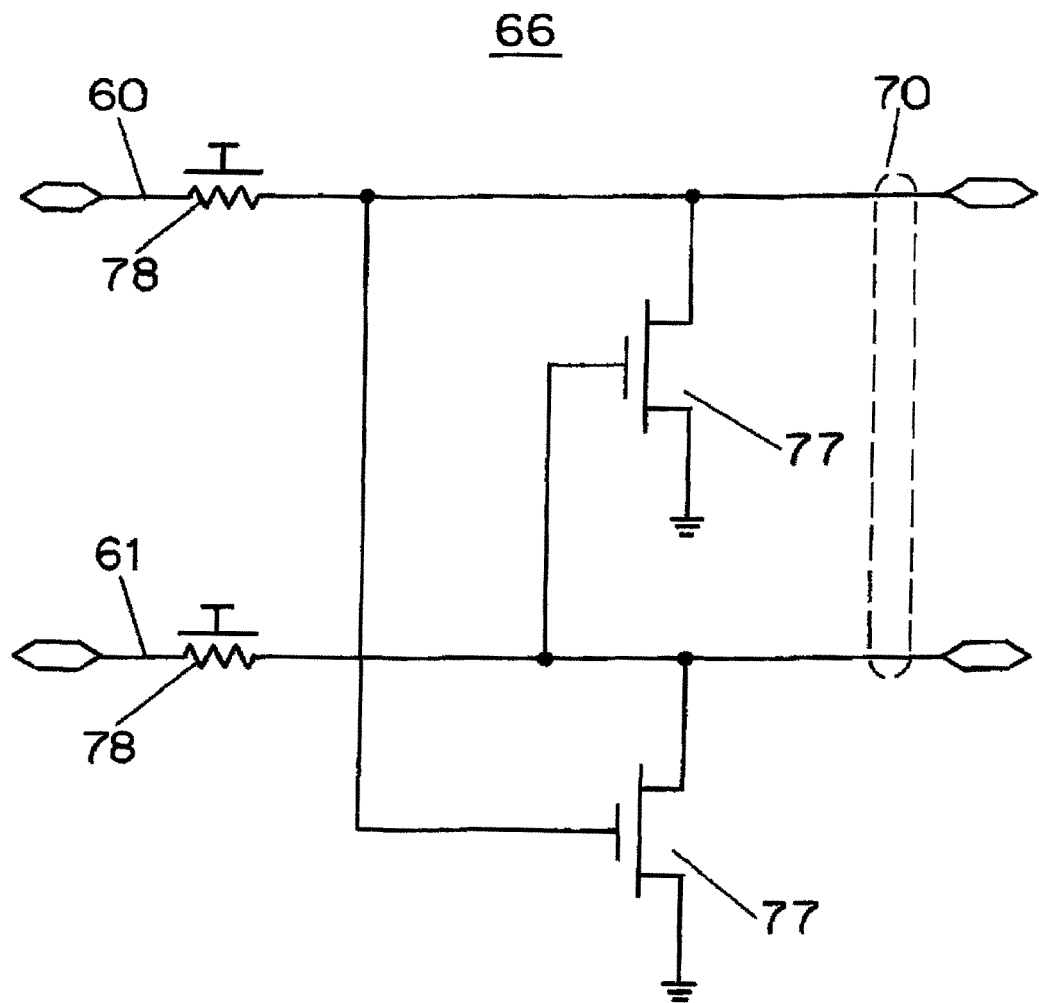
FIG. 20 shows rectifier 66, first introduced in FIG. 19, in more detail.
Figure 21:
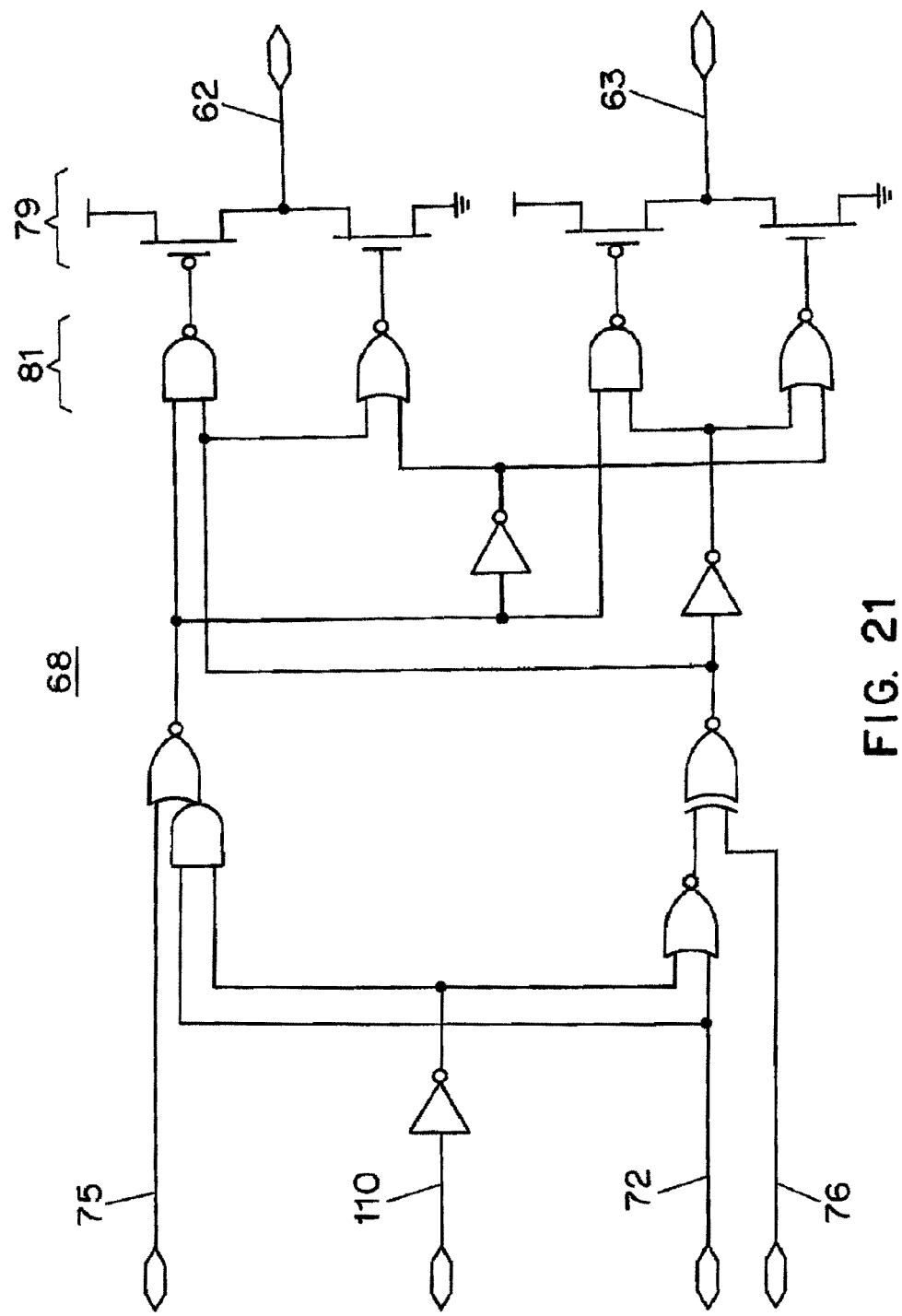
FIG. 21 shows transmit driver 68, first introduced in FIG. 19, more detail.

FIG. 19 shows the chip 56 of FIG. 18 in greater detail. Power enters the chip 56 by leads 60, 61 and passes to rectifier 66, about which more will be said later in connection with FIG. 20, and rectifier 66 also provides clock signals on clock leads 70. An RF transmit driver 68 may be seen and will be discussed in more detail in connection with FIG. 21.

If optional battery power is provided at leads 58, 59, this power is filtered by bypass capacitor 71 and is provided to the rest of the chip at VDD.

The balance of the circuitry of chip 56 is grouped into analog portions 67 and 88 and logic portion 69, about which more will be said later. Analog portion 67 is discussed in more detail in connection with FIG. 22. Analog portion 99 is discussed in more detail in connection with FIG. 25. Logic portion 69 is discussed in more detail in connection with FIG. 26. Line 111 (NREF) is a reference voltage for various N-channel MOSFETs used in the analog portions of the chip.

Transmit path. Sometimes logic 69 will wish to transmit data external to the tag 50 by means of antenna 55 (FIG. 18). To do this, transmit enable line 75 is asserted and a serial data signal is sent on line 72, both to driver circuitry 68, about which more will be said later in connection with FIG. 21. The transmit signal line 72 is passed through the driver to leads 62, 63 and thence to antenna 55 (FIG. 18).

Receive path. An RF signal received by antenna 55 (FIG. 18) passes to receiver 88. The received serial data signal then passes on line 74 to logic portion 69.

EAS line. The EAS line 64 connects to logic portion 69, and is preferably protected by an electrostatic discharge element.

PMAM line. The PMAM line 110 connects to receiver 88 and to driver 68, and is preferably protected by an electrostatic discharge element. This line determines whether the chip 56 transmits and receives in AM (amplitude modulation) or PM (phase modulation). Each modulation has advantages and disadvantages. PM often offers a greater range, namely communication at a greater distance, as compared with AM.

Clock. A clock signal is provided by analog portion 67 by line 76 to the logic portion 69, to the receiver 88, and to the driver circuitry 68.

Power-on-reset. It is important that the logic portion 69 and receiver 88 each commence their activities in a predictable initial state. For this reason, the analog portion 67 develops a power-on-reset signal 85 which resets the logic portion 69 and the receiver 88. The details of the development of this signal are discussed below in connection with FIG. 23.

Summarizing the rest of the lines to and from logic portion 69, an EAS signal 64 from a fusible link is provided to logic portion 69. In the event that logic portion 69 wishes to transmit data external to the tag 50, it does so on lines 72, 75. Power VDD and VSS are provided to logic portion 69 by connections omitted for clarity in the figures just discussed.

Rectifier 66. Rectifier 66, introduced in FIG. 19, is shown in more detail in FIG. 20. RF energy arrives on leads 60, 61 and reaches rectifiers 78. In an exemplary embodiment the chip 56 is fabricated from P-well technology and the rectifiers 78 simply provide rectified voltage to appropriate substrates of the chip. Energy also passes to FETs 77, where a pair of bridge-rectified clock signals (half waves, differing by 180 degrees in phase) is developed to be propagated elsewhere on lines 70.

Transmit driver 68. The transmit driver 68, introduced in FIG. 19, is shown in more detail in FIG. 21.

Transmit path. Transmit enable line 75 is asserted. The serial data signal to be transmitted arrives on line 72, and is clocked via clock line 76 to a push-pull driver. The driver is composed of buffers 81, and exemplary FET driver transistors 79 in a push-pull fashion. This provides energy at leads 62, 63 and thence to antenna 55 (FIG. 18). The PMAM (phase modulation or amplitude modulation selection) line 110 determines whether the transmitted signal is phase modulated or amplitude modulated.

Figure 22:
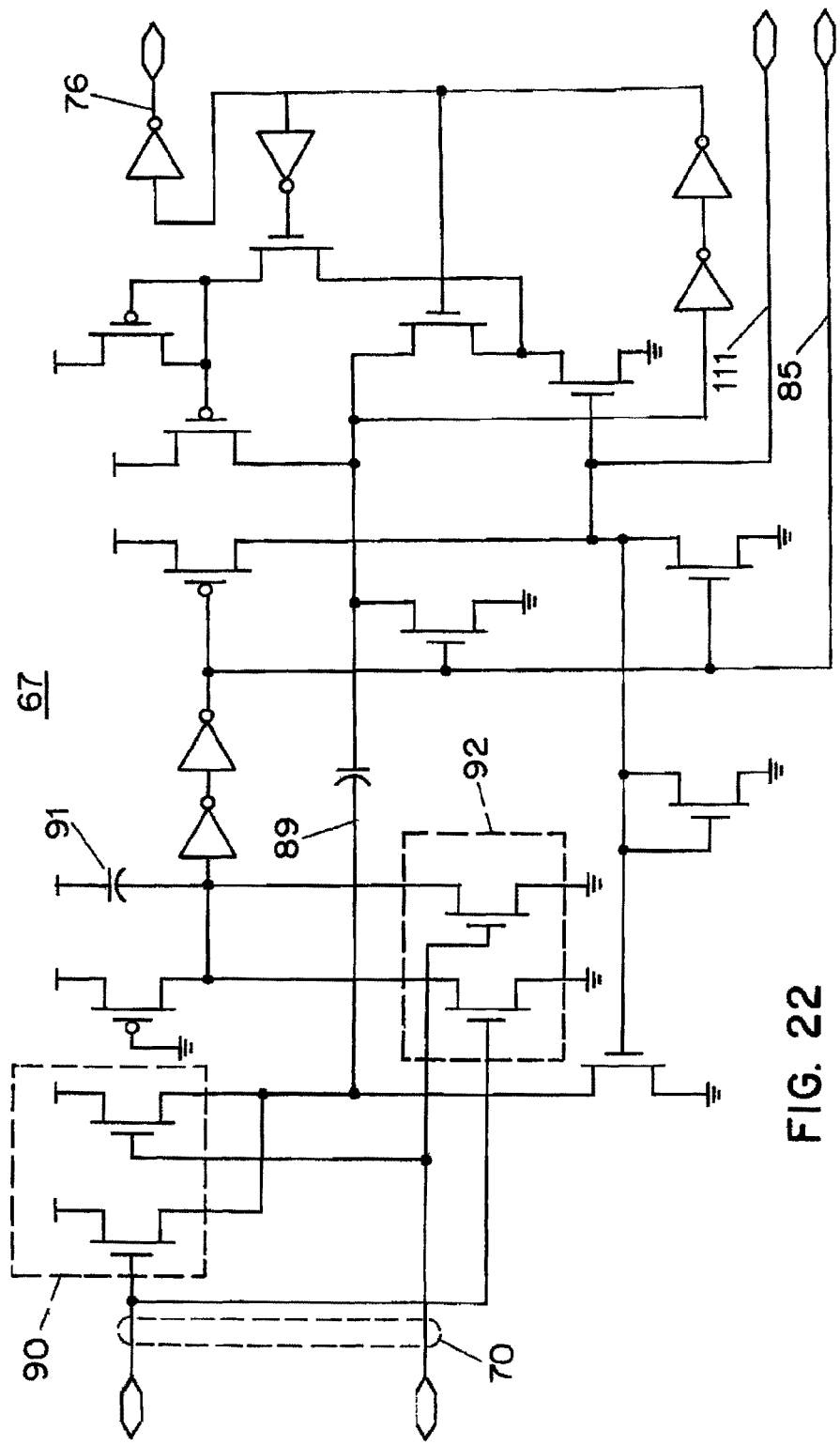
FIG. 22 shows the analog portion 67, first introduced in FIG. 19, in greater detail.

Analog portion 67. FIG. 22 shows the analog portion 67, first introduced in FIG. 19, in greater detail.

Half-wave received power/clock. The two half-wave signals at lines 70 are summed through exemplary FETs 90 to line 89 which carries a full-wave signal developed from the two half-wave signals. The summed signal 89 is the sum of the two half-wave signals from lines 70. This summed signal 89 passes to circuitry between lines 89 and 76, which circuitry develops a clock at twice the frequency of the input at 89, and emits this doubled clock at line 76, which is a well shaped square wave.

Power-on-reset signal. When power-up happens, capacitor 91 starts to be charged. Eventually the previously mentioned power-on-reset signal 85 is generated and propagated to other parts of the chip 56, namely to receiver 88 and to logic portion 69 (FIG. 19).

Figure 25:
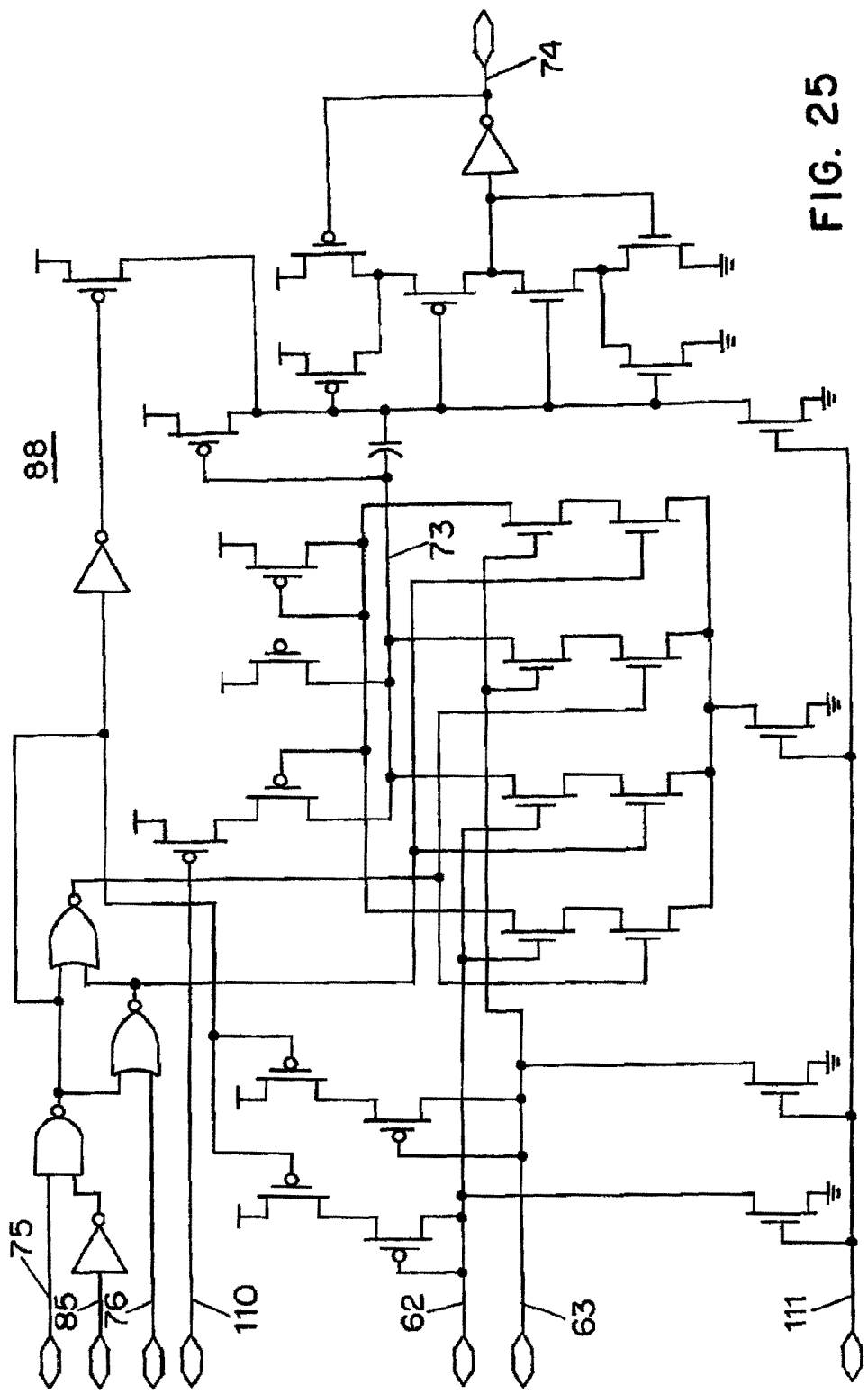
FIG. 25 shows receiver 88, introduced above in connection with FIG. 19, in greater detail.

Receive amplifier. FIG. 25 shows receiver 88, introduced above in connection with FIG. 19, in greater detail. PMAM (phase-modulation or amplitude modulation) line 110 determines whether the receiver 88 receives AM or PM signals. The received signal at 62, 63 is sampled with respect to the clock 76, which is defined by clock information in the power/clock signal 60, 61. The result is a serial received-data signal at line 74.

It should be understood that the "transceiver" according to the present invention, in the embodiment illustrated in FIGS. 13, 14, 18, and 19 is the cooperating circuitry combination defined by transmitter 68, coded information signal generator 68a, and receiver 88.

Figure 26:
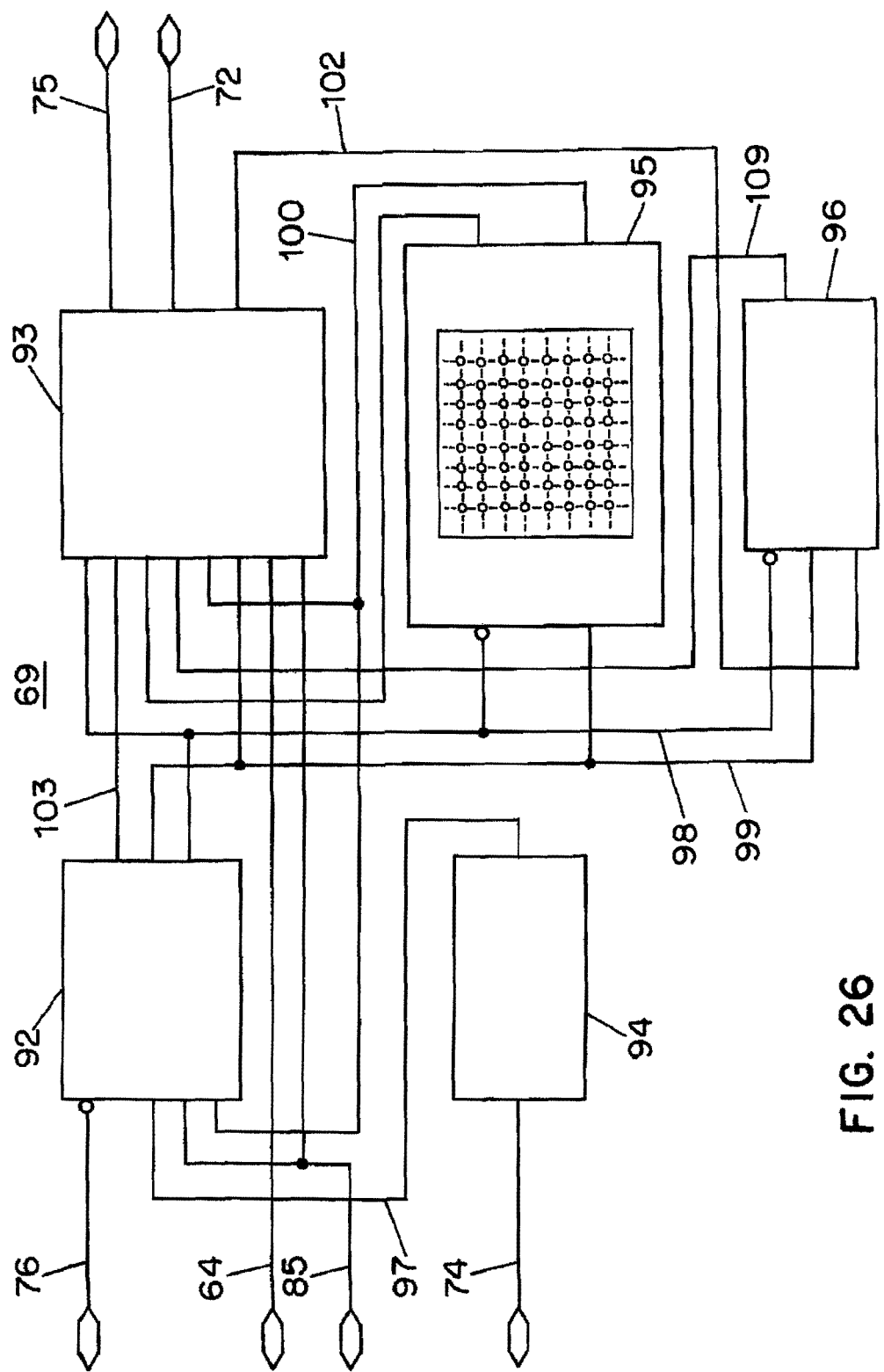
FIG. 26 shows logic portion 69, introduced above in connection with FIG. 19, in greater detail, including pipper 94, decoder 92, ID matrix 95, pseudo-random-number generator 96, and receive-data-compare circuit 93.

Logic portion 69. It should be understood that logic section 69 exemplifies a form of "data processor" or "microprocessor" in accordance with the present invention. FIG. 26 shows logic portion 69, introduced above in connection with FIG. 19, in greater detail.

Figure 27:
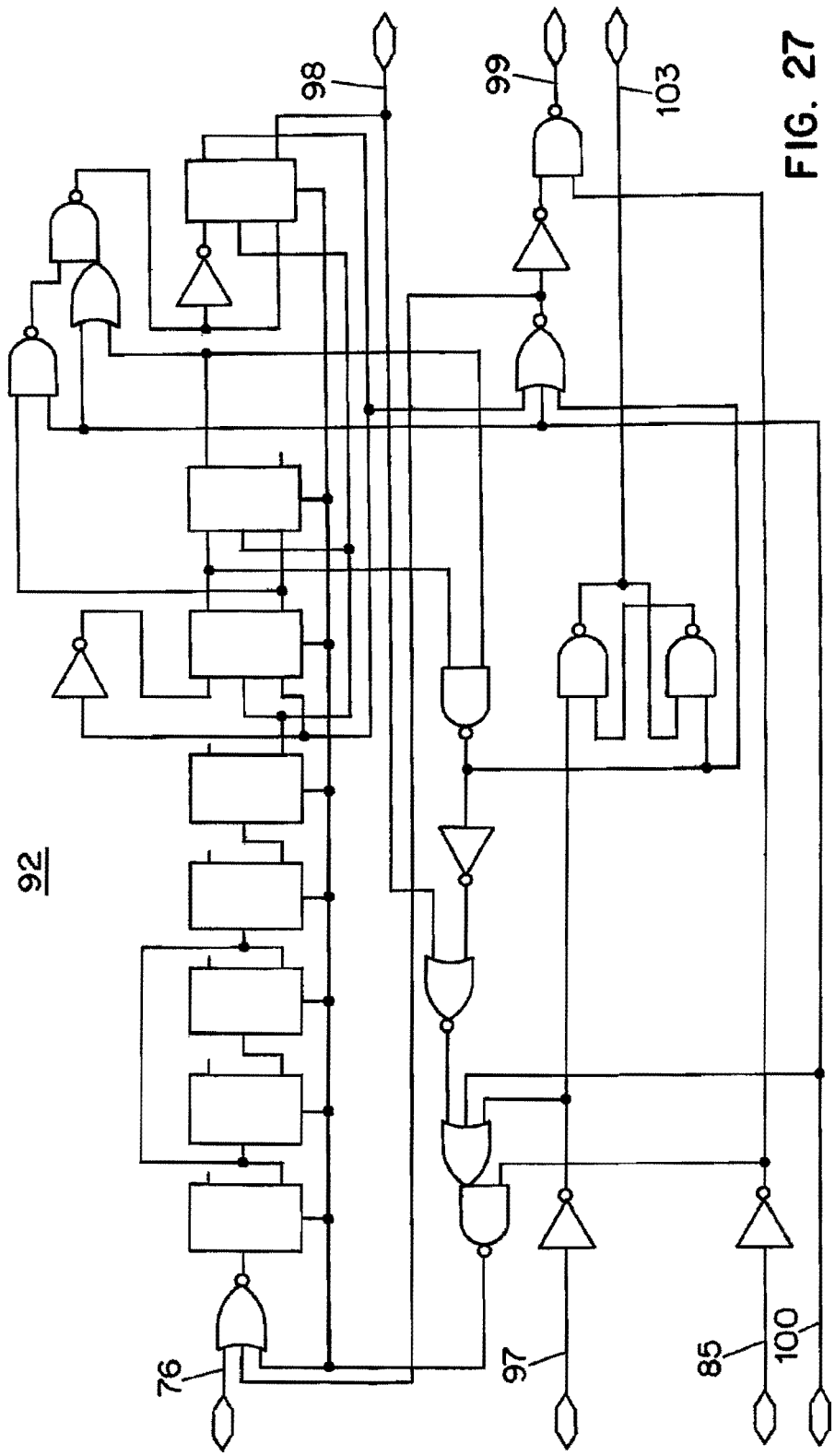
FIG. 27 shows decoder 92 in greater detail.
Figure 29:
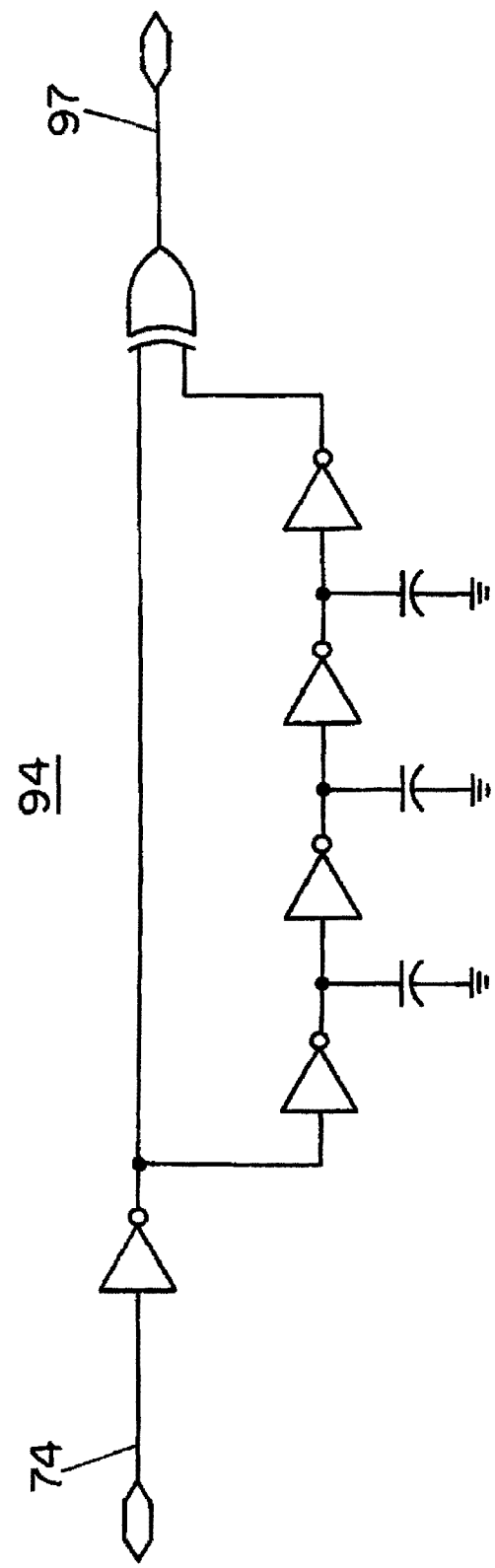
FIG. 29 shows pipper 94 in greater detail.

Receive path. Receive data on line 74 passes to pipper 94. Pipper 94 produces a pulse or "pip" on line 97 for each state change in the received data, and thus serves as a one-shot, as shown in FIG. 29. The pips pass on line 97 to decoder 92. FIG. 27 shows decoder 92 in greater detail. This circuit develops a synchronization pulse 99, which may be thought of as a serial start signal that is 1.5 bits wide (with bits defined by the clock at 76). The decoder 92 develops a bit clock 98 as well.

The EOR signal 109 represents the "end of receive". It is a signal that goes high at the end of an ID compare and will stay high until the end of a subsequent transmit. It is gated with the ID compare signals 106 and 107 in circuit 93 to produce the transmit enable signal 75, in FIG. 28.

Bit clock signal 98 is a clock at the data rate which is (in this exemplary embodiment) 1024 bits per second. This differs from the clock 76 which is 121072 Hz, which is two times the power/clock frequency.

Returning to FIG. 26, an ID matrix 95 is shown. It should be understood that ID matrix 95 exemplifies a form of "data storage device" in accordance with the present invention.

Figure 30:
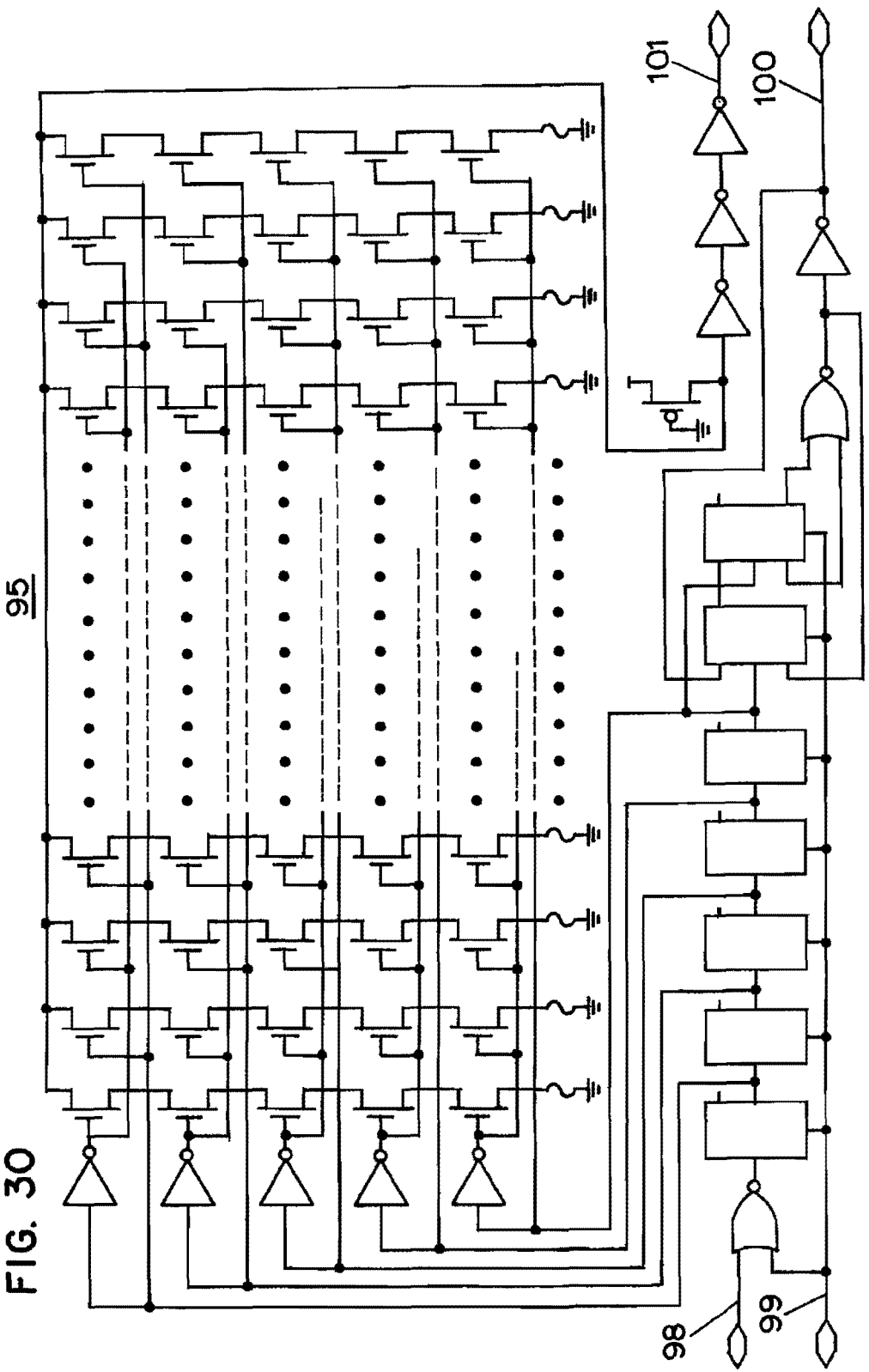
FIG. 30 shows ID matrix 95 in greater detail.

As detailed in FIG. 30, the ID matrix 95 receives the bit clock 98 and the synch signal 99 and counts up from 0 to 31. ID matrix 95 will have been previously laser-programmed at the factory with 32 bits of ID information which is intended to uniquely identify the particular chip 56. ID signal 101 is a serial signal communicating the 32 bits of ID. EOR (end-of-read) signal 100 is asserted when the count from 0 to 31 has finished.

It will be appreciated that in this exemplary embodiment the number of ID bits is 32. For particular applications, it would be a straightforward matter to increase the size of the ID matrix 95 to 64 or 96 bits or some other number of bits.

Figure 31:
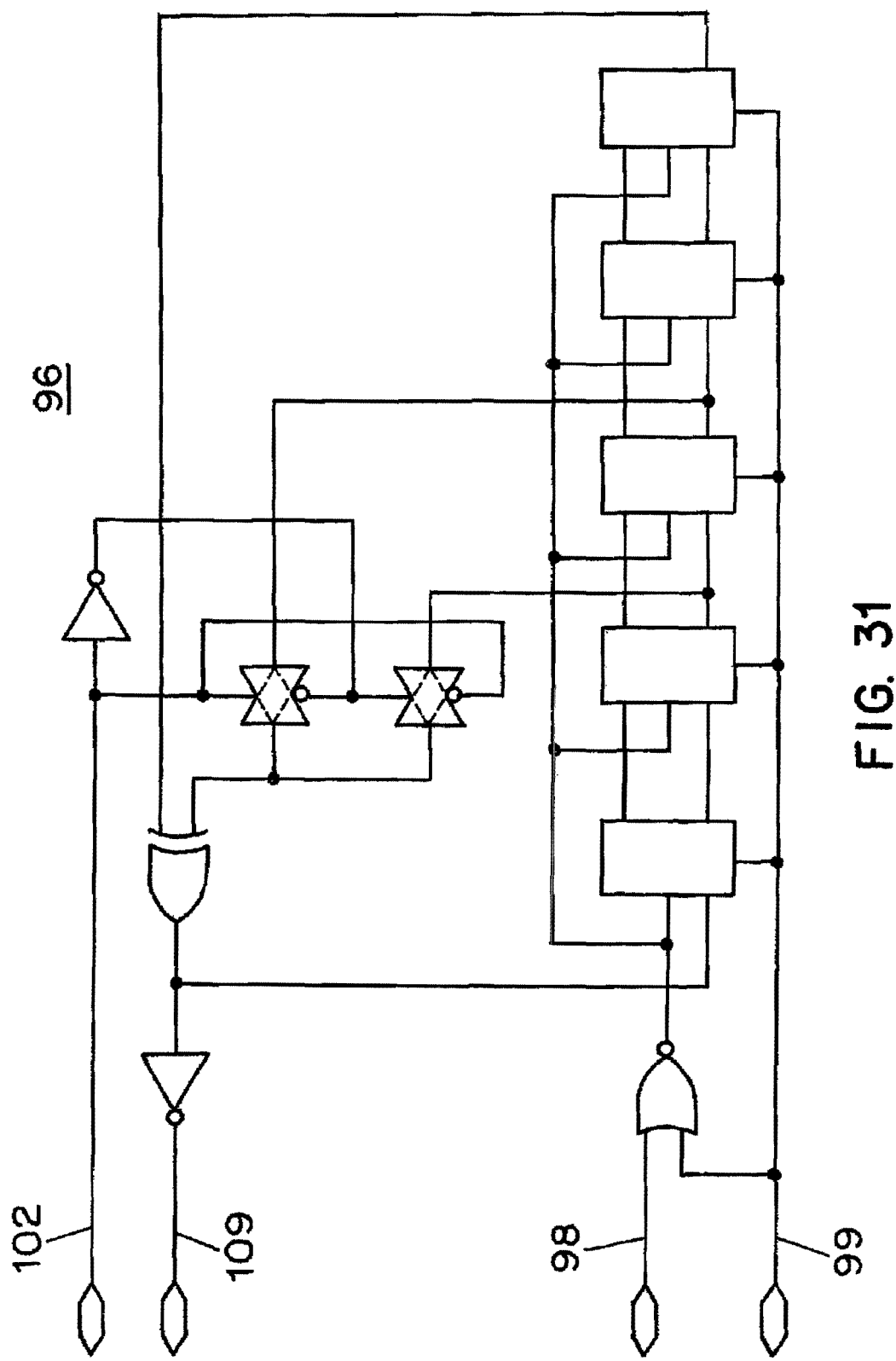
FIG. 31 shows pseudo-random-number generator 96 in greater detail.

Returning to FIG. 26, a pseudo-random-number generator 96 is shown. As detailed in FIG. 31, it takes as its input the bit clock 98 and the synch signal 99 and generates either of two different pseudo-random numbers, depending on whether select line 102 is asserted or not. The circuitry of FIG. 31 could just as well have been two thirty-two-bit memories, clocked through like the ID matrix of FIG. 30, each yielding one or another of two particular 32-bit numbers. But the handful of flip-flops and gates of generator 96 provide the same functionality without having to provide two more ID matrices similar to those of FIG. 30. Importantly, the behavior of the circuitry of generator 96 is deterministic, always yielding the same particular 32-bit number each time it is triggered. In the particular case of the generator of FIG. 31, one of the generated numbers is 0011 0100 1000 0101 0111 0110 0011 1110 (binary) or 3485763E (hexadecimal) and the other number is 0001 1011 1010 1000 0100 1011 0011 1110 (binary) or 1 BA84B3E (hexadecimal).

What remains to be discussed in FIG. 26 is receive-data-compare circuit 93. As may be seen from FIG. 26, it receives several inputs: EAS (electronic article surveillance) signal 64 from fusible link 65; power-on-reset signal 85 from analog circuitry 67; synch signal 99 from receive-decode circuitry 92; bit clock signal 98, from receive-decode circuitry 92, in turn from analog circuitry 67, in turn from rectifier 66, in turn from power antenna 54; received-data signal 103 from receive-decode circuitry 92, in turn from pipper 94, in turn from analog circuitry 67, in turn from circuitry 68, in turn from signal antenna 55; ID signal 101 from ID matrix 95; pseudo-random-number sequence signal 103 from generator 96; and end-of-read signal 100 from ID matrix 95.

Figure 28:
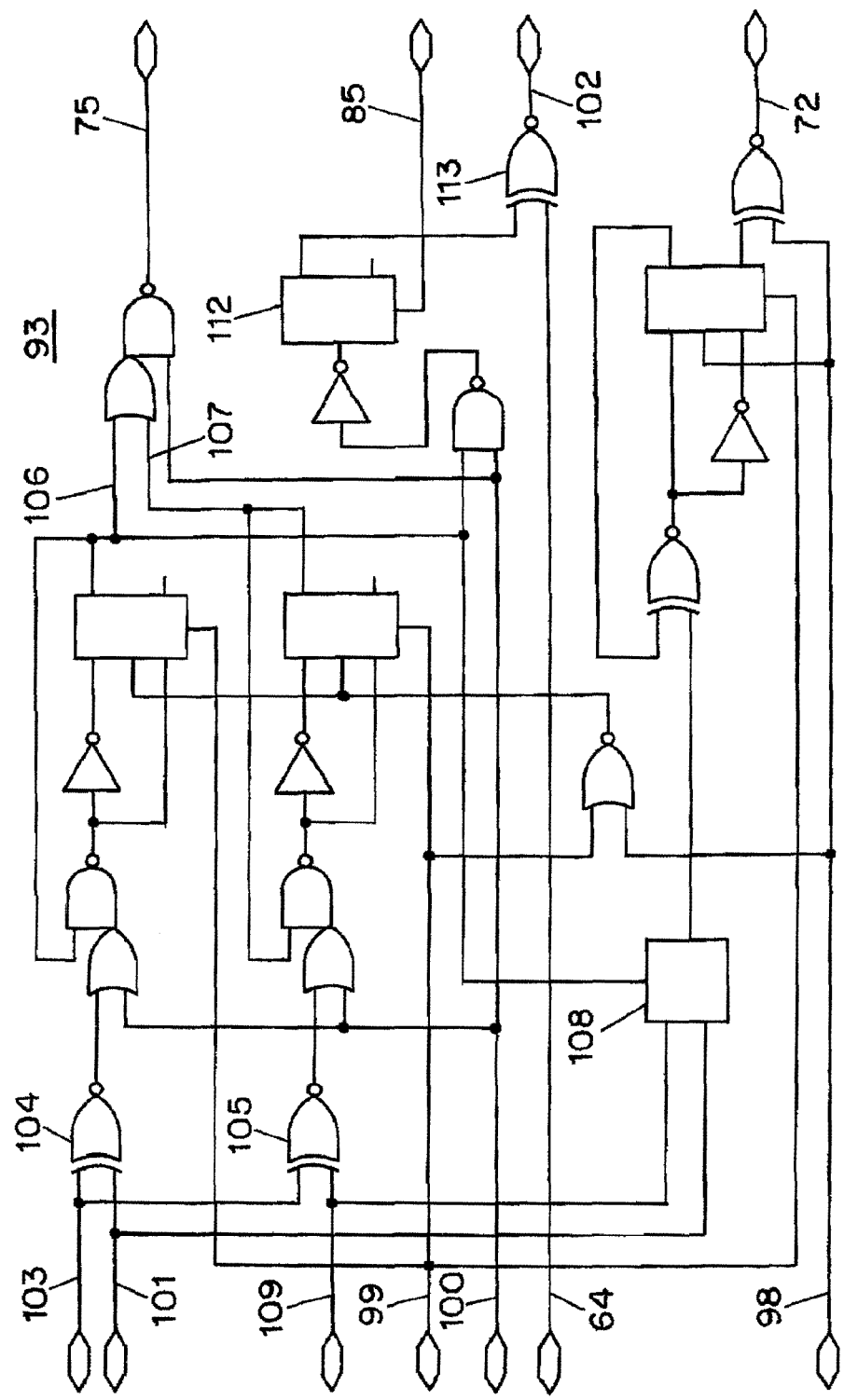
FIG. 28 shows receive-data-compare circuit 93 in greater detail.

The function of the circuit 93 is detailed in FIG. 28.

EAS signal 64 determines whether select line 102 is asserted or not, thus selecting one or the other of the above-mentioned two pseudo-random sequences.

At gate 104, the received data at 103 are compared with the chip ID signal at 101. In the event the received data match the ID, then the equal-ID signal 106 is developed.

At gate 105, the received data at 103 are compared with the pseudo-random signal at 103. In the event the received data match the pseudo-random signal at 103, then the equal-pseudo-random-signal 107 is developed.

If either of "equal" signals 106 or 107 is asserted, then the transmit enable signal 75 is asserted at the end of a sequence read (defined by line 100).

Selector 108 determined whether the transmitted data will be the pseudo-random-number signal 103 or the chip ID signal 101. If the ID matched, then what is transmitted is the pseudo-random-number from 109. If the ID did not match but the pseudo-random number matched, then what is transmitted is the chip ID. This is described in more detail below in connection with FIGS. 23 and 24.

Flip-flop 112 maintains an internal state in the chip 56 indicative of whether the chip 56 has (since the most recent power-on-reset) been addressed by its own ID. The input to this flip-flop 112 is the "equals ID" signal 106 and it gets cleared by the power-on-reset signal 85. The output, which is indicative of whether the chip 56 has been addressed by its own ID, is XORed at 113 with the EAS signal 64 to develop the selection line 102 which causes the pseudo-random-number generator 96 to generate one or the other of its two pseudo-random numbers. This is described in more detail below in connection with FIGS. 23 and 24.

Figure 23:
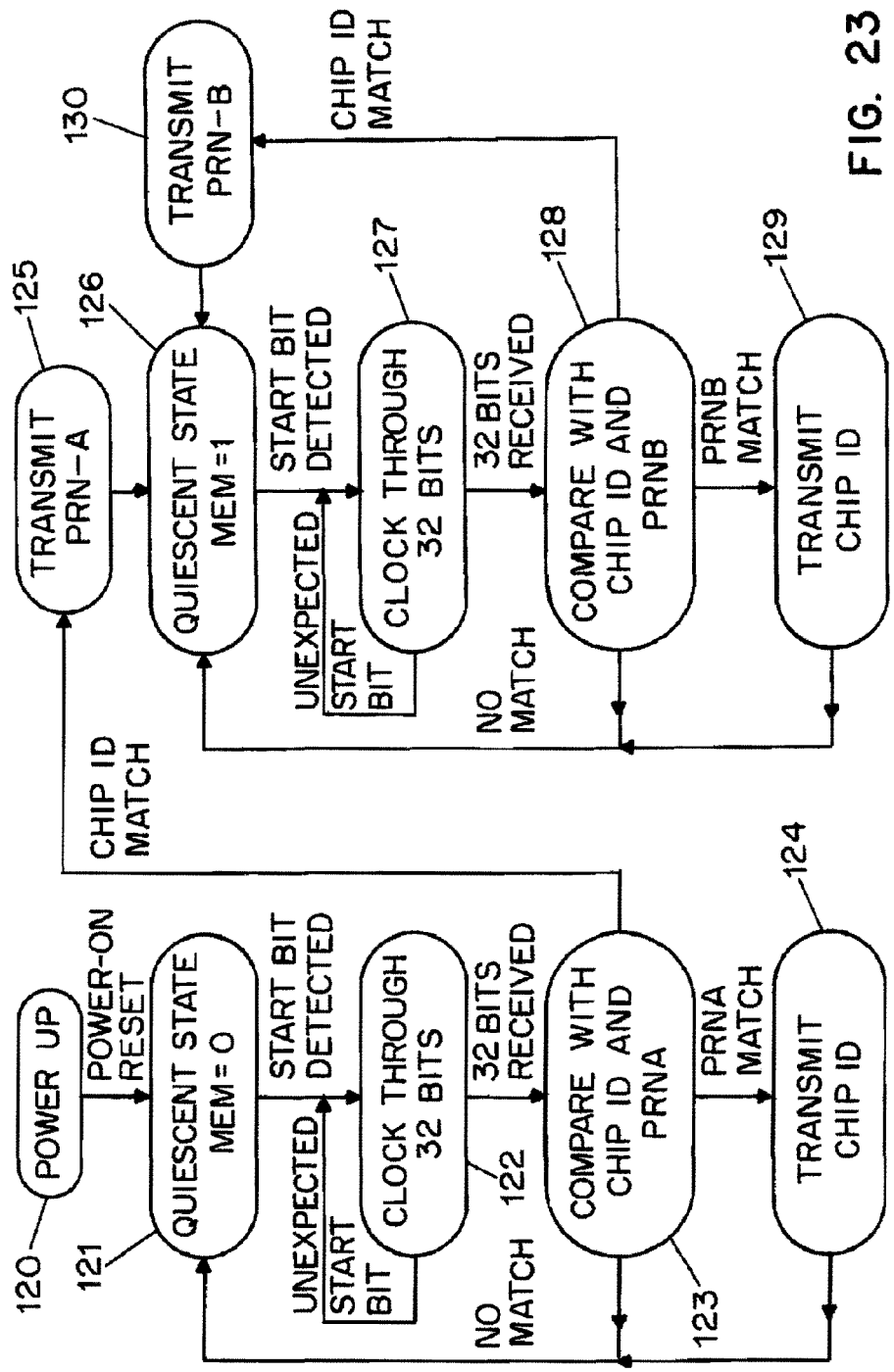
FIGS. 23 and 24 describe the externally observable behavior of the system of chip 56. The behavior differs depending on whether the EAS link has been blown, that is, whether the EAS line 64 is high or low.
Figure 24:
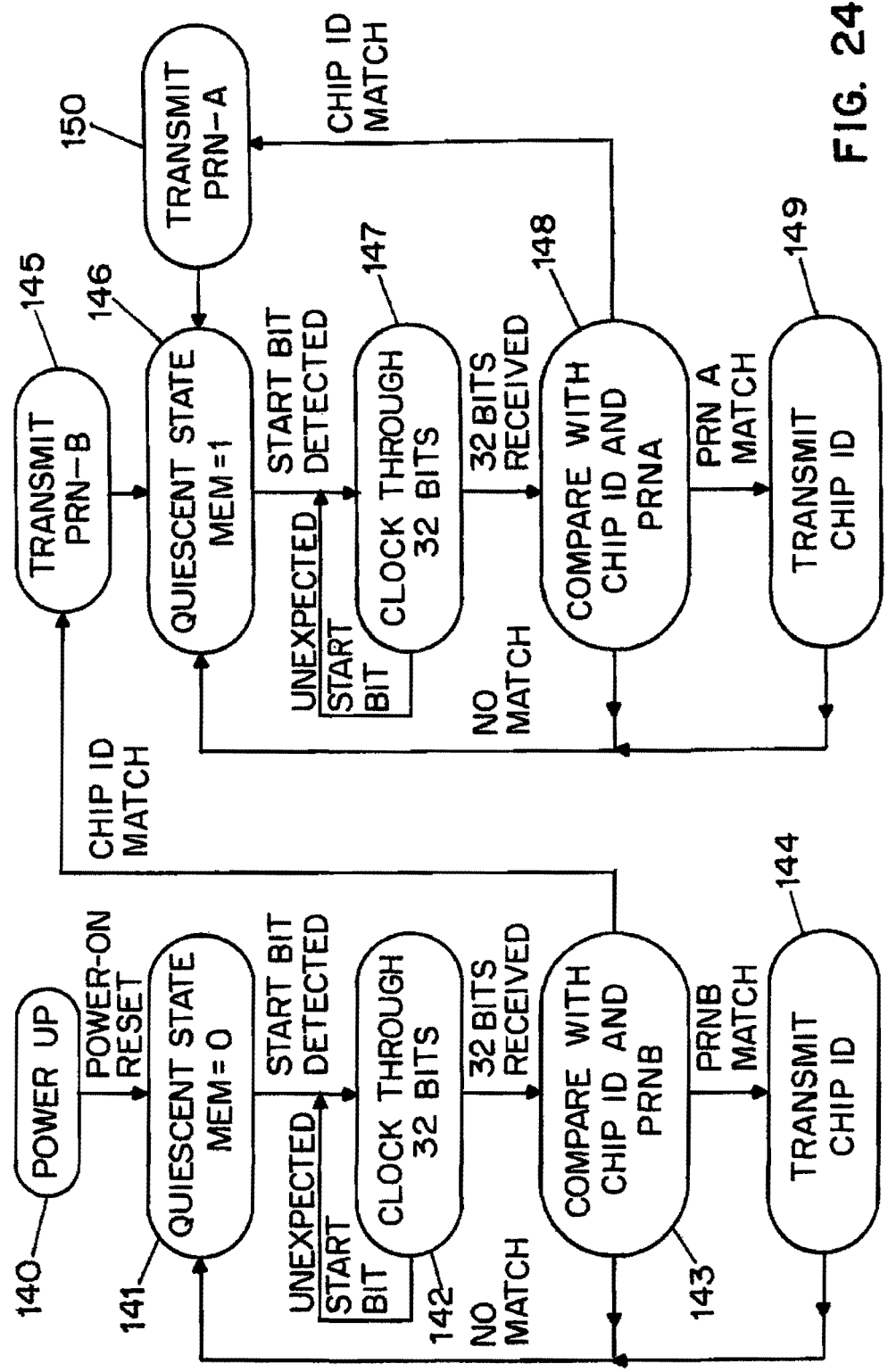

FIGS. 23 and 24 describe the externally observable behavior of the system of chip 56. The behavior differs depending on whether the EAS link has been blown, that is, whether the EAS line 64 is high or low.

FIG. 23 describes the behavior of the chip 56 in the event the EAS link has not been blown.

The chip powers up at 120, prompted by being bathed in RF energy at the coil lines 60, 61, and performs a power-on reset (line 85, FIG. 19).

The chip is in a quiescent state at 121 with a state variable "mem" equal to zero. This means that flip-flop 112 in FIG. 28 is not set.

Eventually it may happen that a received RF signal at lines 62, 63 (FIG. 19) contains a "start bit" detected by decoder 92 (FIG. 27). If so, then the succeeding 32 bits of received serial data are compared with the chip ID and with the pseudo-random number "A" ("PRNA"). Another possibility is that another "start bit" is detected prior to the receipt of the last of the 32 bits of serial data, in which case this "unexpected start bit" aborts the count of 32 bits which starts over at state 122. If the match is a match to the chip ID then the state passes to box 125. If the match is not a match to the chip ID then if the match is a match to PRNA, the state passes to box 124 where the chip transmits its own ID and then the state passes to 121. If neither match succeeds, then the state passes to 121.

It was previously mentioned that one possible event in state 123 could be that the match is a match to the chip ID, in which case then the state passes to box 125. The PRNA is transmitted and the state passes to box 126.

Later, it may happen that a received RF signal at lines 62, 63 (FIG. 19) yet again contains a "start bit" detected by decoder 92 (FIG. 27) at a time when the chip 56 is in the state of box 126. The state of box 126 is that the chip 56 has at least once (since the most recent power-on-reset at 120, 121) been addressed by its own chip ID (that is, the match of 123, 125). In this event, then the succeeding 32 bits of received serial data (clocked in at 127) are compared with the chip ID and with the pseudo-random number "B" ("PRNB"). Another possibility is that another "start bit" is detected prior to the receipt of the last of the 32 bits of serial data, in which case this "unexpected start bit" aborts the count of 32 bits which starts over at state 127. If the match is a match to the chip ID then the state passes to box 130 where PRNB is transmitted. If the match is not a match to the chip ID then if the match is a match to PRNB, the state passes to box 129 where the chip transmits its own ID and then the state passes to 126. If neither match succeeds, then the state passes to 126.

It will be appreciated that in this exemplary embodiment, the circuitry of chip 56 does not receive and store 32 bits of received serial data, followed by a 32-bit comparison with the chip ID and with the PRNA or PRNB. To do this would require storage of multiple internal states so as to store the 32-bit number and to subsequently perform a comparison. Storage of those states would take up chip real estate. Such a subsequent comparison would take time and would delay any response by the chip 56 by the amount of time required to perform the subsequent comparison.

Instead, the circuitry simply performs the comparison in real time, as the serial data stream is being received. The incoming serial data (RXD line 103, FIG. 28) is simultaneously being compared with a serial data stream indicative of the chip's unique ID (line 101, FIG. 28) and with a serial data stream indicative of the PRNA or PRNB (line 109, FIG. 28). By the end of the comparison process, the signal 106 indicative of a match of the chip ID may be high, or the signal 107 indicative of a match of the PRNA or PRNB may be high. Thus the box 123 or 128 does not (in this exemplary embodiment) represent a comparison step that is subsequent to the receipt of 32 bits of data at 122 or 127. Instead, the box 123 or 128 represents action taken as a result of the comparison that took place during the clocking-in of the 32 bits of data.

It will be appreciated from FIG. 23 that the states in the left-hand portion of the figure (states 121 through 124) represent states in which the chip has not yet been addressed (since the most recent power-on-clear) by its own chip ID, and the states in the right-hand portion of the figure (states 125 through 129) represent states in which the chip has been addressed at least once (since the most recent power-on-clear) by its own chip ID. Thus, any time in states 121 through 124 when the generator 96 (FIG. 31) is triggered to generate its number, it generates number PRNA. In contrast, any time in states 125 through 129 when the generator 96 is triggered to generate its number, it generates number PRNB.

FIG. 24 describes the behavior of the chip 56 in the event the EAS link has been blown. The events and state changes depicted in FIG. 23 are nearly identically depicted in FIG. 24, except that each time PRNA appears in FIG. 23, PRNB appears in FIG. 24, and vice versa. This is because gate 113 (FIG. 28) is an exclusive gate, XORing the EAS signal 64 with another signal before developing the number-selection signal 102. The signal with which it is XORed, as discussed above in connection with FIG. 28, is the output of flip-flop 112 which is indicative of whether the particular chip 56 has ever been successfully addressed by its own chip ID.

It will thus be appreciated that chip 56 provides the ability to respond to external stimuli in a way that differs depending on the external stimuli, using a minimal number of gates and requiring storage of only a minimal number of internal states. The chip 56 is able to develop its own power from an RF field in which it is bathed, a field that provides a clock signal for all of the internal processes of chip 56. In this way there is no need for a crystal oscillator or resonator or other internal clock reference within the chip 56, thus reducing component count and power requirements. The chip 56 is able to detect the designer's choice of AM- or PM-modulated data from a signal RF field that is not the same as the power-clock RF field. The chip 56 is able to transmit, in an active way, the designer's choice of AM- or PM-modulated data at the signal RF frequency, drawing for its modulation upon the power-clock RF field that continues to bathe the chip 56.

The state diagrams of FIGS. 23 and 24 thus illustrate the power and versatility of a very simple protocol or instruction set. With this extremely simple instruction set or protocol, the system designer can accomplish a great deal.

It is instructive to consider whether there is value in providing parity or checksum information (e.g., CRC) in messages in either of the two directions (base to tag, or tag to base). A chief drawback is that this uses up RF bandwidth, fitting a smaller number of messages into (say) an hour of time. It will be appreciated that any failed message (e.g., a one that changes to a zero or vice versa) will inevitably be found out at some point during the communications. If, for example, a chip ID received by the base station has been corrupted (unknown to the base station) then a message later addressed to that chip by its ID will fail. If, for example, a chip ID received at a tag has been corrupted (unknown to the tag) then the tag will simply not respond but will later be found in some later discovery process.

Consider, for example, the simple case where a host system wishes to exchange a message with a tag. To send the message, the base station (host system) starts sending out its power-clock signal. In an exemplary embodiment this is at 65536 Hz. Then, after having allowed enough time for a power-on-reset within the tag, the base station sends the message at (for example) 131072 Hz. The message may be any one of three possible messages: message containing an ID; message containing pseudo-random number A; or message containing pseudo-random number B.

The content of the message is the start bit and 32 bits of ID or 32 bits of PRN.

The response, if any, received by the base station is a function in part of whether there are or are not any tags within the relevant geographic area, namely any tags that are being bathed by the power/clock RF field (at 65536 Hz) and that are able to pick up the signal RF field (at the frequency that is double the 65536-Hz field). As discussed above, the relevant geographic area may be some tens or hundreds of square feet, as compared with reading distances with some RFID technologies that are only in the nature of a few inches or a few centimeters.

The response is further a function of the internal states of the tags as well as a function of the respective chip IDs of the tags. It is assumed for this discussion that no two tags have chips with the same chip IDs.

Suppose the message transmitted by the base station is a chip ID. Then there may be no response at all (for example, if no tag with a chip with that ID is within the geographic area). Another possibility is that the tag with the chip with that ID is within the geographic area. In that case, the tag responds with PRNB if the tag's EAS link is not blown, or responds with PRNA if the tag's EAS link is blown. The base station is able, in this way, to: confirm the presence of the tag with that ID within the geographic area, and determine whether the EAS link is blown or not, for that tag.

Suppose, on the other hand, that the message transmitted by the base station is PRNA. Then there may be no response at all (for example, if no tag with an intact EAS link is within the geographic area). Another possibility is that one or more tags with intact EAS links are within the geographic area. In that case, then each of the tags responds with its chip ID.

Of course if the number of such tags is two or more, then the chip IDs will have been transmitted simultaneously. Each chip will have transmitted at exactly the same time because all of the chips draw upon exactly the same clock reference from the power-clock RF signal. In the most general case the base station will not be able to pick out any one of the chip-ID signals so as to distinguish it from the other chip-ID signals. A variety of techniques may be employed to disambiguate the signals. The base station may employ varying RF signal levels, transmitting more power-clock energy and less signal energy to reach, eventually, one tag to the exclusion of others. It may instead simply cut back on both the power-clock level and the signal level, again reaching one tag to the exclusion of the others. The base station may be equipped with more than one antenna and may transmit power on one and signal on another, in an attempt to reach one tag only. The base station may be equipped with two or more antennas and may transmit power on one and cycle through transmitting signal on the others, in an attempt to reach one tag only. The base station may be equipped with two or more antennas and may transmit signal on one and cycle through transmitting power on the others, in an attempt to reach one tag only.

It will also be appreciated that the fields being transmitted and received may fall off at $1/d^3$ or even faster. As such, if two tags which are both responding to a poll are at different distances from the base station antenna, it may well happen that one of the two tags will have a response that is twice as loud as the other, or more than twice as loud, and will be resolved to the exclusion of the other, even if there is no use of diversity antennas or varied transmit power or any of the other approaches just discussed.

The base station may skew slightly the phase of the power/clock field relative to the signal message in an attempt to reach one tag only or at least fewer than all of the tags. In the exemplary case of the chip 56, resolution of two or more responding tags is favored by the detector circuit used in the tag. There is a term in the output signal level related to the cosine of the relative phase between the signal and power frequencies. Not all tags will have the same term as it will be related to tuning and orientation. So the tag reader can adjust this in the transmission (intentionally skewing the phase between the signal and power fields) and, thus, preferentially talk to selected tags. The function is more acute in the AM modulation mode, as the polarity of the signal become important, too. With AM, only approximately one-third of the tags will receive on a particular fixed phase setting. This yields fewer conflicts and faster tag discovery.

Eventually, if all goes well, the base station will have reached a single tag, and will have picked up the ID of that tag. In that case, base station may choose to transmit that tag ID. The tag will respond with PRNB, and in this way, the base station may conclude that it has successfully reached that particular tag.

Importantly, that tag which has been successfully reached (addressed) will now no longer respond to PRNA. It is now in state 126 in FIG. 23, meaning that flip-flop 112 (FIG. 28) is set.

The base station may now repeat the process of attempting to reach only one tag while transmitting PRNA, eventually reaching one tag and transmitting that tag ID and causing that tag as well to stop responding to PRNA. Eventually the base station will have identified all of the tags having an EAS link that is not blown, and will have transmitted each such tag ID so that no more of the tags will respond to PRNA. In this way the base station will have discovered all of the tags having an intact EAS link.

In a similar way, the base station may use the protocol of FIG. 24 to discover all of the tags having blown EAS links.

Of course, if a discovery (for example) of all tags with intact EAS links has been completed, it might later be desired to do the discovery all over again, so as to learn whether any tags with intact EAS links have departed from the geographic area or have entered the geographic area or have had their EAS links blown since the last discovery. To make this possible, the base station simply turns off the power/clock RF field, and later turns it back on again. This causes all of the tags to undergo a power-on-reset.

FIG. 32 shows the simple system configuration of a base station 202 communicating with a plurality of tags 204-207. This is analogous to the portrayal of FIG. 9. In this system 200, a clock reference 208 defines the clock being transmitted on power/clock antenna 201, which is of course coupled with antennas 54 (FIG. 18). From time to time, signal messages are transmitted on signal antenna 203, which is of course coupled with antennas 55 (FIG. 18). Alternatively, a single antenna 52 (FIG. 18) may serve both purposes with respect to host 51, as was described above in connection with FIG. 18.

It will be appreciated, however, that nothing requires that the signal-exchanging device be the same as the power/clock-transmitting device. Thus, FIG. 33 shows a base station 202 having a clock reference 208, which base station 202 transmits power/clock RF energy via antenna 201, bathing a geographic area in RF energy providing power and clock. Tags 204 through 207 may be within that area. Additionally, there may be two or more signal-exchanging devices 209 and 212 within the area, each with a respective antenna 210, 211. A communications channel (omitted for clarity in FIG. 33) may permit the host to exchange more complicated messages with the devices 209, 212, causing each of the devices 209, 212 from time to time to conduct tag discovery or to address particular tags by ID. In this way, a peer-to-peer exchange may take place between a device (e.g., 209) and a tag (e.g., 205), with other communications taking place between the host and the device before and/or after the peer-to-peer exchange. This is analogous to the portrayal of FIGS. 10 and 11. It will thus be appreciated that the system 213 will permit localization of a tag as being close to a particular device 209, 212, thereby pinning down with some particularly the location of a particular tag. It will also be appreciated that disambiguation of multiple simultaneous responses (e.g., in response to a PRNA or PRNA query) will be facilitated since one device (e.g., 209) may reach a tag at a time when some other device (e.g., 212) is not able to reach that same tag.

It is contemplated that the devices 209, 212 are much more sophisticated than the chips 56 of the tags 204 through 207. The devices 209, 212 may have battery power, while the tags 204 through 207 do not. Interestingly, the batteries in the devices 209, 212 may last a long time (as long as the battery shelf life, or longer) because: some of the power to operate the system 213 is being transmitted from the base station 202 via antenna 201, thus relieving the devices 209, 212 from the need to supply such power to the tags 204-207; each device 209, 212 will not need to expend battery power to maintain its internal clock, because the base station 202 is providing a clock via antenna 201; and each device 209, 212 will not need to expend battery power to transmit, any more than the tags 204-207 would, since they can all be receiving power (during transmit times) from the base station 202 via antenna 201.

It is possible, then, to envision a system in which there are multiple devices 209, 212, together with myriad tags 204-207, and in which the devices 209, 212 each have an LED or piezoelectric speaker, to facilitate finding the exact location of a particular tag. The system 213 could make note of the particular device 209, 212 which successfully reached the particular tag, and if there was more than one, then the one that reached that tag with minimal RF power levels. That device 209, 212 could then flash its LED or sound its speaker, thereby letting a human user find the particular tag due to its proximity to the device 209, 212.

In an anti-theft application, there could be a device 209, 212 nearby to an exit of a retail store, periodically transmitting PRNA from an antenna 210, 211 nearby to that exit. A response might be indicative of a tag that is affixed to something that is being stolen by way of that exit.

A sequence of steps for system 213 (FIG. 33) could be as follows.

The base station 202 starts sending out its power-clock signal via antenna 201, and it draws upon clock reference 208.

Thereafter, a device 209 sends a message by means of its antenna 210. The message may be any one of three possible messages: message containing an ID; message containing pseudo-random number A; or message containing pseudo-random number B.

The content of the message is the start bit and 32 bits of ID or 32 bits of PRN.

A response may then be received by the device 209, again by means of its antenna 210. Again, there may optionally be more than one antenna available to device 209 for use in disambiguating multiple tag responses. The device 209 may thus be at some distance from base station 202 and its antenna 210 may have a smaller reach than the antenna 201.

Figure 34:
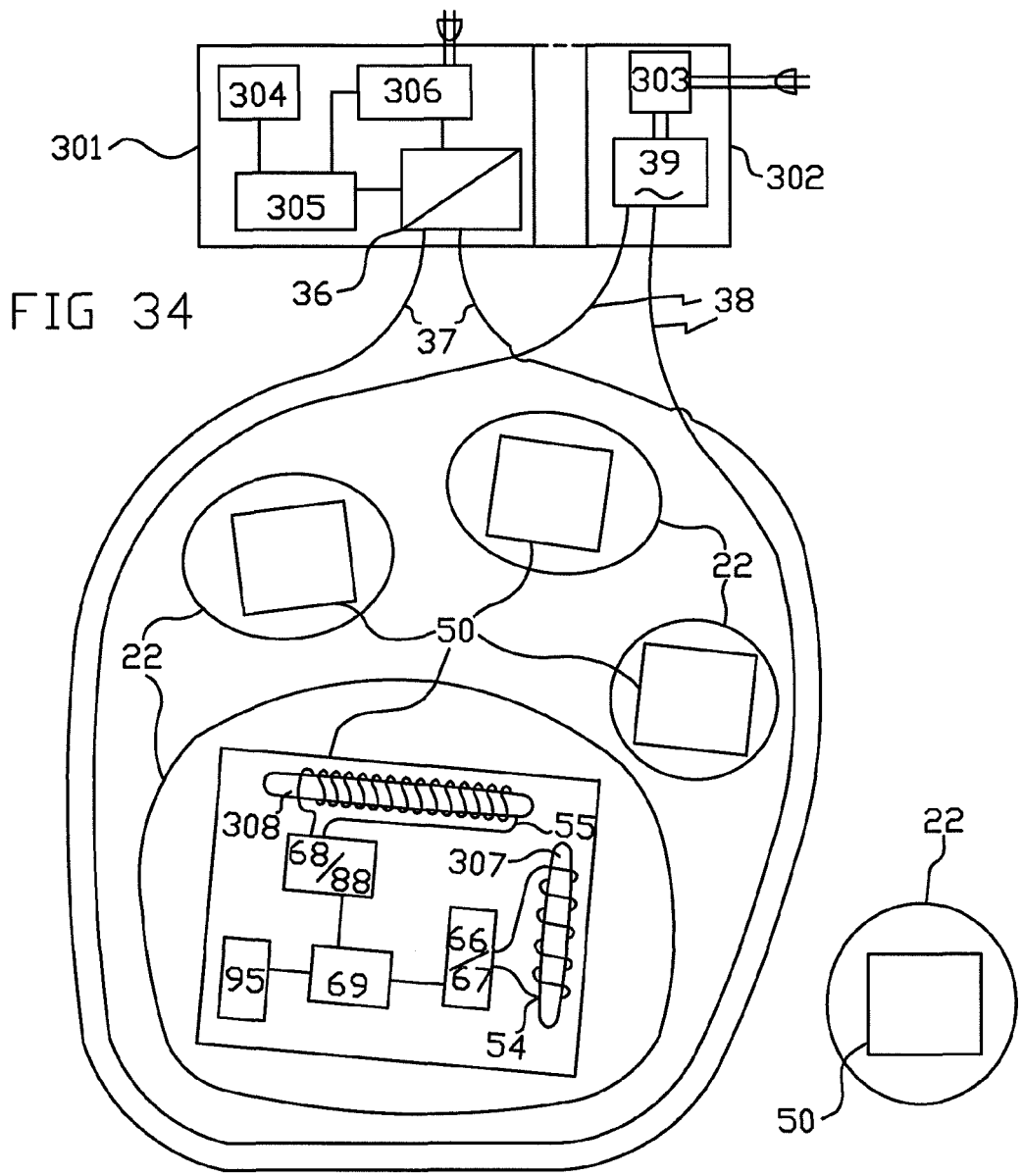
FIG. 34 is a schematic view of a system for tracking objects according to the present invention.

FIG. 34 shows an embodiment, according to the present invention, of a system for detection and tracking of inanimate and animate objects. As can be seen in FIG. 34, the novel system comprises a low radio frequency tag 50 carried by each of the objects 22, which may be, for example, drillpipes for oil drilling, or livestock, or portable military weapons, or other objects that need to be tracked.

Tag 50, as can be seen in an enlarged view of one of the tags, comprises a tag communication inductive antenna 55 operable at a first radio frequency (e.g., 132 kHz) not exceeding 1 megahertz, a transceiver 68/88 that is operatively connected to the aforesaid tag communication inductive antenna 55. Transceiver 68/88 is operable to transmit and receive data signals at the aforesaid first radio frequency through data antenna 55. Tag 50 also comprises, a data storage device 95, which serves to store data comprising identification data for identifying tag 50. The tag 50 also comprises a microprocessor 69 which is operable to process data received from transceiver 68/88 and from data storage device 95 and to send data to cause the transceiver 68/88 to emit an identification signal based upon the aforesaid identification data stored in data storage device 95. Moreover, each tag 50 includes an energy source for activating the transceiver 68/88 and the microprocessor 69. As shown in FIG. 34, the aforesaid energy source comprises a tag energization inductive antenna 54 that is operable to receive radio frequency energy from an ambient radio frequency field of a second radio frequency not exceeding 1 megahertz, the aforesaid second radio frequency being substantially different than the aforesaid first radio frequency. For example, where the first radio frequency is 132 kHz, then the second radio frequency can be chosen as 32 kHz, 16 kHz, or 8 kHz.

To enhance the strength and clarity of data communications between each tag 50 and field communication inductive antenna 37, which receive and transmits data signals from/to reader 301, tag communication inductive antenna 55 is of the wound ferrite type—it comprises a ferrite core 308 with a first plurality of turns—for example 300 turns may be selected.

Similarly, to enhance power transmission to tag 50 from field energization inductive antenna 38 that is energized by power station 302 which may comprise a power signal generator 39 and an AC power supply 303, its tag energization antenna 54 is also of the wound ferrite type and thus is also provided with a ferrite core 307 with a second plurality of wire windings (e.g., 75 windings). While antennas 54 and 55 can take the form of wound air loop coils, the wound ferrite coils shown in FIG. 34 are generally better. Moreover, it has been found that, to further reduce mutual inductive coupling (and thus interference) between tag energization antenna 54 and tag communication antenna 55, their elongate axes should be oriented substantially orthogonally to one another, as shown in FIG. 34.

Energy picked up by antenna 54 from the ambient radio frequency field generated by field energization antenna 38 is rectified by power receiver 66/67, which also generates reference clock signals based on the frequency of the ambient radio field projected by field power antenna 38. As can be seen, while it is desirable to surround all tag-bearing objects within the loop of field power antenna 38 and field data antenna 37, one of the objects at the lower right of FIG. 34, is shown as able to receive power and to read and transmit data signals.

Field communication inductive antenna 37 and field energization antenna 38 are both shown as lying in the plane of FIG. 34, for simplicity of illustration. However, for enhanced communication between reader 301 and a tag 50, it is often desirable to minimize interference at the tag 50, between the energization field projected by field energization antenna 38 and field communication antenna 37 by simply orienting field communication antenna 37 with its axis substantially orthogonal with respect to a corresponding axis of field energization antenna 38.

In FIG. 34, field communication inductive antenna 37 is shown as being disposed at a distance from each object 22 that permits effective communication therewith at the aforesaid first radio frequency. Reader 301 includes a transmitter and a receiver (shown together in component 36), which are operable to transmit data to, and receive data from, tags 50 at the aforesaid first radio frequency (e.g., 132 kHz). Reader 301 also comprises a reader data processor 305 in operative communication with the aforesaid receiver and the aforesaid transmitter in module 36, as well as an AC energy source 306 to energize transmitter-receiver 36 as well as reader data processor 305.

Moreover, the distance from field communication inductive antenna 37 and each object 22 should not exceed 1.0 wavelengths of radio waves at the aforesaid first frequency to ensure that communications with the tag communication inductive antenna 55 are characteristic of "near-field" communications, where most radiated energy is inductive (magnetic field H), rather than electrostatic (magnetic field E). Where the first and second frequencies do not exceed 1.0 megahertz, this distance should thus not exceed 300 meters ($c/f=3\times10^8/10^6$), which is almost 1,000 feet.

While prior art tagging systems are restricted to reading tags at a close proximity from a reader antenna, the present invention permits this distance to exceed 1.0 (or even many) feet while still reading ID signals accurately from tags, and even in the presence of metals and liquids.

As will now be understood, this superiority of signal communication over prior art tagging systems arises because of several factors: low frequencies (1 MHz or less) are used to allocate most of the radiated energy in the magnetic/inductive range, so that harsh environments (liquids, steel) can be penetrated; enhancing data signal reception by use of ferrite cores (e.g., 308 in tag data antenna 55); enhancing power signal reception by use of ferrite cores (e.g., 307 in tag energization antenna 54); reducing interference between data signals and power signals between tag data antenna 55 and tag energization antenna 54, as well as between field data antenna 37 and field energization antenna 38, by using substantially different frequencies as well as different antenna orientations (e.g., antennas 54 and 55 are orthogonal).

Figure 35:
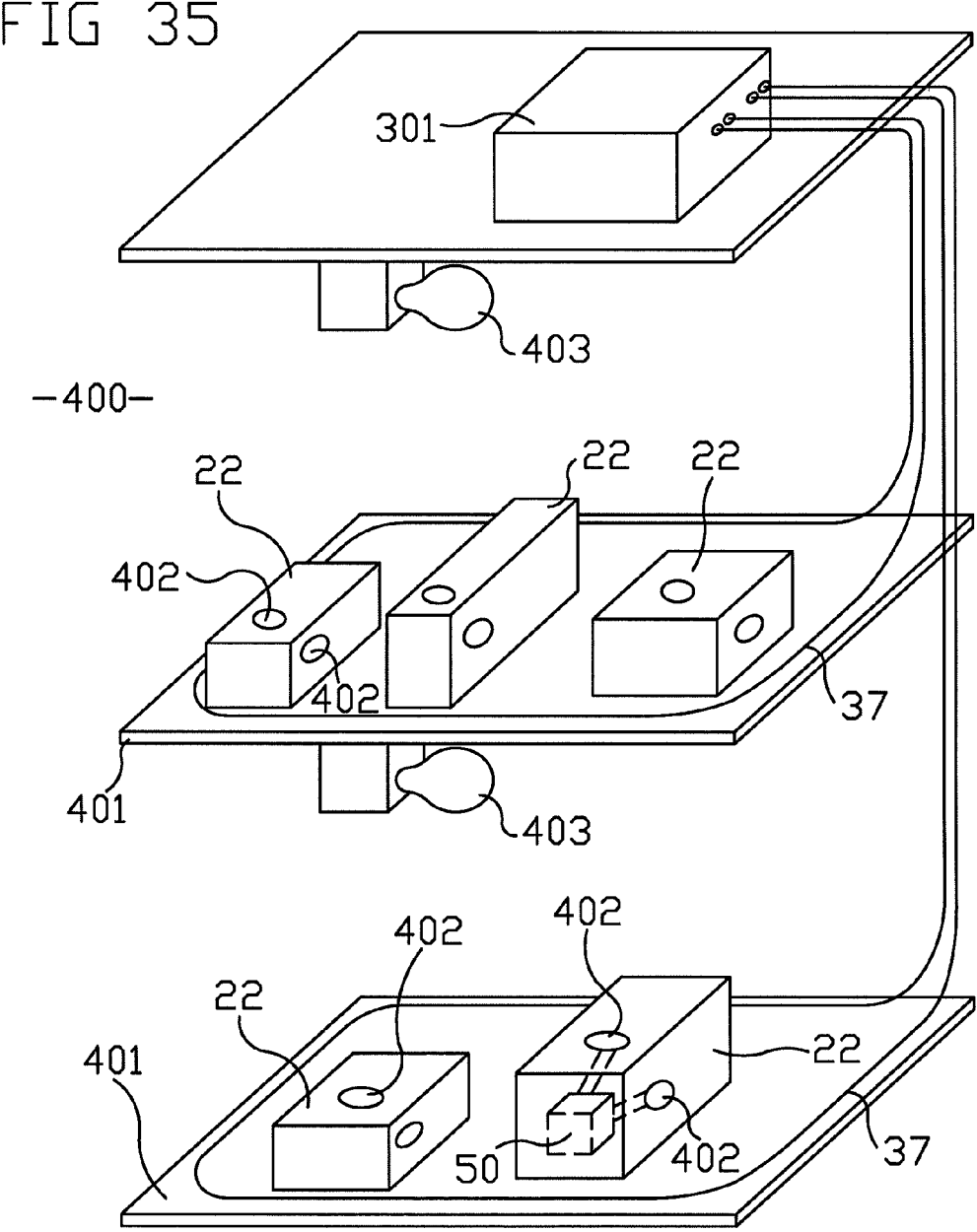
FIG. 35 is a schematic view of a system for tracking objects in a repository therefor using photocells, according to an embodiment of the present invention.

FIG. 35 shows a repository in the form of a storage rack 400 which has a number of shelves 401 for holding objects 22. By way of example, objects 22 may be valuable medical devices (e.g., packaged stents) to be stored in a hospital. Alternatively, objects 22 may be rifles or other portable weapons stored in a weapons room of a weapons storage room at a classified government facility.

Each object carries an attached low frequency tag 50, which may be imbedded within the object 22, as shown in the object 22 at the lower right of FIG. 35. In order to energize the tags 50 in the embodiment illustrated in FIG. 35, each tag is provided with a pair of photocells 402, which transform ambient light from light bulbs 403 into electrical energy which may be stored in a suitable energy storage device (e.g., capacitor or rechargeable lithium battery) within each of tags 50.

As explained hereinabove, each low radio frequency tag 50 comprises a tag communication inductive antenna operable at a first radio frequency not exceeding 1 megahertz, a transceiver operatively connected to the aforesaid tag communication inductive antenna, the aforesaid transceiver being operable to transmit and receive data signals at the aforesaid first radio frequency, a data storage device operable to store data comprising identification data for identifying the aforesaid detection tag, a microprocessor operable to process data received from the aforesaid transceiver and the aforesaid data storage device and to send data to cause the aforesaid transceiver to emit an identification signal based upon the aforesaid identification data stored in the aforesaid data storage device, and an energy source for activating the aforesaid transceiver and the aforesaid microprocessor, the aforesaid energy source comprising an energy harvesting device operable to capture energy from an energy condition at the aforesaid object. In the embodiment of FIG. 35, the energy harvesting device comprises photocells 402, which are widely commercially available at low cost.

The system schematically depicted in FIG. 35 also shows field communication antennas 404 which are positioned and are dimensioned to surround objects 22 at distance therefrom. Moreover, the system includes a reader 301 which comprises a reader data processor, a receiver, and a transmitter. The receiver and transmitter are both connected to the reader data processor and are in operative communication with antennas 404.

In order to operate the system to read tags 50, the light bulbs 403 are switched on in order to energize photocells 402 and, thus, tags 50. Upon receiving an interrogation signal sent by the transmitter section of reader 301 over field communication inductive antennas 404, the tags 50 then respond by transmitting their identification codes, along with sensor data, history or other data, wirelessly for reception by antennas 404 and thus by the receiver section of reader 301.

As will be understood, objects 22 are each provided with at least two photocells to ensure that the light from light bulbs 403 can readily reach photocells 402, irrespective of the position and orientation in which objects 22 are placed upon shelves 401.

According to another photocell-based embodiment, similar tags may also be used for tracking cows, domesticated buffalo, and other livestock. For this application, a novel low radio frequency and its photocell energy source are molded into a plastic block that is then attached to an outer surface of the cow, after positioning the plastic block so as to ensure that sunlight can impinge upon the photocell while the cow is in the farm field, thereby storing electrical energy within a chargeable battery located within the plastic block. An antenna loop that surrounds the farmfield can then be used by a low frequency reader to identify which cows are in the field. By equipping these tags with sensors for temperature and other environmental factors, not only can the cows be identified, but their current health condition can be monitored as well.

Figure 36:
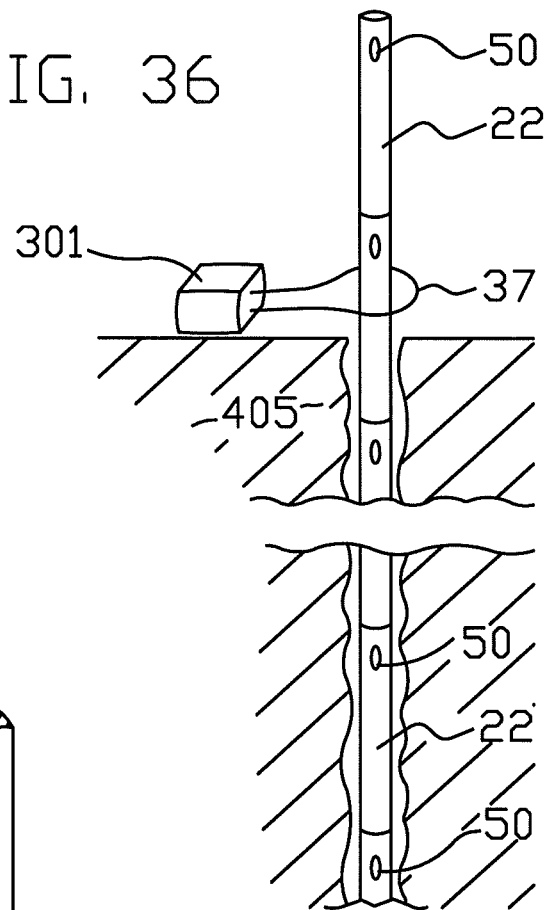
FIG. 36 is a schematic view of a system for tracking drillpipes using thermocouples to harvest energy, according to an embodiment of the present invention.

FIG. 36 show schematic views of a system for tracking objects in the form of drillpipes 22 for extraction of oil or gas from below ground 405, whether on dry land or from under a seabed. In this embodiment, reader 301 is shown collecting identification and other data from tags 50 which are attached to drillpipes 22 as they pass through loop antenna 404.

Figure 37:
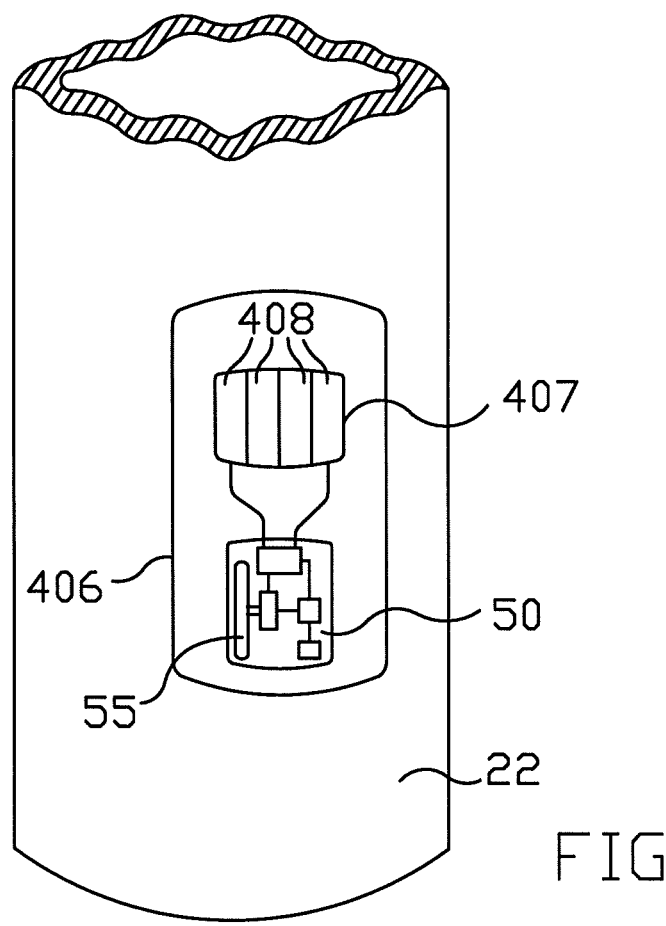
FIG. 37 is a schematic view of a portion of a drillpipe of FIG. 36, using thermocouples to harvest energy, according to an embodiment of the present invention.

FIG. 37 shows an enlarged portion of drillpipe 22 wherein its low radio frequency tag is disposed in a recess 406 along with an energy harvesting device 407. Because of the very high temperatures, vibrations, and pressures which are generated during the drilling process, a number of different energy harvesting devices may appropriately be used, such as piezoelectric crystals and thermocouples, both of which are widely available. For example, a variety of piezoelectric generators of electric energy are available from Piezo Systems, Inc. at http://www.piezo.com.

In the exemplary embodiment illustrated in FIG. 37, energy harvesting device 407 is depicted as a thermopile, which is a plurality of thermocouples 408 which are connected in series in order to aggregate the voltages they produce in order to provide a voltage level (e.g., 1.5 volts) that may be required for energizing tag 50.

Thermopiles of various types are commercially available. By way of example, Honeywell offers their Q313 thermopile generator that provides an output voltage of 750 millivolts and can have its hot junction held at 1,400 degrees Fahrenheit. It is available at http://www.pexsupply.com. Thermopile modules based on bismuth telluride alloys are available from Hi-Z Technology Inc. (at 1-858-695-6660 or http://www.hi-z.com) which are reported to produce 3 to 4 volts (at an output of 10 to 20 watts) in response to a temperature difference of about 200 degrees Celsius.

As will also be understood, where an energy harvesting device is used, this superiority of signal communication over prior art tagging systems arises because of several factors: low frequencies (1 MHz or less) are used to allocate most of the radiated energy in the magnetic/inductive range, so that harsh environments (liquids, steel) can be penetrated; and data signal reception enhanced by use of ferrite cores with multiple windings therearound (e.g., ferrite core 308 in tag data antenna 55 as depicted in FIG. 34).

As shown in FIG. 38, hollow pipe 22 comprises a wall portion 22a which surrounds a tubular space 22b. Pipe 22 is provided with a threaded male end 22c and a threaded female socket end 22d to permit adjacent pipes to be screwed together, as is needed when forming a continuous conduit for oil or gas extraction or for conveying water or sewage. Wall portion 22a has an outer surface 22e.

To permit identification and tracking of pipes, a low frequency radio frequency identification tag 50 is attached to pipe 22 at its aforesaid outer surface 22e in a manner that protects the low radio frequency tag from soil abrasion during handling and ensures that the tag is retained on pipe 22.

According to the preferred embodiment of FIGS. 38 and 39, wall portion 22a has a recess 406 that opens into the outer surface 22e. Low radio frequency tag 50 is disposed within recess 406 by first disposing tag 50 within container 50a that is placed within the recess 406 and the container 50a is then completely filled with or "potted", with a protective material 50b that surrounds the low radio frequency tag 50. For example, such protective material may comprise solidified epoxy.

For additional environmental protection, a protective cover 409 may also be disposed over the low radio frequency tag 50 and container 50a and then secured by screw fasteners 410.

Figure 40A:
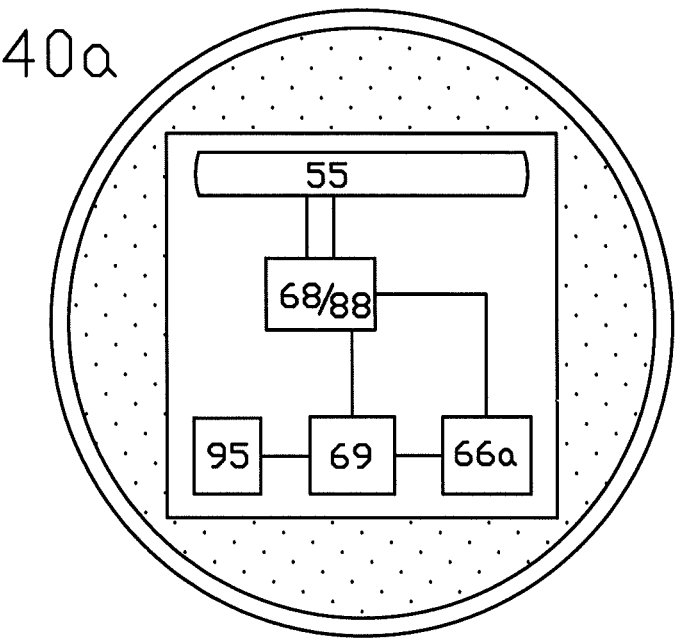
FIG. 40a is a schematic plan view of a container enclosing a low radio frequency tag in accordance with a first embodiment of the invention.
Figure 40B:
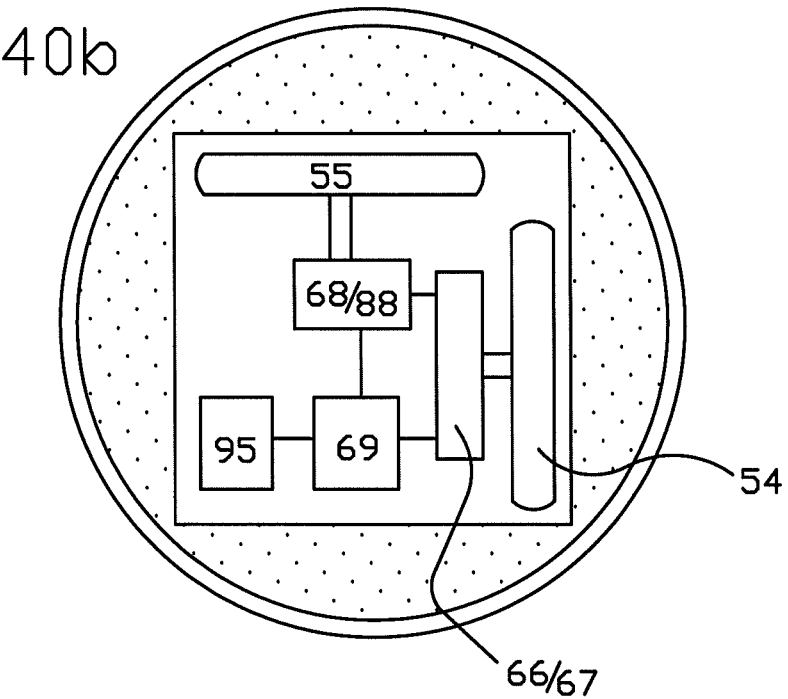
FIG. 40b is a schematic plan view of a container enclosing a low radio frequency tag in accordance with a second embodiment of the invention.

According to the present invention, it is important that low frequency low radio frequency tag 50 is operable at a low radio frequency not exceeding 1.0 megahertz. As shown in FIGS. 40a and 40b, such a tag 50 is shown disposed within container 50a which is filled with epoxy or other suitable potting compound to protect tag 50 from high pressure changes and extreme impacts caused by handling and during drilling under control of drilling equipment.

As shown in FIG. 40a, tag 50 comprises a tag transceiver 68/88 operable to transmit and receive data signals at the aforesaid low radio frequency not exceeding 1.0 megahertz; a tag antenna 55 operatively connected to the tag transceiver 68/88; a tag data storage device 95 that is operable to store data, including identification data for identifying the specific pipe 22 to which tag 50 is attached; a tag data processor 69 operable to process data received from tag transceiver 68/88 and tag data storage device 95 and to send data to cause the tag transceiver 68/88 to emit an identification signal based upon the aforesaid identification data stored in tag data storage device 95; and a tag energy source 66a for activating tag transceiver 68/88 and tag data processor 69.

Because it may be desirable to track the variation of environmental conditions, such as temperature, or to count the frequency of events, such as sudden impacts that pipe 22 may have endured, the low radio frequency tag 50 may be equipped with one or more sensors and related clocking devices to meet these needs.

For superior communication of data signals to low radio frequency tag 50 at low frequencies, it is desirable to use a tag antenna 55 which comprises a first elongated ferrite core with a number of windings thereon, as is well known to those skilled in the field of antenna design.

Moreover, tag energy source 66a may comprise an energy storage device, such as a battery. Alternatively, as shown in FIG. 40b, tag energy source 8 may comprise an electrical energy storage device 66/67 (e.g., a chargeable battery or capacitor) together with an electrical generator operable to energize the aforesaid electrical storage device. For example, the aforesaid electrical generator may comprise a tag power antenna 54 operable to pick up energy induced by an applied external varying electric field. Tag power antenna 54 preferably comprises a second elongated ferrite core, oriented substantially orthogonally to the first elongated ferrite core (of tag communication antenna 55) and energy storage 66/67 is connected to receive charging energy from tag power antenna 54. Preferably, the tag communication antenna 55 is tuned to maximize signal strength at a frequency f(com) that is distinct from the frequency f(power) to which tag power antenna 54 is tuned. Neither f(com) nor f(power) should exceed 1.0 megahertz in order to enable clear data communication in an environment of metal and liquids. Where frequencies are set by using clock comprising a radio crystal, it is advantageous that the frequencies be integer multiples of one another. For example, when f(power)=64 Hz, then f(com) could be 128 Hz.

While FIGS. 38, 39, 40a, and 40b show that low radio frequency tag 50 is attached to pipe 22 by placing it within recess 406, other methods of attachment may be used, provided that the low radio frequency tag 50 is well protected from abrasion and damage due to contact with soil and rocks. For example, low radio frequency tag 50 may be embedded into a flat sleeve or ring that would be slipped onto a pipe, much as a diamond is embedded into an engagement ring which is then slipped onto a finger.

Figure 42:
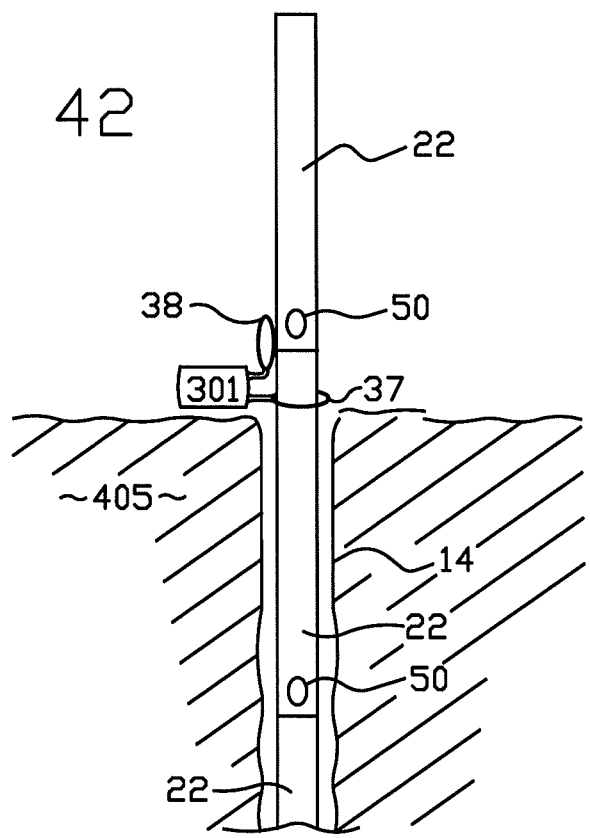
FIG. 42 is a schematic view of a system for tracking pipes at an oil or gas drilling site, in accordance with an embodiment of the invention.

FIG. 42 schematically depicts a system for tracking tagged hollow pipes 22 (as described hereinabove with respect to FIGS. 38, 39, 40a, and 40b) at a site where a plurality of hollow pipes 22 are to be stored or interconnected, such as an oil drilling site where the aforesaid hollow pipes 22 are connected and inserted into a drilled hole 14.

Figure 41:
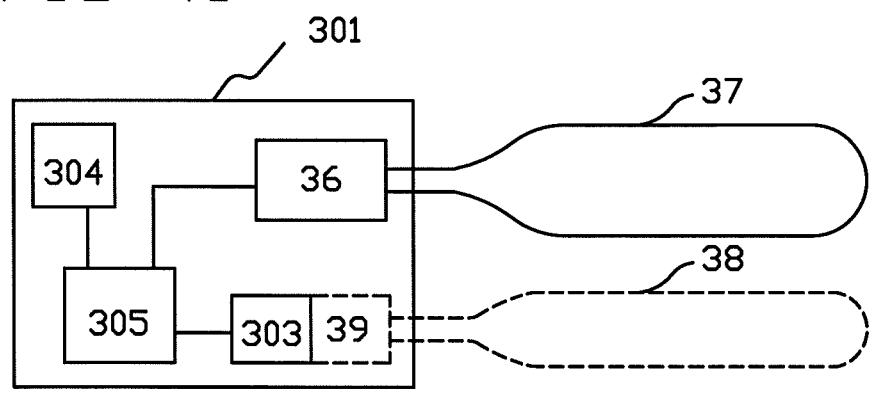
FIG. 41 is a schematic view of a reader for reading data from tags attached to pipes, in accordance with an embodiment of the invention.

In addition to the tag-equipped pipes 22, the tracking system also includes a reader 301, as shown in FIG. 41, for reading the aforesaid identification data (and sensor data, if tags 50 are sensor-equipped). The reader shown in FIG. 41 and FIG. 42 comprises: a reader communication antenna 37 configured to permit effective communication with each low radio frequency tag 50 (attached to its corresponding pipe 22) at the aforesaid low radio frequency not exceeding 1.0 megahertz; a reader transceiver 10 in operative communication with the reader antenna 37, the reader transceiver 36 being operable to transmit and receive data signals at the aforesaid low radio frequency not exceeding 1.0 megahertz; a reader data storage device 304 operable to store data; a reader data processor 305 in operative communication with reader transceiver 36 and reader data storage device 304; and a reader energy source 303 (e.g., a battery or A.C. power supply) for activating reader transceiver 36 and reader data processor 305. Although various arrangements can be effective for good data communications between tag 50 and reader 301, as shown in FIG. 42, reader communication antenna 37 is positioned and configured to encircle a lateral cross-section of pipe 22 during movement thereof past reader communication antenna 37 when pipe 22 is inserted into a wellhole 14 that is drilled into the earth (whether in dry ground or in an undersea floor). In that configuration, it will be understood that the tag 50 should preferably be oriented with the elongate ferrite core axis of the tag communication antenna 55 parallel to the elongate axis of pipe 22. Moreover, to minimize interference with the data signals received by antenna 37, it is preferred that power antenna 38 be oriented substantially orthogonal to antenna 37, as shown in FIG. 42.

According to a first embodiment of FIG. 40a, the tag energy source 66a comprises an energy storage device, such as a battery.

According to a second embodiment of FIG. 40b, the tag antenna is a tag communication antenna 55 which preferably comprises a first elongated ferrite core for enhanced data communications. In this embodiment, the aforesaid tag energy source 66a comprises a tag power antenna 54 (preferably comprising a second elongated ferrite core, oriented substantially orthogonally to the first elongated ferrite core) operable to pick up electric energy induced by an applied varying electric field, and an energy storage device 66/67 (such as a capacitor or chargeable battery) connected to receive charging energy from the tag power antenna 54. Preferably, the tag communication antenna 55 is tuned to maximize signal strength at a frequency f(com) that is distinct from (e.g., is an integer multiple of) the frequency f(power) to which the tag power antenna 54 is tuned. Neither f(com) nor f(power) should exceed 1.0 megahertz. For example, when f(power)=64 Hz, then f(com) could be 128 Hz. According to this embodiment, reader 9 further comprises a reader power antenna 38 and a low frequency power generator 39, both shown in dotted outline in FIG. 41, which is operable to generate the aforesaid applied varying electric field at a frequency close to f(power).

Figure 43:
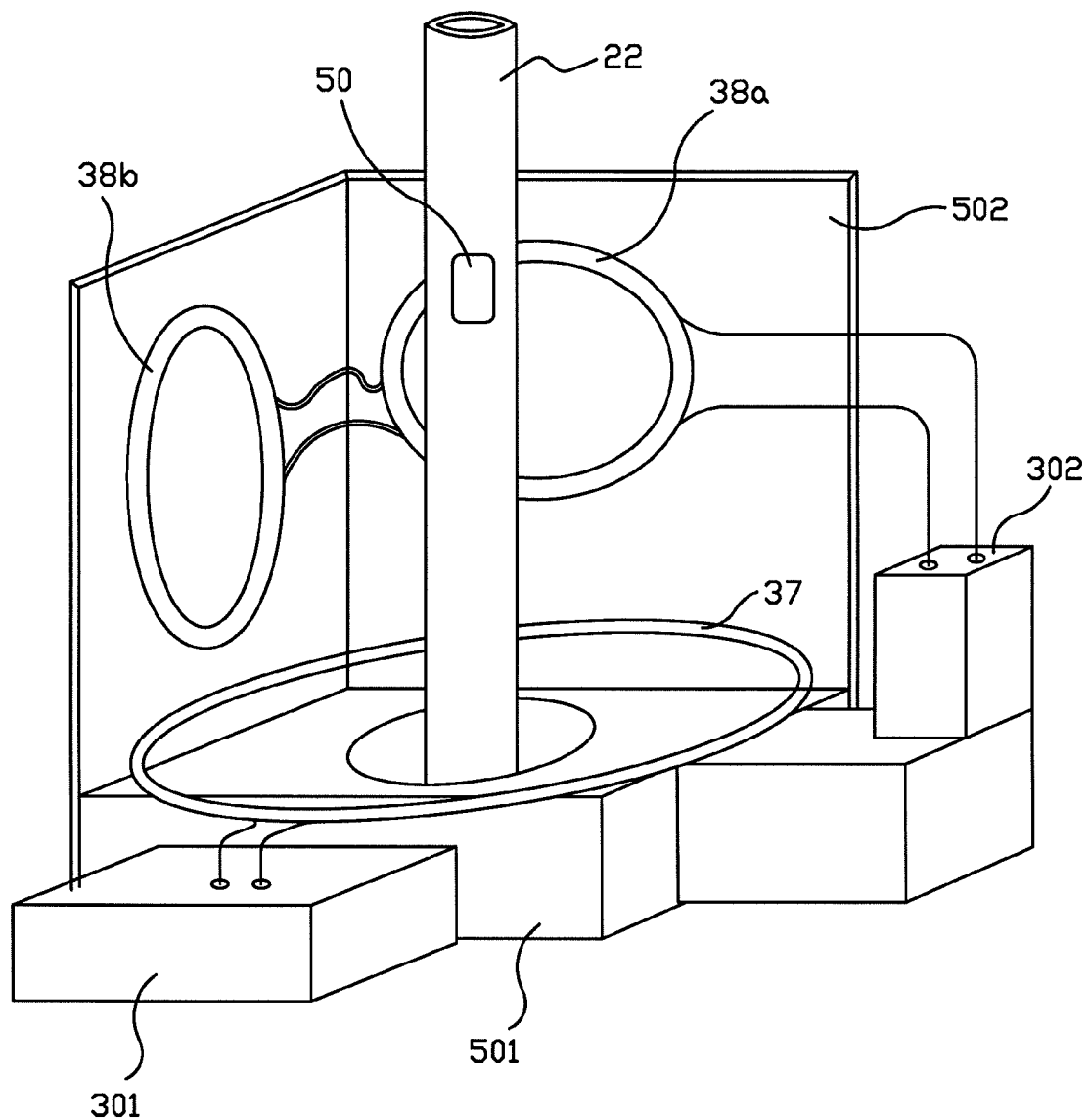
FIG. 43 is a schematic perspective view of an oil drilling apparatus in accordance with an embodiment of the invention.

FIG. 43 shows a schematic perspective view of a drilling apparatus for drill a wellhole 14 into the earth's formations for extracting a natural resource such as oil, natural gas, and water and to insert a drillstring of interconnected pipes 22 into the wellhole 14. The drilling apparatus or drillrig comprises a base platform 501 which serves to guide an end of a first pipe 22 into wellhole 14 (shown in FIG. 42) and into interconnection with a corresponding end of a second pipe 22 that is already disposed in the wellhole 14. The drilling apparatus is shown to include a positioning fixture 502, which is attached to base platform 501. Base platform 501 supports reader 301 and power station 302. Base platform 501 also operates to position and configure both the field communication inductive antenna 37 and field energization inductive antenna 38 to encircle a lateral cross-section of pipe 22 at a distance of at least 1.0 feet from pipe 22. To minimize interference with the data signals received by antenna 37, it is preferred that field energization inductive antenna 38 be oriented substantially orthogonal to antenna 37, as shown in FIG. 43. To improve energy transfer between antenna 38 and tag energization antenna 54 during rotation thereof when pipe 22 is rotating, antenna 38 may by composed of two mutually orthogonal loops 38a, 38b, as shown.

By contrast, prior art drill rigs do not accurately read tag-equipped drillpipes unless their field data antenna is held positioned within a few inches of the drillpipe. Such close proximity seriously interferes with drilling and pipe-handling operations in the field.

With the guidance proved herein, persons skilled in the art will readily be able to select choices of the foregoing factors (within their available circumstances) in order to optimize reader-tag communications and energization.

While the present invention has been described with reference to preferred embodiments thereof, numerous obvious changes and variations may readily be made by persons skilled in the fields of radio frequency tagging and tracking of objects, such as drilling equipment for gas and oil. Accordingly, the invention should be understood to include all such variations to the full extent embraced by the appended claims.

What is claimed is:

1. A system for detection and tracking of inanimate and animate objects, said system comprising:
   a) a low radio frequency tag carried by each of the objects, said tag comprising a tag communication inductive antenna operable at a first radio frequency not exceeding 1 megahertz, a transceiver operatively connected to said tag communication inductive antenna, said transceiver being operable to transmit and receive data signals at said first radio frequency, a data storage device operable to store data comprising identification data for identifying said tag, a micro processor operable to process data received from said transceiver and said data storage device and to send data to cause said transceiver to emit an identification signal based upon said identification data stored in said data storage device, and an energy source for activating said transceiver and said microprocessor, said energy source comprising a tag energization inductive antenna operable to receive radio frequency energy from an ambient radio frequency field of a second radio frequency not exceeding 1 megahertz, said second radio frequency being substantially different than said first radio frequency;
   b) a field communication inductive antenna disposed at an orientation and distance from each object that permits effective communication therewith at said first radio frequency;
   c) a receiver in operative communication with said field communication inductive antenna, said receiver being operable to receive data signals at said first radio frequency from said low radio frequency tag;
   d) a transmitter in operative communication with said field communication inductive antenna, said transmitter being operable to send data signals at said first radio frequency to said low frequency tag;

e) a reader data processor in operative communication with said receiver and said transmitter;

f) a field energization inductive antenna operable to produce said ambient radio frequency field at the tag energization inductive antenna of said object;

g) a drilling apparatus operable to drill a wellhole into the earth's formations for extracting a natural resource selected from oil, natural gas, and water and to insert a drillstring of interconnected pipes into said wellhole; and h) a plurality of serially interconnectable pipes, each pipe comprising a wall portion which comprises an outer surface, said low radio frequency tag being attached to said pipe at said outer surface, both said field communication inductive antenna and said field energization inductive antenna being positioned and configured to encircle a lateral cross-section of each said pipe at said distance therefrom, said distance being at least 1.0 feet.

2. A system as set forth in claim 1, said drilling apparatus comprising:

i) a base platform operable for guiding an end of a first pipe into said wellhole and into interconnection with a corresponding end of a second pipe that is already disposed in said wellhole, ii) a positioning fixture that is attached to said base platform and operable to position and configure both said field communication inductive antenna and said field energization inductive antenna to encircle a lateral cross-section of said first pipe at said distance of at least 1.0 feet therefrom.

3. A system as set forth in claim 1, said tag communication inductive antenna and said tag energization inductive antenna being mutually oriented and positioned to substantially minimize inductive coupling therebetween.

4. A system as set forth in claim 1, said first radio frequency being an integral multiple of said second radio frequency.

5. A system as set forth in claim 1, said first radio frequency being 128 kHz and said second radio frequency being selected from 64 kHz, 32 kHz, 16 kHz, and 8 kHz.

6. A system as set forth in claim 1, wherein said tag communication inductive antenna is a wound air loop coil, and said tag energization inductive antenna is a wound air loop coil.

7. A system as set forth in claim 1, wherein said field communication inductive antenna has an axis which is substantially orthogonal to a corresponding axis of said field energization inductive antenna.

8. A system as set forth in claim 1, wherein said tag communication inductive antenna is a wound air loop coil having a first axis, and said tag energization inductive antenna is a wound air loop coil having a second axis that is substantially orthogonal to said first axis.

9. A system as set forth in claim 1, wherein said tag communication inductive antenna comprises a wound ferrite coil, and said tag energization inductive antenna comprises a wound ferrite coil.

10. A system as set forth in claim 1, wherein said tag communication inductive antenna comprises a wound ferrite coil having a first axis and said tag energization inductive antenna comprises a wound ferrite coil having a second axis that is substantially orthogonal to said tag communication inductive antenna.

11. A system as set forth in claim 1, said tag communication inductive antenna comprising a first plurality of turns of wire, said tag energization inductive antenna comprising a second plurality of turns of wire.

\* \* \* \* \*